US009659454B2

(12) United States Patent
Augustine et al.

(10) Patent No.: US 9,659,454 B2
(45) Date of Patent: May 23, 2017

(54) ELECTRONIC GAMING DEVICE WITH AUTO-PLAY FUNCTIONALITY

(71) Applicant: Cadillac Jack, Inc., Duluth, GA (US)

(72) Inventors: Jerish Augustine, Snellville, GA (US); Timothy Curtis Ryan, Duluth, GA (US)

(73) Assignee: Cadillac Jack, Inc., Duluth, GA (US)

( * ) Notice: Subject to any disclaimer, the term of this patent is extended or adjusted under 35 U.S.C. 154(b) by 0 days.

(21) Appl. No.: 14/748,377

(22) Filed: Jun. 24, 2015

(65) Prior Publication Data

US 2015/0294534 A1 Oct. 15, 2015

Related U.S. Application Data

(63) Continuation-in-part of application No. 13/776,081, filed on Feb. 25, 2013, now Pat. No. 9,117,343, which is a continuation of application No. 13/693,872, filed on Dec. 4, 2012, now Pat. No. 9,039,519.

(51) Int. Cl.
*A63F 13/00* (2014.01)
*G07F 17/32* (2006.01)

(52) U.S. Cl.
CPC ...... *G07F 17/3258* (2013.01); *G07F 17/3209* (2013.01); *G07F 17/3211* (2013.01); *G07F 17/3225* (2013.01); *G07F 17/3227* (2013.01); *G07F 17/3241* (2013.01); *G07F 17/3267* (2013.01); *G07F 17/3272* (2013.01)

(58) Field of Classification Search
None
See application file for complete search history.

(56) References Cited

U.S. PATENT DOCUMENTS

| | | | | |
|---|---|---|---|---|
| 6,012,983 | A | 1/2000 | Walker et al. | |
| 6,244,957 | B1 * | 6/2001 | Walker | G07F 17/32 463/20 |
| 9,039,519 | B2 | 5/2015 | Augustine | |
| 9,117,343 | B2 | 8/2015 | Augustine | |
| 2003/0114217 | A1 * | 6/2003 | Walker | G07F 17/32 463/20 |
| 2006/0068893 | A1 * | 3/2006 | Jaffe | G07F 17/34 463/20 |
| 2007/0051726 | A1 | 3/2007 | Arkins | |
| 2007/0054726 | A1 * | 3/2007 | Muir | G07F 17/34 463/16 |
| 2007/0054729 | A1 * | 3/2007 | Hornik | G07F 17/32 463/16 |
| 2007/0243934 | A1 * | 10/2007 | Little | G07F 17/32 463/40 |
| 2009/0005145 | A1 * | 1/2009 | White | G07F 17/32 463/16 |
| 2010/0216544 | A1 * | 8/2010 | Hamlin | G07F 17/32 463/25 |

(Continued)

*Primary Examiner* — Sunit Pandya
(74) *Attorney, Agent, or Firm* — Weide & Miller, Ltd.

(57) ABSTRACT

Examples disclosed herein relate to systems and methods, which may receive wagers on one or more paylines. The systems and methods may utilize one or more auto-play game functionality. The systems and methods may determine one or more payouts based on the one or more auto-play game functionality. The systems and methods may display one or more presentations based on the one or more auto-play game functionality.

20 Claims, 29 Drawing Sheets

(56) References Cited

U.S. PATENT DOCUMENTS

| | | | | |
|---|---|---|---|---|
| 2012/0184353 | A1* | 7/2012 | Anderson | G07F 17/32<br>463/25 |
| 2013/0090164 | A1* | 4/2013 | Moshal | G07F 17/3211<br>463/31 |

* cited by examiner

FIG. 5C

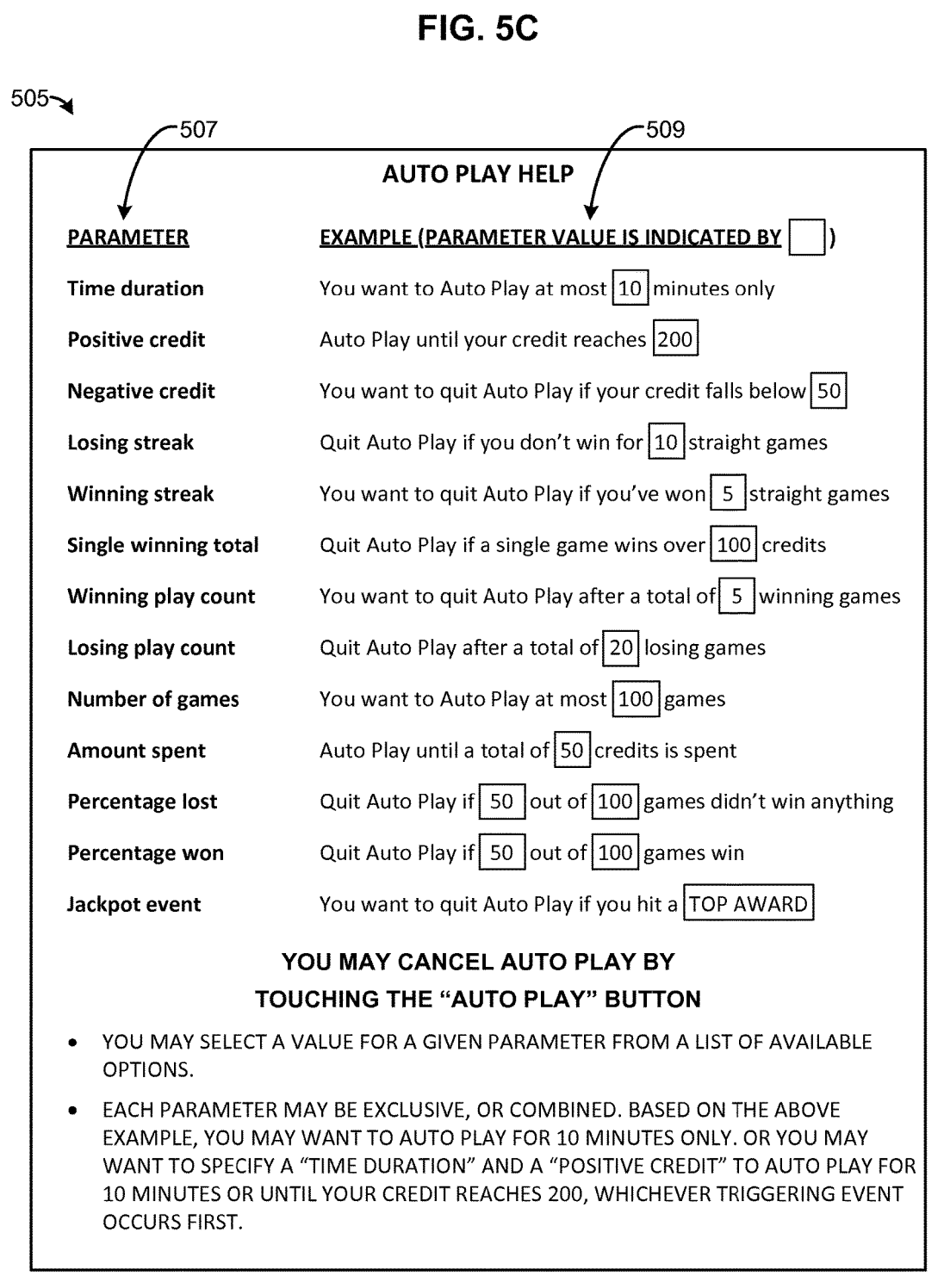

505

507 509

AUTO PLAY HELP

| PARAMETER | EXAMPLE (PARAMETER VALUE IS INDICATED BY ☐) |
|---|---|
| Time duration | You want to Auto Play at most 10 minutes only |
| Positive credit | Auto Play until your credit reaches 200 |
| Negative credit | You want to quit Auto Play if your credit falls below 50 |
| Losing streak | Quit Auto Play if you don't win for 10 straight games |
| Winning streak | You want to quit Auto Play if you've won 5 straight games |
| Single winning total | Quit Auto Play if a single game wins over 100 credits |
| Winning play count | You want to quit Auto Play after a total of 5 winning games |
| Losing play count | Quit Auto Play after a total of 20 losing games |
| Number of games | You want to Auto Play at most 100 games |
| Amount spent | Auto Play until a total of 50 credits is spent |
| Percentage lost | Quit Auto Play if 50 out of 100 games didn't win anything |
| Percentage won | Quit Auto Play if 50 out of 100 games win |
| Jackpot event | You want to quit Auto Play if you hit a TOP AWARD |

YOU MAY CANCEL AUTO PLAY BY TOUCHING THE "AUTO PLAY" BUTTON

- YOU MAY SELECT A VALUE FOR A GIVEN PARAMETER FROM A LIST OF AVAILABLE OPTIONS.
- EACH PARAMETER MAY BE EXCLUSIVE, OR COMBINED. BASED ON THE ABOVE EXAMPLE, YOU MAY WANT TO AUTO PLAY FOR 10 MINUTES ONLY. OR YOU MAY WANT TO SPECIFY A "TIME DURATION" AND A "POSITIVE CREDIT" TO AUTO PLAY FOR 10 MINUTES OR UNTIL YOUR CREDIT REACHES 200, WHICHEVER TRIGGERING EVENT OCCURS FIRST.

ELECTRONIC GAMING DEVICE WITH AUTO-PLAY FUNCTIONALITY

CROSS-REFERENCE TO RELATED PATENT APPLICATION

This application claims priority to and is a continuation in part of U.S. patent application Ser. No. 13/776,081 entitled "ELECTRONIC GAMING DEVICE WITH AUTO-PLAY FUNCTIONALITY", filed on Feb. 25, 2013, which claims priority to and is a continuation of prior application Ser. No. 13/693,872 entitled "ELECTRONIC GAMING DEVICE WITH AUTO-PLAY FUNCTIONALITY", filed on Dec. 4, 2012, which are incorporated herein by reference in their entirety.

FIELD

The subject matter disclosed herein relates to an electronic gaming device. More specifically, the disclosure relates to an electronic gaming device, which provides game play with one or more auto-play functionalities. Further, the disclosure relates to utilizing auto-play functionality and auto-play presentations in the base game and/or the bonus game to enhance the gaming experience.

Information:

The gaming industry has numerous casinos located both worldwide and in the United States. A client of a casino or other gaming entity may gamble via various games of chance. For example, craps, roulette, baccarat, blackjack, and electronic games (e.g., a slot machine) where a person may gamble on an outcome.

Paylines of an electronic gaming device (e.g., a slot machine) are utilized to determine when predetermined winning symbol combinations are aligned in a predetermined pattern to form a winning combination. A winning event occurs when the player successful matches the predetermined winning symbols in one of the predetermined patterns. One or more combinations of symbols may generate a bonus game.

During a game playing session, players may become tired and/or distracted which may reduce the number of games, which may be played during this game playing session. This reduction in game play may reduce the player's enjoyment and the revenue generated for the gaming entity. A new way of delivering game play may include providing auto-play functionality and/or auto-play presentations in the base game and/or the bonus game.

BRIEF DESCRIPTION OF THE FIGURES

Non-limiting and non-exhaustive examples may be described with reference to the following figures, wherein like reference numerals refer to like parts throughout the various figures.

FIG. 5C is an illustration of an auto-play help menu, according to one embodiment.

DETAILED DESCRIPTION

Figure 1:
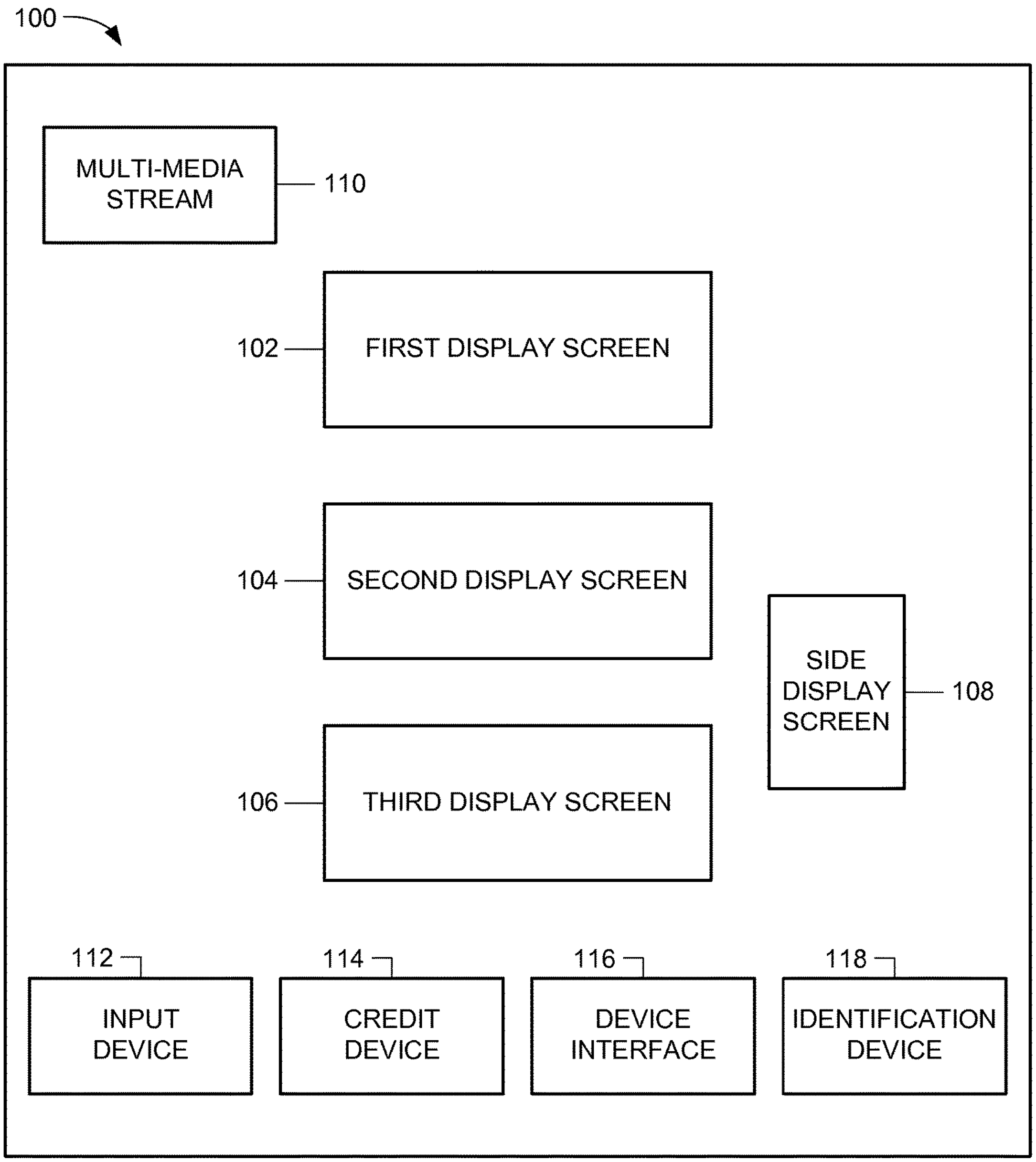
FIG. 1 is an illustration of the electronic gaming device, according to one embodiment.

FIG. 1 is an illustration of an electronic gaming device 100. Electronic gaming device 100 may include a multimedia stream 110, a first display screen 102, a second display screen 104, a third display screen 106, a side display screen 108, an input device 112, a credit device 114, a device interface 116, and an identification device 118. Electronic gaming device 100 may display one, two, a few, or a plurality of multi-media streams 110, which may be obtained from one or more gaming tables, one or more electronic gaming devices, a central server, a video server, a music server, an advertising server, another data source, and/or any combination thereof.

Multi-media streams may be obtained for an entertainment event, a wagering event, a promotional event, a promotional offering, an advertisement, a sporting event, any other event, and/or any combination thereof. For example, the entertainment event may be a concert, a show, a television program, a movie, an Internet event, and/or any combination thereof. In another example, the wagering event may be a poker tournament, a horse race, a car race, and/or any combination thereof. The advertisement may be an advertisement for a casino, a restaurant, a shop, any other entity, and/or any combination thereof. The sporting event may be a football game, a baseball game, a hockey game, a basketball game, any other sporting event, and/or any combination thereof. These multi-media streams may be utilized in combination with the gaming table video streams.

Input device 112 may be mechanical buttons, electronic buttons, mechanical switches, electronic switches, optical switches, a slot pull handle, a keyboard, a keypad, a touch screen, a gesture screen, a joystick, a pointing device (e.g., a mouse), a virtual (on-screen) keyboard, a virtual (on-screen) keypad, biometric sensor, or any combination thereof. Input device 112 may be utilized to make a wager, to select auto-play, to select auto-play criteria, to select one or more auto-play gaming functionality, to control any object, to control any gaming feature, to select one or more pattern gaming options, to obtain data relating to historical payouts, to select a row and/or column to move, to select a row area to move, to select a column area to move, to select a symbol to move, to modify electronic gaming device 100 (e.g., change sound level, configuration, font, language, etc.), to select a movie or song, to select live multi-media streams, to request services (e.g., drinks, slot attendant, manager, etc.), to select two-dimensional ("2D") game play, to select three-dimensional ("3D") game play, to select both two-dimensional and three-dimensional game play, to change the orientation of games in a three-dimensional space, to move a symbol (e.g., wild, multiplier, etc.), and/or any combination thereof. These selections may occur via any other input device (e.g., a touch screen, voice commands, etc.).

Credit device 114 may be utilized to collect monies and distribute monies (e.g., cash, vouchers, etc.). Credit device 114 may interface with a mobile device to electronically transmit money and/or credits. Credit device 114 may interface with a player's card to exchange player points.

Device interface 116 may be utilized to interface electronic gaming device 100 to a bonus game device, a local area progressive controller, a wide area progressive controller, a progressive sign controller, a peripheral display device, signage, a promotional device, network components, a local network, a wide area network, remote access equipment, a slot monitoring system, a slot player tracking system, the Internet, a server, and/or any combination thereof.

Device interface 116 may be utilized to connect a player to electronic gaming device 100 through a mobile device, card, keypad, identification device 118, and/or any combination thereof. Device interface 116 may include a docking station by which a mobile device is plugged into electronic gaming machine 100. Device interface 116 may include an over the air connection by which a mobile device is connected to electronic gaming machine 100 (e.g., Bluetooth, Near Field technology, and/or Wi-Fi technology). Device interface 116 may include a connection to identification device 118.

Identification device 118 may be utilized to determine an identity of a player. Based on information obtained by identification device 118, electronic gaming device 100 may be reconfigured. For example, the language, sound level, music, placement of multi-media streams, one or more auto-play functionalities (e.g., auto-play profile 1, auto-play profile 2, auto-play profile 3, etc.) may be presented, a repeat payline gaming option may be presented, a pattern gaming option may be presented, historical gaming data may be presented, a row rearrangement option may be presented, a column rearrangement option may be presented, a row area rearrangement option may be presented, a column area rearrangement option may be presented, a two-dimensional gaming option may be presented, a three-dimensional gaming option may be presented, and/or the placement of gaming options may be modified based on player preference data. For example, a player may want to have game play options, which have only auto-play functionality (or similar functionality). Therefore, no games without auto-play functionality would be presented. In another example, the player may only want to play games that include pattern gaming options only. Therefore, only games which include pattern gaming options would be presented to the player. In another example, the player may only want to play games that include historical information relating to game play. Therefore, only games which include historical gaming data would be presented to the player. These examples may be combined.

Identification device 118 may utilize biometrics (e.g., thumb print, retinal scan, or other biometric). Identification device 118 may include a card entry slot into input device 112. Identification device 118 may include a keypad with an assigned pin number for verification. Identification device 118 may include multiple layers of identification for added security. For example, a player may be required to enter a player tracking card, and/or a pin number, and/or a thumb print, and/or any combination thereof. Based on information obtained by identification device 118, electronic gaming device 100 may be reconfigured. For example, the language, sound level, music, placement of video streams, placement of images, and the placement of gaming options utilized may be modified based on a player's preference data. For example, a player may have selected baseball under the sporting event preferences; electronic gaming device 100 may then automatically display the current baseball game onto side display screen 108 and/or an alternate display screen as set in the player's options.

First display screen 102 may be a liquid crystal display ("LCD"), a cathode ray tube display ("CRT"), organic light-emitting diode display ("OLED"), plasma display panel ("PDP"), electroluminescent display ("ELD"), a light-emitting diode display ("LED"), or any other display technology. First display screen 102 may be used for displaying primary games or secondary (bonus) games, advertising, player attractions, electronic gaming device 100 configuration parameters and settings, game history, accounting meters, events, alarms, and/or any combination thereof. Second display screen 104, third display screen 106, side display screen 108, and any other screens may utilize the same technology as first display screen 102 and/or any combination of technologies.

For example, a single large image could be partially displayed on second display screen 104 and partially displayed on third display screen 106, so that when both display screens are put together they complete one image. Electronic gaming device 100 may stream or play prerecorded multimedia data, which may be displayed on any display combination.

Figure 2:
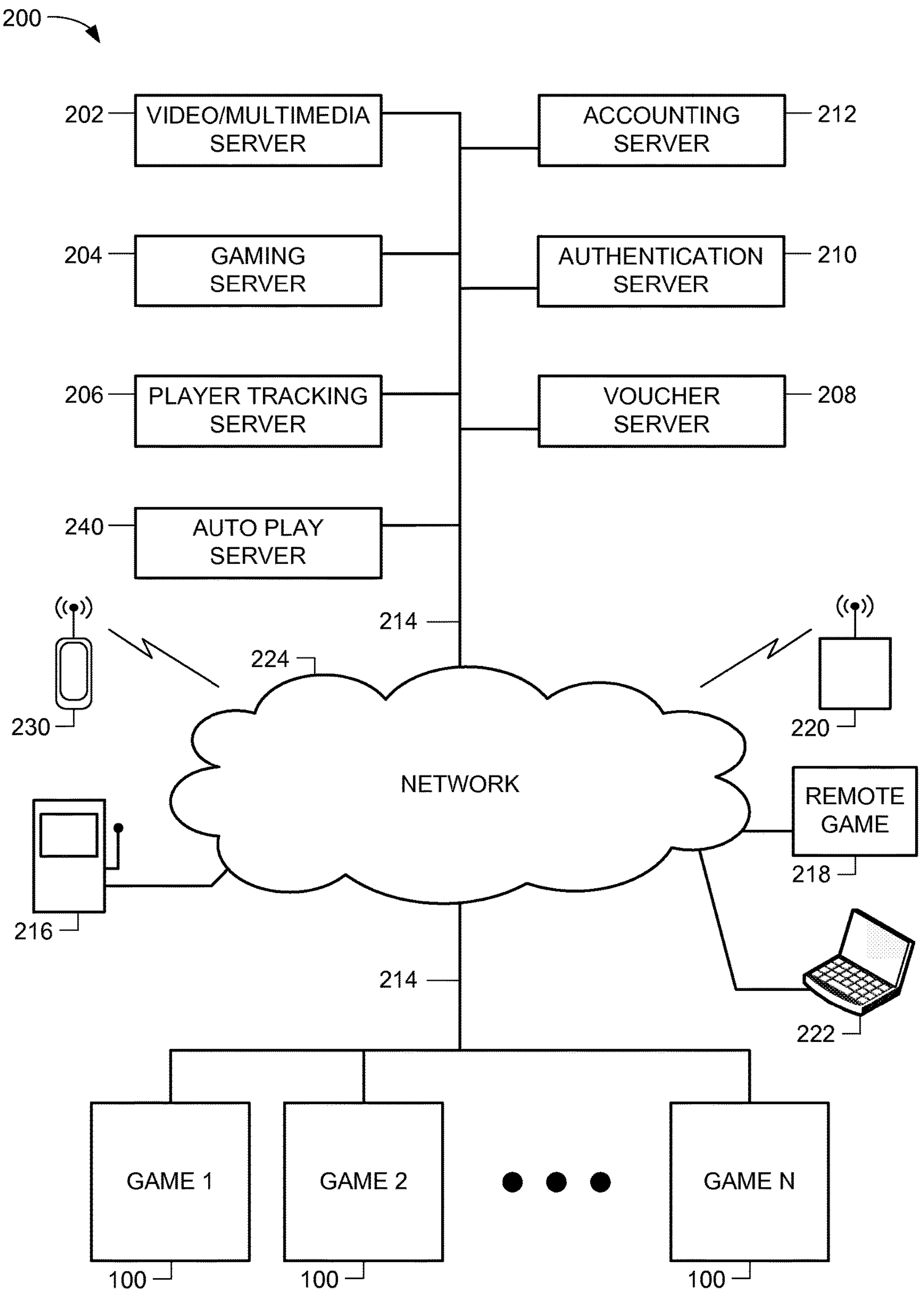
FIG. 2 is an illustration of an electronic gaming system, according to one embodiment.

In FIG. 2, an electronic gaming system 200 is shown. Electronic gaming system 200 may include a video/multimedia server 202, a gaming server 204, a player tracking server 206, a voucher server 208, an authentication server 210, an accounting server 212, and an auto-play server 240.

Electronic gaming system 200 may include video/multimedia server 202, which may be coupled to network 224 via a network link 214. Network 224 may be the Internet, a private network, and/or a network cloud. One or more video streams may be received at video/multimedia server 202 from other electronic gaming devices 100. Video/multimedia server 202 may transmit one or more of these video streams to a mobile phone 230, electronic gaming device 100, a remote electronic gaming device at a different location in the same property 216, a remote electronic gaming device at a different location 218, a laptop 222, and/or any other remote electronic device 220. Video/multimedia server 202 may transmit these video streams via network link 214 and/or network 224.

For example, a remote gaming device at the same location may be utilized at a casino with multiple casino floors, a casino that allows wagering activities to take place from the hotel room, a casino that may allow wagering activities to take place from the pool area, etc. In another example, the remote devices may be at another location via a progressive link to another casino, and/or a link within a casino corporation that owns numerous casinos (e.g., MGM, Caesars, etc.).

Gaming server 204 may generate gaming outcomes. Gaming server 204 may provide electronic gaming device 100 with game play content. Gaming server 204 may provide electronic gaming device 100 with game play math and/or outcomes. Gaming server 204 may provide one or more of a payout functionality, an auto-play functionality, an auto-play evaluation functionality, other game functionality, and/or any virtual game functionality.

Player tracking server 206 may track a player's betting activity, a player's preferences (e.g., language, font, sound level, drinks, etc.). Based on data obtained by player tracking server 206, a player may be eligible for gaming rewards (e.g., free play), promotions, and/or other awards (e.g., complimentary food, drinks, lodging, concerts, etc.).

Voucher server 208 may generate a voucher, which may include data relating to gaming. Further, the voucher may include payline structure option selections. In addition, the voucher may include auto-play game play data (or similar game play data), repeat payline data, pattern data, historical payout data, column data, row data, and/or symbols that were modified.

Authentication server 210 may determine the validity of vouchers, player's identity, and/or an outcome for a gaming event.

Accounting server 212 may compile, track, and/or monitor cash flows, voucher transactions, winning vouchers, losing vouchers, and/or other transaction data. Transaction data may include the number of wagers, the size of these wagers, the date and time for these wagers, the identity of the players making these wagers, and/or the frequency of the wagers. Accounting server 212 may generate tax information relating to these wagers. Accounting server 212 may generate profit/loss reports for players' tracked outcomes.

Network connection 214 may be used for communication between dedicated servers, thin clients, thick clients, back-office accounting systems, etc.

Laptop computer 222 and/or any other electronic devices (e.g., mobile phone 230, electronic gaming device 100, etc.) may be used for downloading new gaming device applications or gaming device related firmware through remote access.

Laptop computer 222 and/or any other electronic device (e.g., mobile phone 230, electronic gaming device 100, etc.) may be used for uploading accounting information (e.g., cashable credits, non-cashable credits, coin in, coin out, bill in, voucher in, voucher out, etc.).

Network 224 may be a local area network, a casino premises network, a wide area network, a virtual private network, an enterprise private network, the Internet, or any combination thereof. Hardware components, such as network interface cards, repeaters and hubs, bridges, switches, routers, firewalls, or any combination thereof may also be part of network 224.

Auto-play server 240 may generate, compile, track, and/or store data relating to one or more auto-play games, auto-play profiles, auto-play gaming results, and/or any data relating to auto-play. Auto-play server 240 may relate any of this data to one or more players. For example, player 1 may prefer an auto-play gaming profile, which focuses on limiting the amount of money lost. Whereas, player 2 may prefer an auto-play gaming profile, which focuses on doubling up their initial credit amount.

A statistics server may be used to maintain data relating to historical game play for one or more electronic gaming devices 100. This historical data may include winning amounts, auto-play criteria, auto-play profiles, auto-play winning frequency, any other auto-play data, winning data (e.g., person, sex, age, time on machine, amount of spins before winning event occurred, etc.), fastest winning event reoccurrence, longest winning event reoccurrence, average frequencies of winning events, average winning amounts, highest winning amount, lowest winning amount, locations for winning events, winning event dates, winning machines, winning game themes, and/or any other data relating to game play.

Statistics server may include data relating to one or more auto-play game play (or similar game play). This data may include the number of times a specific item (e.g., auto-play criteria 1, auto-play profile 1, auto-play criteria 2, etc.) was selected. The frequency of any specific item being selected and the amount won. For example, when an auto-play shut off of 100% gain is selected, a player wins 52% of the time (e.g., start with $100 and stop if balance reaches $200). This data may also include data relating to any interrelationship of elements. For example, when X number (e.g., 50) of spins is selected, a 50% stop loss is selected 35% of the time.

Figure 3:
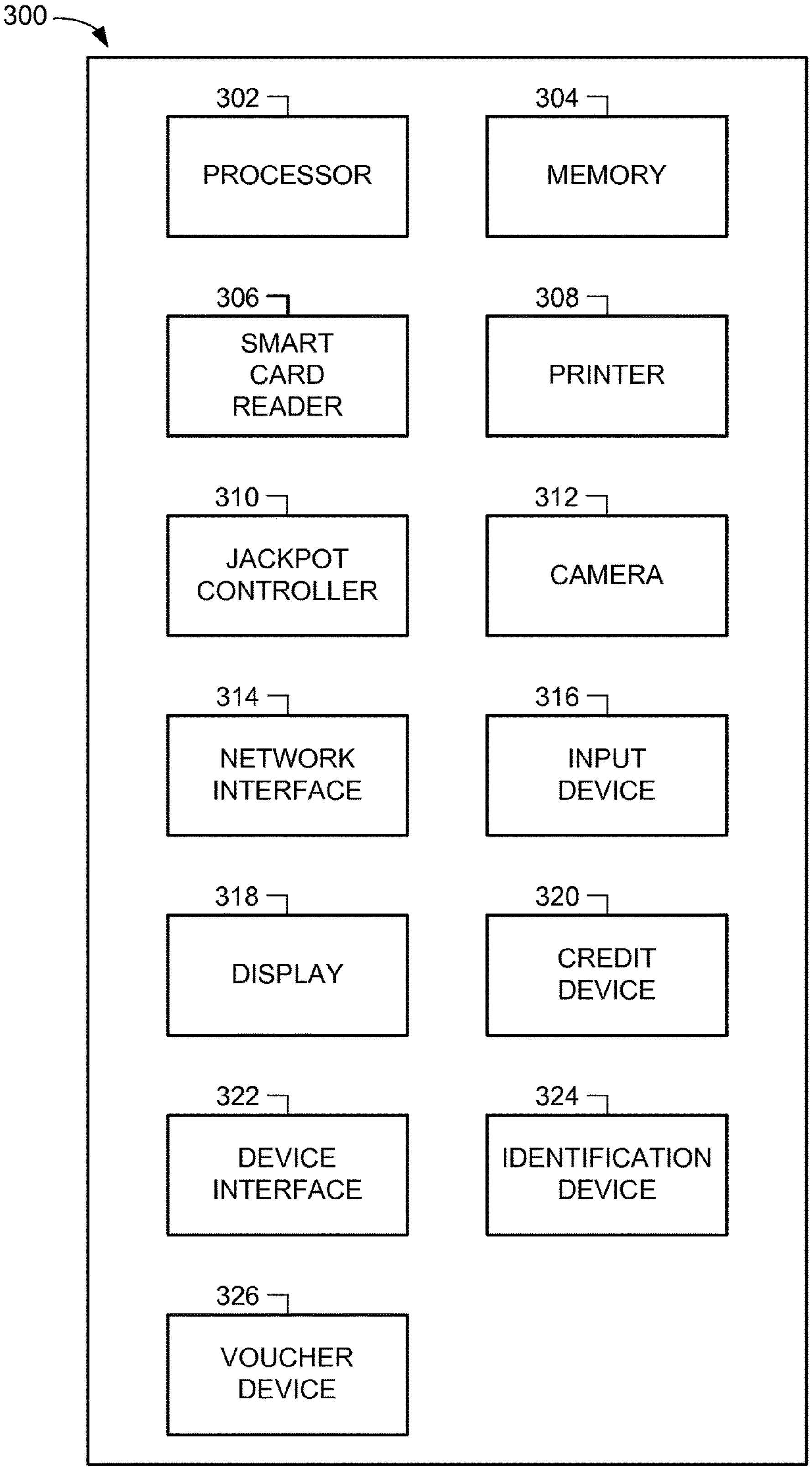
FIG. 3 is a block diagram of the electronic gaming device, according to one embodiment.

FIG. 3 shows a block diagram 300 of electronic gaming device 100. Electronic gaming device 100 may include a processor 302, a memory 304, a smart card reader 306, a printer 308, a jackpot controller 310, a camera 312, a network interface 314, an input device 316, a display 318, a credit device 320, a device interface 322, an identification device 324, and a voucher device 326.

Processor 302 may execute program instructions of memory 304 and use memory 304 for data storage. Processor 302 may also include a numeric co-processor, or a graphics processing unit (or units) for accelerated video encoding and decoding, and/or any combination thereof.

Processor 302 may include communication interfaces for communicating with electronic gaming device 100, electronic gaming system 200, and user interfaces to enable communication with all gaming elements. For example, processor 302 may interface with memory 304 to access a player's mobile device through device interface 322 to display contents onto display 318. Processor 302 may generate a voucher based on a wager confirmation, which may be received by an input device, a server, a mobile device, and/or any combination thereof. A voucher device may generate, print, transmit, or receive a voucher. Memory 304 may include communication interfaces for communicating with electronic gaming device 100, electronic gaming system 200, and user interfaces to enable communication with all gaming elements. For example, the information stored on memory 304 may be printed out onto a voucher by printer 308. Videos or pictures captured by camera 312 may be saved and stored on memory 304. Memory 304 may include a confirmation module, which may authenticate a value of a voucher and/or the validity of the voucher. Processor 302 may determine the value of the voucher based on generated voucher data and data in the confirmation module. Electronic gaming device 100 may include a player preference input device. The player preference input device may modify a game configuration. The modification may be based on data from the identification device.

Memory 304 may be non-volatile semiconductor memory, such as read-only memory ("ROM"), erasable programmable read-only memory ("EPROM"), electrically erasable programmable read-only memory ("EEPROM"), flash memory ("NVRAM"), Nano-RAM (e.g., carbon nanotube random access memory), and/or any combination thereof.

Memory 304 may also be volatile semiconductor memory such as, dynamic random access memory ("DRAM"), static random access memory ("SRAM"), and/or any combination thereof.

Memory 304 may also be a data storage device, such as a hard disk drive, an optical disk drive such as, CD, DVD, Blu-ray, a solid state drive, a memory stick, a CompactFlash card, a USB flash drive, a Multi-media Card, an xD-Picture Card, and/or any combination thereof.

Memory 304 may be used to store read-only program instructions for execution by processor 302, for the read-write storage for global variables and static variables, read-write storage for uninitialized data, read-write storage for dynamically allocated memory, for the read-write storage of the data structure known as "the stack," and/or any combination thereof.

Memory 304 may be used to store the read-only paytable information for which symbol combinations on a given payline that result in a win (e.g., payout) which are established for games of chance, such as slot games and video poker.

Memory 304 may be used to store accounting information (e.g., cashable electronic promotion in, non-cashable electronic promotion out, coin in, coin out, bill in, voucher in, voucher out, electronic funds transfer in, etc.).

Memory 304 may be used to record error conditions on an electronic gaming device 100, such as door open, coin jam, ticket print failure, ticket (e.g., paper) jam, program error, reel tilt, etc., and/or any combination thereof.

Memory 304 may also be used to record the complete history for the most recent game played, plus some number of prior games as may be determined by the regulating authority.

Smart card reader 306 may allow electronic gaming device 100 to access and read information provided by the player or technician, which may be used for setting the player preferences and/or providing maintenance information. For example, smart card reader 306 may provide an interface between a smart card (inserted by the player) and identification device 324 to verify the identity of a player.

Printer 308 may be used for printing slot machine payout receipts, slot machine wagering vouchers, non-gaming coupons, slot machine coupons (e.g., a wagering instrument with a fixed waging value that can only be used for non-cashable credits), drink tokens, comps, and/or any combination thereof.

Electronic gaming device 100 may include a jackpot controller 310, which may allow electronic gaming device 100 to interface with other electronic gaming devices either directly or through electronic gaming system 200 to accumulate a shared jackpot.

Camera 312 may allow electronic gaming device 100 to take images of a player or a player's surroundings. For example, when a player sits down at the machine their picture may be taken to include his or her image into the game play. A picture of a player may be an actual image as taken by camera 312. A picture of a player may be a computerized caricature of the image taken by camera 312. The image obtained by camera 312 may be used in connection with identification device 324 using facial recognition. Camera 312 may allow electronic gaming device 100 to record video. The video may be stored on memory 304 or stored remotely via electronic gaming system 200. Videos obtained by camera 312 may then be used as part of game play, or may be used for security purposes. For example, a camera located on electronic gaming device 100 may capture videos of a potential illegal activity (e.g., tampering with the machine, crime in the vicinity, underage players, etc.).

Network interface 314 may allow electronic gaming device 100 to communicate with video/multimedia server 202, gaming server 204, player tracking server 206, voucher server 208, authentication server 210, accounting server 212, and/or auto-play server 240.

Input device 316 may be mechanical buttons, electronic buttons, a touch screen, and/or any combination thereof. Input device 316 may be utilized to make a wager, to select auto-play, to select auto-play criteria, to select one or more game elements, to select one or more auto-play functionality, to make an offer to buy or sell a voucher, to determine a vouchers worth, to cash in a voucher, to modify electronic gaming device 100 (e.g., change sound level, configuration, font, language, etc.), to select a movie or music, to select live video streams (e.g., sporting event 1, sporting event 2, sporting event 3), to request services (e.g., drinks, manager, etc.), and/or any combination thereof.

Display 318 may show video streams from one or more content sources. Display 318 may encompass first display screen 102, second display screen 104, third display screen 106, side display screen 108, and/or another screen used for displaying video content.

Credit device 320 may be utilized to collect monies and distribute monies (e.g., cash, vouchers, etc.). Credit device 320 may interface with processor 302 to allow game play to take place. Processor 302 may determine any payouts, display configurations, animation, and/or any other functions associated with game play. Credit device 320 may interface with display 318 to display the amount of available credits for the player to use for wagering purposes. Credit device 320 may interface via device interface 322 with a mobile device to electronically transmit money and/or credits. Credit device 320 may interface with a player's pre-established account, which may be stored on electronic gaming system 200, to electronically transmit money and/or credit. For example, a player may have a credit card or other mag-stripe card on file with the location for which money and/or credits can be directly applied when the player is done. Credit device 320 may interface with a player's card to exchange player points.

Electronic gaming device 100 may include a device interface 322 that a user may employ with his or her mobile device (e.g., smart phone) to receive information from and/or transmit information to electronic gaming device 100 (e.g., watch a movie, listen to music, obtain verbal betting options, verify identification, transmit credits, etc.).

Identification device 324 may be utilized to allow electronic gaming device 100 to determine an identity of a player. Based on information obtained by identification device 324, electronic gaming device 100 may be reconfigured. For example, the language, sound level, music, placement of video streams, placement of images, placement of gaming options, auto-play profiles, auto-play criteria, an auto-play element, an auto-play functionality, and/or the tables utilized may be modified based on player preference data.

For example, a player may have selected a specific baseball team (e.g., Atlanta Braves) under the sporting event preferences, the electronic gaming device 100 may then automatically (or via player input) display the current baseball game (e.g., Atlanta Braves vs. Philadelphia Phillies) onto side display screen 108 and/or an alternate display screen as set in the player's options.

A voucher device 326 may generate, print, transmit, or receive a voucher. The voucher may represent a wagering option, a wagering structure, a wagering timeline, a value of wager, a payout potential, a payout, and/or any other wagering data. A voucher may represent an award, which may be used at other locations inside of the gaming establishment. For example, the voucher may be a coupon for the local buffet or a concert ticket.

Figure 4:
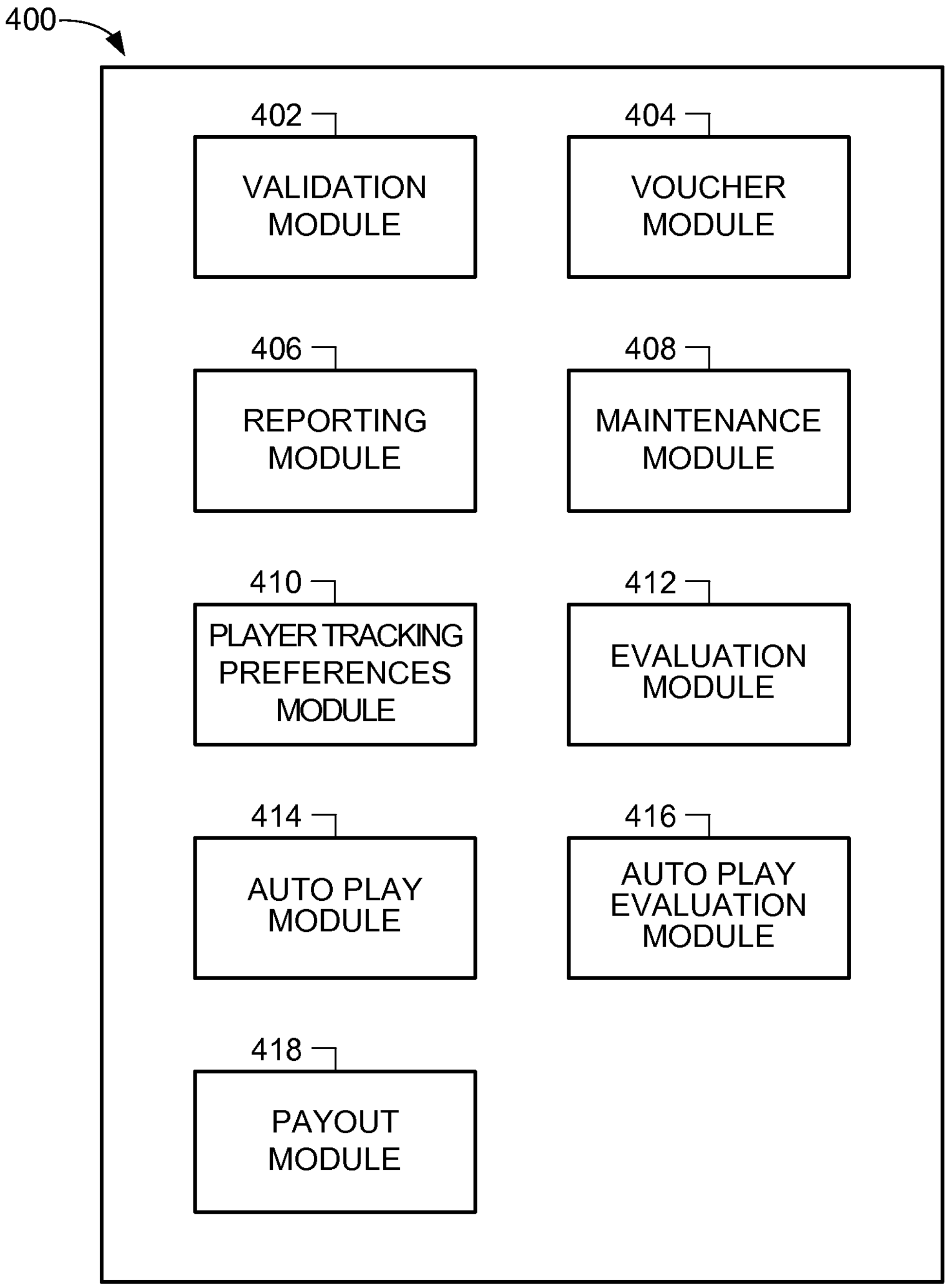
FIG. 4 is another block diagram of the electronic gaming device, according to one embodiment.

FIG. 4 shows a block diagram of memory 304, which includes various modules. Memory 304 may include a validation module 402, a voucher module 404, a reporting module 406, a maintenance module 408, a player tracking preferences module 410, an evaluation module 412, and auto-play module 414, an auto-play evaluation module 416, and/or a payout module 418.

Validation module 402 may utilize data received from voucher device 326 to confirm the validity of the voucher.

Voucher module 404 may store data relating to generated vouchers, redeemed vouchers, bought vouchers, and/or sold vouchers.

Reporting module 406 may generate reports related to a performance of electronic gaming device 100, electronic gaming system 200, video streams, gaming objects, credit device 114, and/or identification device 118.

Maintenance module 408 may track any maintenance that is implemented on electronic gaming device 100 and/or electronic gaming system 200. Maintenance module 408 may schedule preventative maintenance and/or request a service call based on a device error.

Player tracking preferences module 410 may compile and track data associated with a player's preferences.

Evaluation module 412 may evaluate one or more outcomes for one or more events which may not be based on one or more outcomes for one or more auto-play based game play. Evaluation module 422 may evaluate one or more outcomes for one or more events which may be based on one or more outcomes for one or more auto-play based game play.

Auto-play module 414 may generate, compile, track, and/or store data relating to one or more auto-play games, auto-play profiles, auto-play gaming results, and/or any data relating to auto-play. Auto-play module 414 may relate any of this data to one or more players. For example, player 1 may prefer an auto-play gaming profile, which focuses on limiting the amount of money lost. Whereas, player 2 may prefer an auto-play gaming profile, which focuses on doubling up their initial credit amount.

Auto-play evaluation module 416 may evaluate one or more outcomes for one or more events which may be based on one or more outcomes for one or more auto-play based game play.

Payout module 418 may determine one or more payouts which may relate to one or more inputs received from the player, electronic gaming device 100, and/or electronic gaming system 200.

A bonus module may generate a bonus game, evaluate the results of the bonus game, trigger bonus game presentations, generate bonus game payouts, and/or display any data relating to the bonus game.

A presentation generation module may generate the presentation data (e.g., visual and audio) relating to one or more game play options. A presentation module may display one or more of the generated presentations.

It should be noted that one or more modules may be combined into one module. Further, there may be one evaluation module where the determined payout does not depend on whether there were any wild symbols, scatter symbols, and/or any other specific symbols. Further, any module, device, and/or logic function in electronic gaming device 100 may be present in electronic gaming system 200. In addition, any module, device, and/or logic function in electronic gaming system 200 may be present in electronic gaming device 100.

Figure 5A:
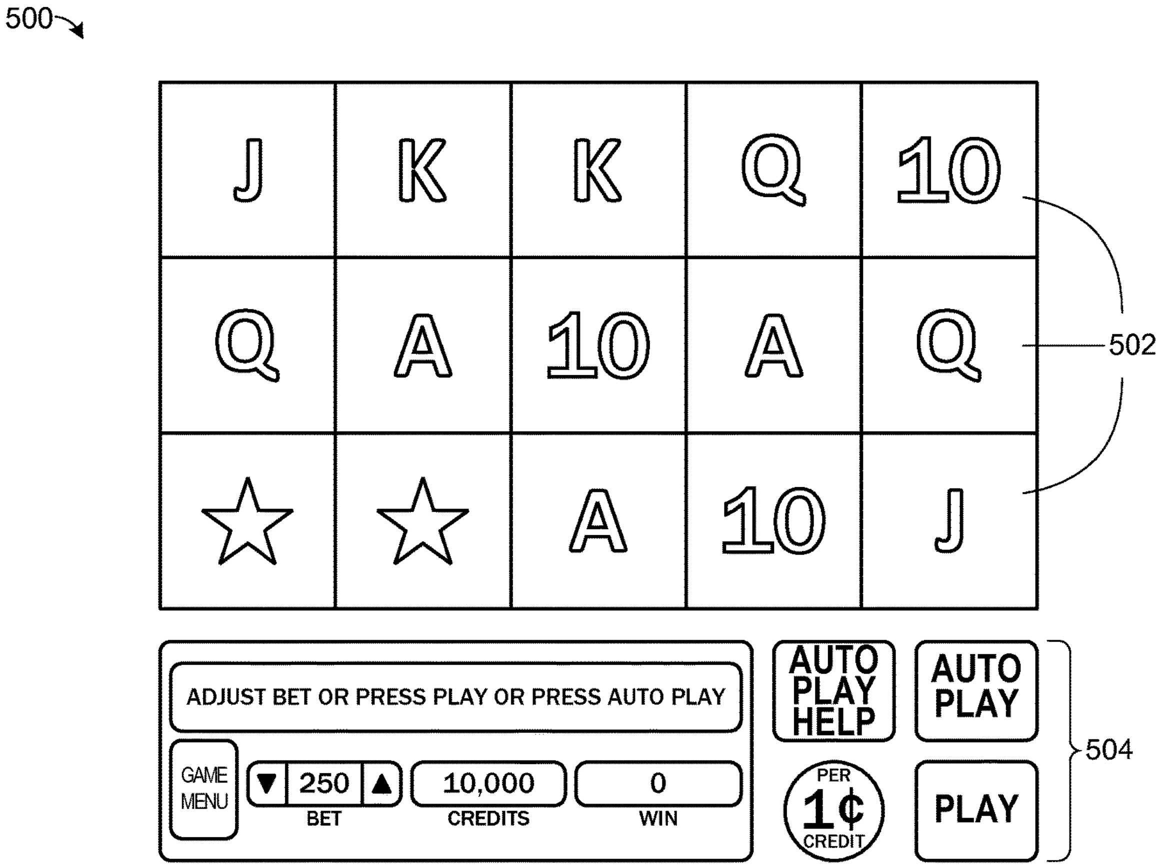
FIG. 5A is an illustration of an auto-play game play with a game menu, according to one embodiment.

FIG. 5A is an illustration of an auto-play game play with a game menu, according to one embodiment. A first image 500 may include a plurality of reels 502 and a game menu area 504. First image 500 may give the player the option to play using an auto-play game option and/or a manual game play option. The auto-play game option may allow the player to initiate auto-play functionality for any number (e.g., one, two, three, ten, etc.) of spins and then turn the auto-play function off. Plurality of reels 502 may contain images. For example, a bar, a number, an icon, a picture, and/or any other image may be utilized. These images may change vertically, horizontally, and/or in any pattern. A game menu area 504 may utilize buttons (and/or display images) to allow the player to select different options (e.g., a player may select the Auto Play button to an auto-play mode, the player may increase or decrease the bet size by using the increase bet button or decrease bet buttons, the player may change the game play increments amount by using the increment button, etc.). Any of these buttons may move in any way (e.g., wiggle, blink, expand, shrink, etc.).

Figure 5B:
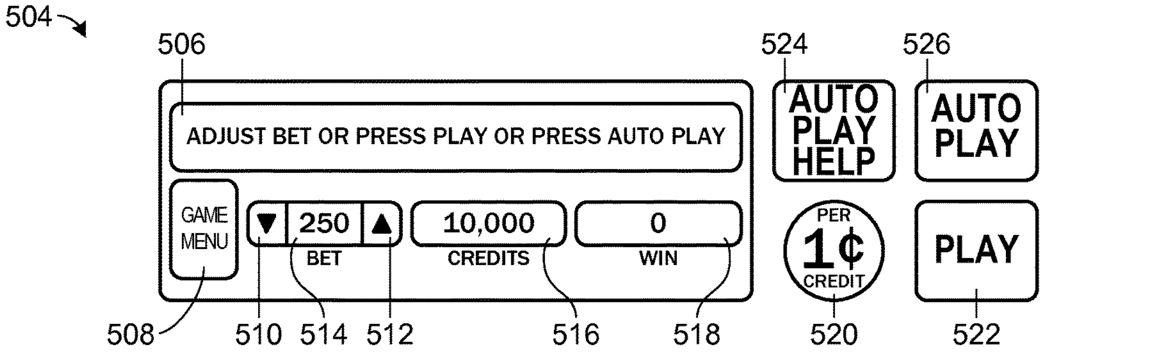
FIG. 5B is an illustration of a game menu, according to one embodiment.

FIG. 5B is an illustration of a game menu, according to one embodiment. Game menu area 504 may include a message area 506, which may state, "adjust bet or press play or press auto play button." Game menu area 504 may also include a game menu button 508, a bet decrease button 510, a current bet amount area 514, an increase bet image 512, a total credit image 516, a total winning amount image 518, an auto play help button 524, an auto play button 526, a bet increment button 520, and a play button 522. Message area 506 may blink, move up and down, may be highlighted, change size, or be manipulated in any other way. The wording in message area 506 may also be changed. Game menu button 508 may be used to take the player to game menu 508 to display and/or change different options for the game. This may include changing the type of game (e.g., lucky sevens across a row may signify a winning combination, a royal flush may signify a winning combination, a row or column of stars may signify a winning combination, changing gaming options, baccarat gaming options, blackjack gaming options, poker gaming options, etc.). The player may also change the settings for the game (e.g., changing the volume of the game, the player preferences on the player's card, the images used on the plurality of reels, etc.), and/or any number of other game choices. Bet decrease button 510 may be used by the player to decrease the current bet by any number increments (e.g., 1, 2, 3, 4, 5, 10, 100, etc.). Current bet amount 514 is the betting amount for the current game (e.g., 1, 5, 10, 50, 250, 255, 300, 400, 500, 1000, etc.). Increase bet button 512 may be used by the player to increase the current bet by any number increments (e.g., 1, 2, 3, 4, 5, 10, 100, etc.). Total credit image 516 may display the credits available to the player at any given time (e.g., if a player has 10,000 credits and then plays a game for 200 credits and losses, the total credit image 516 would display 9,800 credits available). Total winning amount image 518 may display the amount a player has won during the last game play (e.g., if a player has won three games, betting 100 credits each time, the winning amount image 518 would display 100). Auto play help button 524 may give the player instructions on how to use one or more auto-play functions (e.g., instructions for how to turn auto-play mode off, how to engage auto-play mode, different criteria options for auto-play mode, etc.). Auto play button 526 may begin the one or more auto-play functions. Bet increment button 520 may be used to change the betting amount per credit (e.g., 1¢, 5¢, 25¢, 50¢, $1, $5, etc.). Play button 522 may engage electronic gaming device 100 and/or electronic gaming system 200 in normal play mode.

FIG. 5C is an illustration of an auto-play help menu, according to one embodiment. An auto play help 505 image may include one or more parameters 507 and one or more example 509 (e.g., parameter value is indicated by). One example may be if a player wants to set a parameter for a time duration of auto-play to at most 10 minutes. The player may choose any amount of time (e.g., 1 minute, 5 minutes, 10 minutes, 30 minutes, 1 hour, 5 hours, etc.). Another example may be if a player wants to change the parameter relating to positive credits. The auto-play functionality may continue until the player's credits reach a certain chosen amount (e.g., 1, 50, 100, 200, 300, 500, 1000, etc.). Another example may be if a player wants to change the negative credit parameter. The player may select that auto-play mode turns off after his/her credits fall below a certain amount (e.g., 1, 10, 20, 40, 50, 100, 1000, etc.). Another parameter a player may change may be related to a losing streak. For example, the auto-play functionality may be ended if the player does not win for a set amount of straight games (e.g., 1, 5, 10, 15, 20, 30, 50, etc.). Another parameter a player may manipulate may be related to a winning streak. For example, a player may decide to have auto-play functionality turn off after winning a set number of games in a row (e.g., 1, 5, 10, 40, 50, etc.).

In another example, a player may want to set a single winning total amount. This option may turn off the auto-play functionality after a certain number of total winning games (e.g., 1, 5, 10, 15, 20, 50, etc.) are achieved. A player may also want to set the single winning total amount. This option may turn off the auto-play functionality after a single game wins over a certain number of credits (e.g., 1, 10, 50, 100, 200, 500, 1000, etc.). A player may want to set the winning play count amount. This option may turn off the auto-play functionality after a certain total of winning games is achieved (e.g., 1, 5, 10, 15, 20, 50, etc.).

In another example, a player may want to set the losing play count. This option may turn off the auto-play functionality after a certain total of losing games had occurred (e.g., 1, 5, 10, 15, 20, 50, etc.). A player may want to have the auto-play functionality turn off after a certain number of games had been played (e.g., 1, 5, 10, 20, 50, 100, etc.). A player may want to have the auto-play functionality turn off after a certain amount of credits have been spent (e.g., 1, 5, 50, 100, 200, 500, 1000, etc.). A player may want to have the auto-play functionality turn off after a certain percentage lost (e.g., 50 out of 100, 40 out of 60, 3 out of 9, etc.). A player may want to have the auto-play mode turn off after a certain percentage of games have been won (e.g., 50 out of 100, 40 out of 60, 3 out of 9, etc.). A player may want to select the jackpot parameter. This may turn off the auto-play functionality after a certain award has been achieved (e.g., top award, double bonus, triple bonus, progressive, etc.). The auto-play help screen may state that a player may click the auto-play button at any time to turn off the auto-play mode. There may be a verification request to ensure that the player wants to cancel auto-play. For example, do you want to cancel auto-play, if so please press the auto-play button again may be shown on a display. The auto-play help image may explain that a player may select a value for a given parameter from a list of available options. Each parameter may be exclusive, or combined (e.g., A player may combine the auto-play functionality parameters of auto-play continuing for 10 minutes only with the auto-play stopping after the player's credit reaches 200 option. The player may select if they want both criteria to happen before the auto-play turns off, if they want only one to happen before the auto-play turns off, or if they want electronic gaming device 100 and/or electronic gaming system 200 to decide if the criteria should both be met, one met, or a combination of factors before stopping auto-play mode). Electronic gaming device 100 and/or electronic gaming system 200 may select any number of criteria (e.g., 1, 2, 5, 10, etc.) to play together, exclusively, or in some predetermined way. For example, electronic gaming device 100 and/or electronic gaming system 200 may combine the auto-play functionality parameters of auto-play continuing for 10 minutes only with the auto-play stopping after the player's credit reaches 200 option, and with the auto-play continuing until the player has won five games. Electronic gaming device 100 and/or electronic gaming system 200 may be set by the casino or manufacturer to select criteria in a certain order based on the player's identification card, randomly, using the player's history, by a predetermined pattern, shuffle, any combination thereof, and/or any other selection method.

Figure 5D:
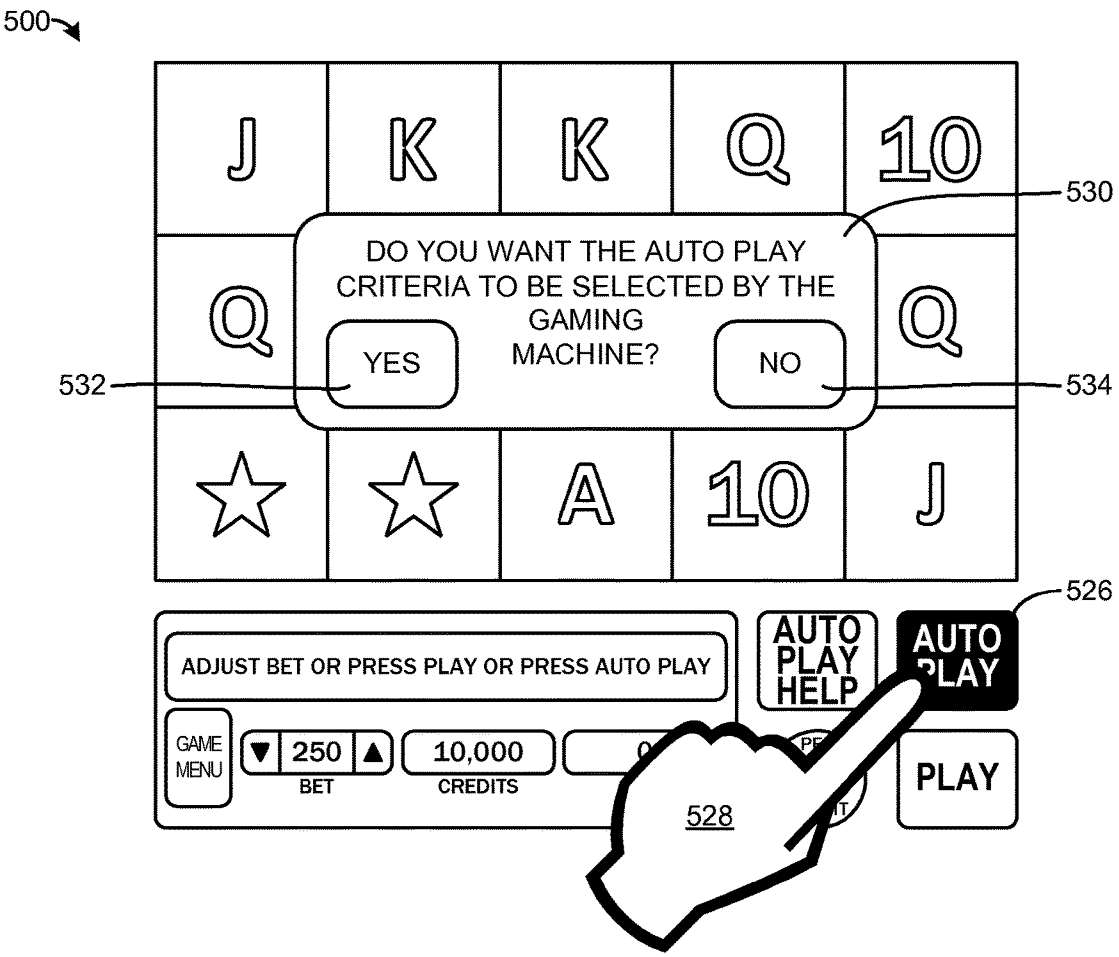
FIG. 5D is an illustration of an auto-play help window, according to one embodiment.

FIG. 5D is an illustration of an auto-play help window with a game menu, according to one embodiment. First image 500 may include a pop-up window 530, a yes button 532, a no button 534, auto-play button 526, and a hand selector icon 528. Hand selector icon 528 may allow a player to select certain buttons on the screen. With the selector the player may click on any of the buttons (e.g., the game menu, auto play help, play, auto play, etc.). Auto-play button 526 may be clicked to begin the auto-play mode. The auto-play functionality option may be offered to only an elite group of players selected by the casino, which could be due to bet size, winning amount, regular attendance, etc. This information may be stored on the player's identification card or in any other location. The auto-play functionality may offer elite prizes, such as special events, concerts, comps, and/or any other prize. Once auto-play 526 button is clicked, pop-up window 530 may ask the player if they want the auto-play criteria to be selected by electronic gaming device 100 and/or electronic gaming system 200. Pop-up window 530 may flash, pulse, and/and/or move in any way. If the player wants electronic gaming device 100 and/or electronic gaming system 200 to determine the type of auto-play functionality, the player may select yes button 532. If the player would like to set their own criteria for auto-play functionality, the player may select no button 534. If a player selects yes button 532, the electronic gaming device 100 and/or electronic gaming system 200 may determine which criteria to use for auto-play functionality. Electronic gaming device 100 and/or electronic gaming system 200 may base this decision on one or more of a player's preferred favorite methods stored on their player's card, a list of profiles saved on the player's card, a preset order, by a predetermined pattern, shuffle, any combination thereof, and/or any other selection method. A player may choose to save certain profiles on their player's card that include certain criteria for auto-play functionality (e.g., Profile 1, Profile 2, Monday Profile, Tuesday Profile, Lucky Profile, etc.). A player may save certain criteria as a profile (e.g., if a player has selected to auto-play for 10 minutes and for the auto-play to continue until a winning streak of 5 straight games, the player may save this criteria as a profile to use at a later time. The player may name the profile "Monday Profile", "Winningest Profile", or any other name. The player may choose any combination of auto-play criteria to save as a profile). Once the player selects yes button 532, electronic gaming device 100 and/or electronic gaming system 200 may list the auto-play functionality criteria that is about to be played. The player may then say if they would like to continue, or if they would like to change the auto-selected criteria (e.g., for example, the player selects yes button 532 and electronic gaming device 100 and/or electronic gaming system 200 may state the game criteria is going to be continuous play until 20 losing games in a row. The player may then agree to this, ask electronic gaming device 100 and/or electronic gaming system 200 to choose different criteria, or select criteria of their own).

Figure 6A:
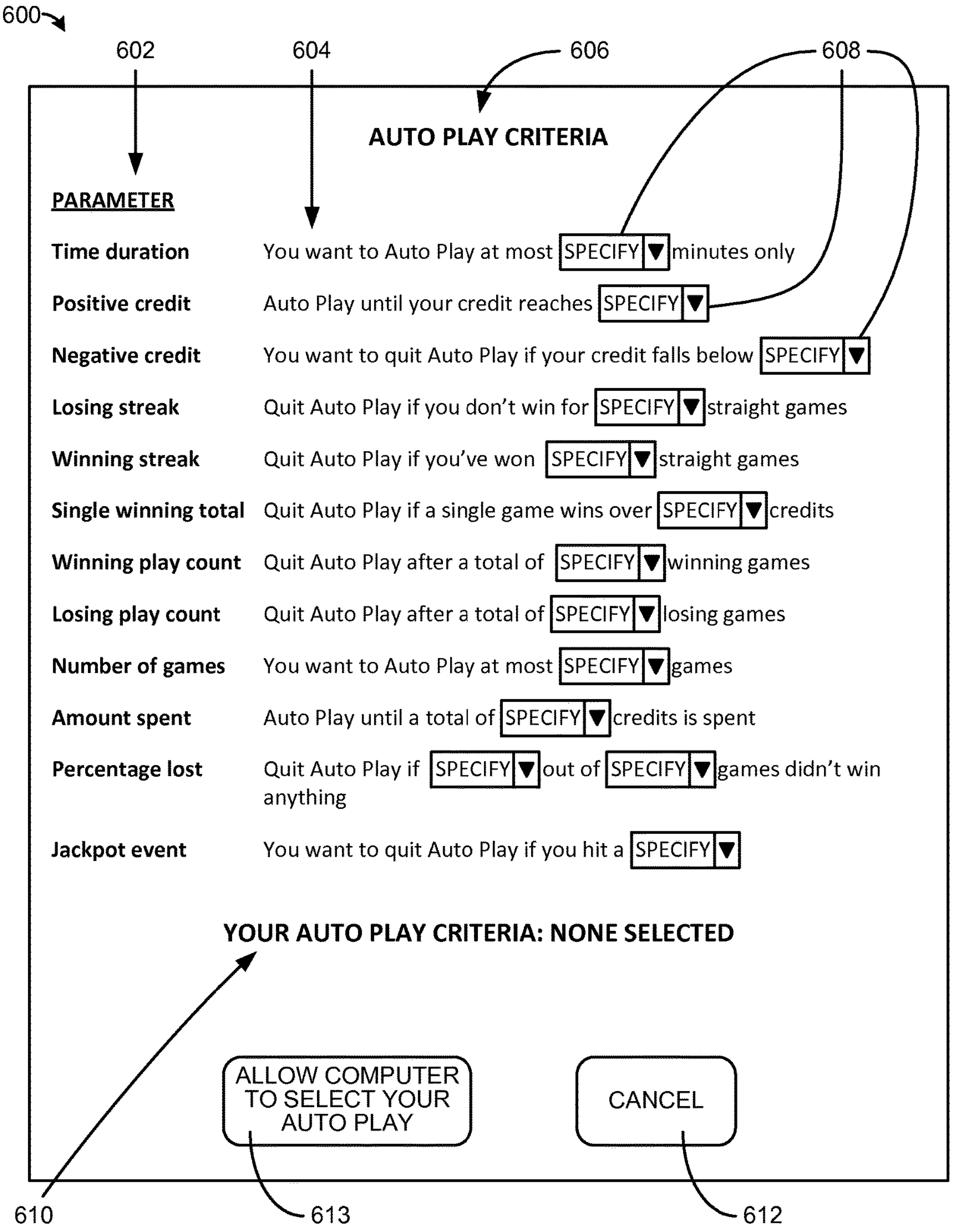
FIG. 6A is an illustration of an auto-play criteria menu, according to one embodiment.

FIG. 6A is another illustration of an auto-play criteria menu, according to one embodiment. A second image 600 may include an auto-play criteria 606, parameters 602, an example of each parameter 604, one or more drop-down menus 608, a selected criteria 610, a computer select auto-play button 613, and a cancel button 612. Auto-play criteria 606 may be a menu of options a player may choose from in order to adapt their auto-play functionality experience. Any combination of parameters may be selected for play. Parameters 602 may include one or more of a time duration, a positive credit, a negative credit, a losing streak, a winning streak single winning total, a winning play count, a losing play count, number of games, an amount spent, a percentage lost, and a jackpot event. One or more drop-down menus 608 may represent a pull-down menu, a fill-in area, a voice-recognition box, and/or any other data entry image. An example of each parameter 604 may include the player wants to auto-play at most _X_minutes only (e.g., X=1, 5, 10, 70, 500, 1000, 10000, etc.), auto-play until your credit reaches _X_ (e.g., X=1, 5, 10, 70, 500, 1000, 10000, etc.), you want to quit auto-play if your credit falls below _X_ (e.g., X=1, 5, 10, 70, 500, 1000, 10000, etc.), quit auto-play if you don't win for _X_straight games (e.g., X=1, 5, 10, 70, 500, 1000, 10000, etc.), quit auto-play if you've won _X_straight games (e.g., X=1, 5, 10, 70, 500, 1000, 10000, etc.), quit auto-play if a single game wins over _X_credits (e.g., X=1, 5, 10, 70, 500, 1000, 10000, etc.), quit auto-play after a total of _X_winning games (e.g., X=1, 5, 10, 70, 500, 1000, 10000, etc.), quit auto-play after a total of _X_losing games (e.g., X=1, 5, 10, 70, 500, 1000, 10000, etc.), you want to auto-play at most _X_games (e.g., X=1, 5, 10, 70, 500, 1000, 10000, etc.), auto-play until a total of _X_credits is spent (e.g., X=1, 5, 10, 70, 500, 1000, 10000, etc.), quit auto-play if _X_out of _Y_games didn't win anything (e.g., X=1, 5, 10, 70, 500, 1000, 10000, etc. and Y=2, 3, 4, 9, 15, 50, 100, 500, 5000, etc.), and you want to quit auto-play if you hit a jackpot. The player may select one parameter, any combination of any of the parameters, and/or ask electronic gaming device 100 and/or electronic gaming system 200 to chose the parameters before beginning auto-play (e.g., The player may select quit auto-play if you've won _X_straight games option and also you want to auto-play at most _Y_games option (e.g., X=1, 5, 10, 70, 500, 1000, 10000, etc. and Y=2, 3, 4, 9, 15, 50, 100, 500, 5000, etc.). The game may play until whichever of the parameters happens first and then turn-off the auto-play mode, or the game may be set to continue playing until all events have been finished).

In another example, the player may select that electronic gaming device 100 and/or electronic gaming system 200 chooses the criteria for the auto-play functionality. Electronic gaming device 100 and/or electronic gaming system 200 may chose one parameter, more than one parameter, a combination of parameters that may be needed to be completed before the auto-play mode turns off, a number of parameters where only one needs to be satisfied before the auto-play functionality turns off, a saved profile from the player's identification card, a predetermined assigned order, by a predetermined pattern, shuffle, any combination thereof, and/or any other selection method.

Electronic gaming device 100 and/or electronic gaming system 200 may chose that all criteria need to be satisfied, only a select number of criteria need to be satisfied, only specific criteria need to be satisfied, and/or only one criteria needs to be satisfied before the auto-play functionality may turn off (e.g., electronic gaming device 100 and/or electronic gaming system 200 may chose the criteria: you want to auto-play at most _35_minutes only, auto-play until your credit reaches _550_, you want to quit auto-play if your credit falls below _3_, quit auto-play if you don't win for _15_straight games, quit auto-play if you've won _30_straight games, quit auto-play if a single game wins over _8000_credits, quit auto-play after a total of _70_winning games, quit auto-play after a total of _50 _losing games, you want to auto-play at most _80_games, auto-play until a total of _400_credits is spent, quit auto-play if _30_out of _100_games didn't win anything, and you want to quit auto-play if you hit a _progressive jackpot_. Electronic gaming device 100 and/or electronic gaming system 200 may chose all of the parameters to be satisfied before the auto-play functionality may turn off).

The player may select all of the criteria. The player may set the criteria to all need to be satisfied, only a select number need to be satisfied, only specific criteria need to be satisfied, and/or only one criteria needs to be satisfied before the auto-play functionality may turn off (e.g. a player may chose the criteria: you want to auto-play at most _35_minutes only, auto-play until your credit reaches _550_, you want to quit auto-play if your credit falls below _3_, quit auto-play if you don't win for _15_straight games, quit auto-play if you've won _30_straight games, quit auto-play if a single game wins over _8000_credits, quit auto-play after a total of _70_winning games, quit auto-play after a total of _50 _losing games, you want to auto-play at most 80_games, auto-play until a total of _400_credits is spent, quit auto-play if _30_out of _100_games didn't win anything, and you want to quit auto-play if you hit a _progressive jackpot_. The player may chose that the first criteria satisfied may turn off the auto-play functionality. The player may also choose that all of the criteria need to be satisfied before the auto-play mode may turn off. The player may also choose that only a few of the criteria need to be satisfied before the auto-play functionality turn off).

The player may use drop-down menu 608 to select the amount from the options listed (e.g., 5, 10, 30, 50, 100, etc.). Drop-down menu 608 may be a pull-down menu, a fill-in area, a voice-recognition box, and/or any other data entry image. Selected criteria 610 may list which parameters have been selected (e.g., if the player has selected drop-down menu 608 in the first parameter for 5 minutes, selected criteria 610 may read, "You want to auto-play at most 5 minutes only"). Selected criteria 610 may also list the parameters as an and/or option (e.g., if the player wants the parameters to be for the auto-play to continue for 5 minutes only or for the game to quit after hitting the jackpot event, the player may select the two parameters and change the auto-play from "and" to "or" to allow the auto-play to turn off with either of the two parameters. A player may also determine that they want electronic gaming device 100 and/or electronic gaming system 200 to decide if the criteria should both be satisfied, one criteria satisfied, and/or a combination of criteria satisfied before the auto-play functionality turns off). Selected criteria 610 may state, "None Selected," until a parameter has been selected.

Computer select auto-play button 613 may be pressed if a player would like electronic gaming device 100 and/or electronic gaming system 200 to determine the criteria for the game to play in auto-play mode. Electronic gaming device 100 and/or electronic gaming system 200 may determine that all criteria needs to be satisfied, only a select number of criteria needs to be satisfied, only specific criteria needs to be satisfied, and/or only one criteria needs to be satisfied before the auto-play functionality may turn off (e.g., the player may select computer select auto-play button 613 if the player would like electronic gaming device 100 and/or electronic gaming system 200 to determine the criteria for auto-play functionality. The computer may select for auto-play to continue for 5 minutes only or for the game to quit after hitting the jackpot event. In another example, electronic gaming device 100 and/or electronic gaming system 200 may determine the criteria to be that auto-play continues for 15 minutes only and for the game to quit after winning a total of 20 games).

Cancel button 612 may be clicked if the player determines they do not want to decide on the auto-play functionality options. This may take the player back to the main screen.

Figure 6B:
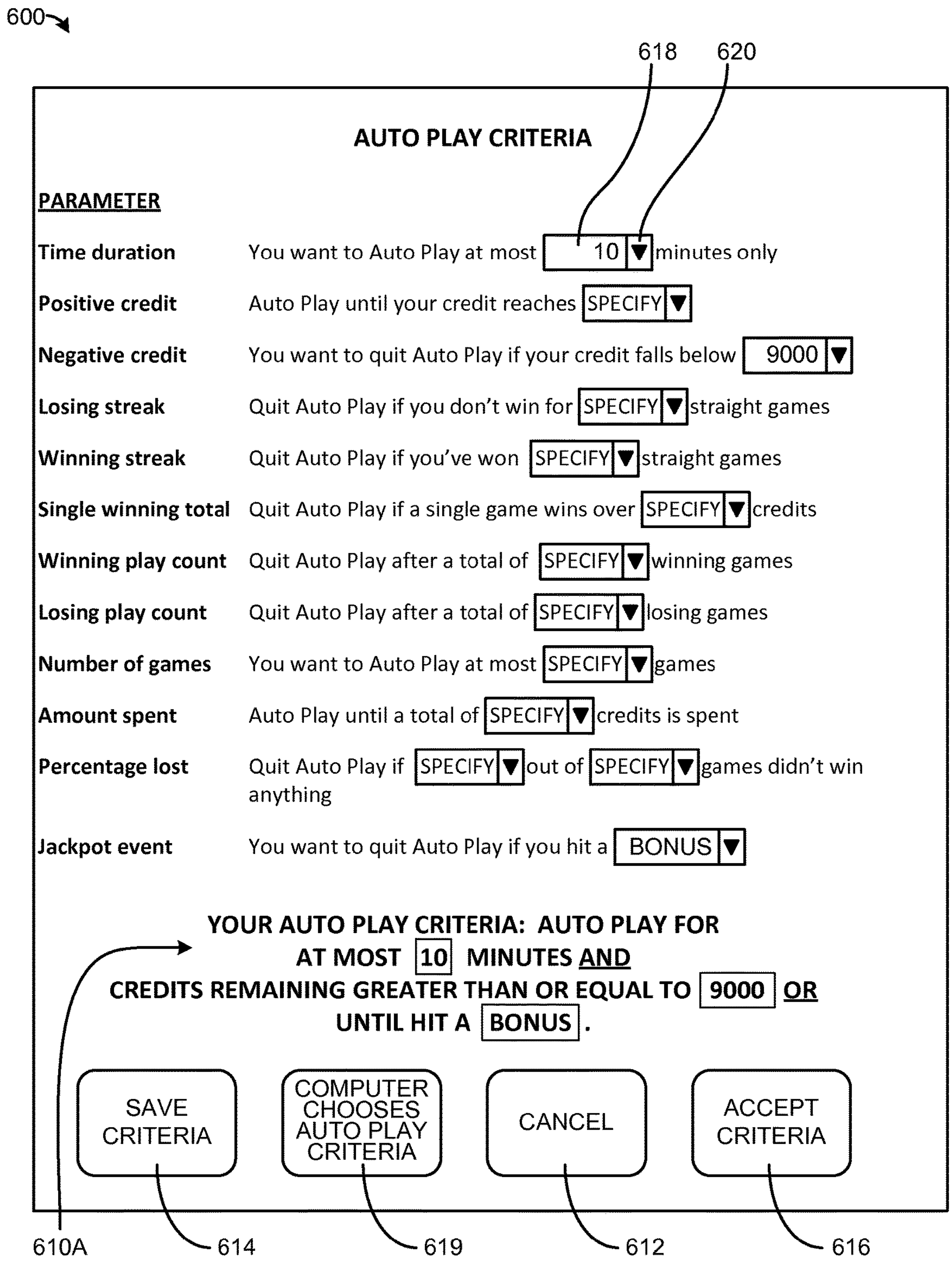
FIG. 6B is another illustration of an auto-play criteria menu, according to one embodiment.

FIG. 6B is another illustration of an auto-play criteria menu, according to one embodiment. Second image 600 may include the auto-play criteria, the parameters and examples, drop-down menu 620, a chosen criteria 618, a listed criteria 610A, a save criteria button 614, a computer choose auto-play criteria 619, cancel button 612, and an accepted criteria 616. Auto-play criteria may be a menu of options a player may choose from in order to adapt their auto-play functionality experience. Any combination of parameters may be selected for play. Parameters may include one or more of a time duration, a positive credit, a negative credit, a losing streak, a winning streak single winning total, a winning play count, a losing play count, number of games, an amount spent, a percentage lost, and a jackpot event. One or more drop-down menus 608 may represent a pull-down menu, a fill-in area, a voice-recognition box, and/or any other data entry image. An example of each parameter 604 may include the player wants to auto-play at most _X_minutes only (e.g., X=1, 5, 10, 70, 500, 1000, 10000, etc.), auto-play until your credit reaches _X_ (e.g., X=1, 5, 10, 70, 500, 1000, 10000, etc.), you want to quit auto-play if your credit falls below _X_ (e.g., X=1, 5, 10, 70, 500, 1000, 10000, etc.), quit auto-play if you don't win for _X_straight games (e.g., X=1, 5, 10, 70, 500, 1000, 10000, etc.), quit auto-play if you've won _X_straight games (e.g., X=1, 5, 10, 70, 500, 1000, 10000, etc.), quit auto-play if a single game wins over _X_credits (e.g., X=1, 5, 10, 70, 500, 1000, 10000, etc.), quit auto-play after a total of _X_winning games (e.g., X=1, 5, 10, 70, 500, 1000, 10000, etc.), quit auto-play after a total of _X_losing games (e.g., X=1, 5, 10, 70, 500, 1000, 10000, etc.), you want to auto-play at most _X_games (e.g., X=1, 5, 10, 70, 500, 1000, 10000, etc.), auto-play until a total of _X_credits is spent (e.g., X=1, 5, 10, 70, 500, 1000, 10000, etc.), quit auto-play if _X_out of _Y_games didn't win anything (e.g., X=1, 5, 10, 70, 500, 1000, 10000, etc. and Y=2, 3, 4, 9, 15, 50, 100, 500, 5000, etc.), and you want to quit auto-play if you hit a jackpot. The player may select one parameter, any combination of any of the parameters, and/or ask electronic gaming device 100 and/or electronic gaming system 200 to choose the parameters before beginning auto-play (e.g., The player may select quit auto-play if you've won _X_straight games option and also you want to auto-play at most _Y_games option (e.g., X=1, 5, 10, 70, 500, 1000, 10000, etc. and Y=2, 3, 4, 9, 15, 50, 100, 500, 5000, etc.). The game may play until whichever of the parameters happens first and then turn-off the auto-play mode, or the game may be set to continue playing until all events have been finished).

The player may select one or a combination of any of these parameters before beginning auto-play functionality (e.g., the player may select quit auto-play if you've won _40_straight games and also you want to auto-play at most _20_games, etc.,). Electronic gaming device 100 and/or electronic gaming system 200 may play until one of the parameters is satisfied and then turn-off the auto-play mode, or electronic gaming device 100 and/or electronic gaming system 200 may be set to continue playing until all criteria have been satisfied. Electronic gaming device 100 and/or electronic gaming system 200 may also be set to decide if the criteria should both be met, one met, and/or a combination of factors before stopping auto-play). The player may use drop-down menu 620 to select an amount from the options listed (e.g., 1, 5, 10, 30, 100, 9000 etc.). Once a player has selected from drop-down menu 620, the amount may be displayed in chosen criteria 618 (e.g., if the player has selected drop-down menu 620 in the first parameter for 5 minutes, the first parameter may be set as, "You want to auto-play at most 5 minutes only"). Listed criteria 610A may display what the player has selected as their auto-play criteria (e.g., Auto-play for at most 10 minutes). The player may choose as many parameters as desired. The player may also set the criteria in combination with each other, and/or set the criteria against each other (e.g., auto-play for at most 10 minutes and credits remaining greater than or equal to 9000 or until hit a bonus), and/or the player may select that electronic gaming device 100 and/or electronic gaming system 200 determines if the criteria should both be met, one met, and/or a combination of factors before the auto-play functionality turns off. Any number of criteria may be set in combination and/or against each other.

Save criteria button 614 may allow the player to save their chosen criteria into a profile, which may be used at a later time by using their player's card. The casino, electronic gaming device 100, and/or electronic gaming system 200 may decide that only the elite players may have the ability to save different profiles. The casino, electronic gaming device 100, and/or electronic gaming system 200 may determine if a certain number of profiles are saved, the player may be awarded different things in order to encourage players to continuously use their profiles and/or to enhance their playing experience (e.g., a casino may award a player 20 comps if the player saves five or more profiles onto their player's card).

Computer choose auto-play criteria 619 may be pressed if a player would like electronic gaming device 100 and/or electronic gaming system 200 to determine the criteria for the game to play in auto-play mode. Electronic gaming device 100 and/or electronic gaming system 200 may determine that all criteria needs to be satisfied, only a select number of criteria needs to be satisfied, only specific criteria needs to be satisfied, and/or only one criteria needs to be satisfied before the auto-play functionality may turn off (e.g. for example, the player may select computer choose auto-play criteria 619 if the player would like electronic gaming device 100 and/or electronic gaming system 200 to determine the criteria for auto-play functionality. Electronic gaming device 100 and/or electronic gaming system 200 may select for auto-play to continue for 5 minutes only or for the game to quit after hitting the jackpot event. In another example, electronic gaming device 100 and/or electronic gaming system 200 may determine the criteria to be that auto-play continues for 15 minutes only and for the game to quit after winning a total of 20 games).

Cancel button 612 may allow the player to close the auto-play criteria window and return to the main screen. Accepted criteria button 616 may allow the player to select their chosen criteria and begin the auto-play mode.

Figure 6C:
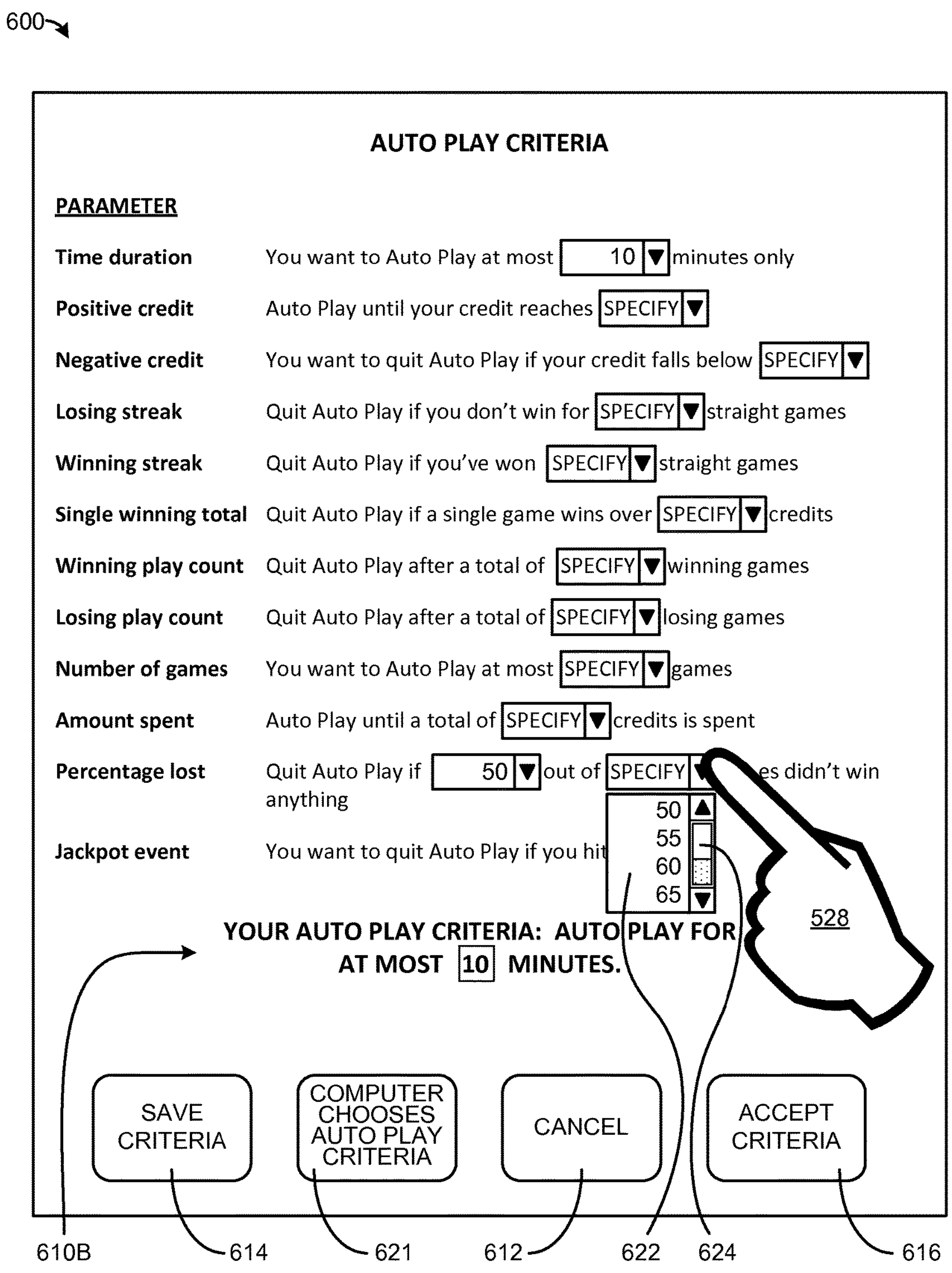
FIG. 6C is another illustration of an auto-play criteria menu, according to one embodiment.

FIG. 6C is an illustration of an auto-play criteria menu, according to one embodiment. Second image 600 may include the auto-play criteria, the parameters and examples, a drop-down list 622, a scroll button 624, hand icon 528, a chosen criteria 610B, a computer choose auto-play criteria 621, save criteria button 614, cancel button 612, and accepted criteria 616. Auto-play criteria may be a menu of options a player may choose from in order to adapt an auto-play mode experience. Any combination of parameters may be selected for play. Parameters may include one or more of a time duration, a positive credit, a negative credit, a losing streak, a winning streak single winning total, a winning play count, a losing play count, number of games, an amount spent, a percentage lost, and a jackpot event. One or more drop-down menus 608 may represent a pull-down menu, a fill-in area, a voice-recognition box, and/or any other data entry image. An example of each parameter 604 may include the player wants to auto-play at most _X_minutes only (e.g., X=1, 5, 10, 70, 500, 1000, 10000, etc.), auto-play until your credit reaches _X_ (e.g., X=1, 5, 10, 70, 500, 1000, 10000, etc.), you want to quit auto-play if your credit falls below _X_ (e.g., X=1, 5, 10, 70, 500, 1000, 10000, etc.), quit auto-play if you don't win for _X_straight games (e.g., X=1, 5, 10, 70, 500, 1000, 10000, etc.), quit auto-play if you've won _X_straight games (e.g., X=1, 5, 10, 70, 500, 1000, 10000, etc.), quit auto-play if a single game wins over _X_credits (e.g., X=1, 5, 10, 70, 500, 1000, 10000, etc.), quit auto-play after a total of _X_winning games (e.g., X=1, 5, 10, 70, 500, 1000, 10000, etc.), quit auto-play after a total of _X_losing games (e.g., X=1, 5, 10, 70, 500, 1000, 10000, etc.), you want to auto-play at most _X_games (e.g., X=1, 5, 10, 70, 500, 1000, 10000, etc.), auto-play until a total of _X_credits is spent (e.g., X=1, 5, 10, 70, 500, 1000, 10000, etc.), quit auto-play if _X_out of _Y_games didn't win anything (e.g., X=1, 5, 10, 70, 500, 1000, 10000, etc. and Y=2, 3, 4, 9, 15, 50, 100, 500, 5000, etc.), and you want to quit auto-play if you hit a jackpot. The player may select one parameter, any combination of any of the parameters, and/or ask electronic gaming device 100 and/or electronic gaming system 200 to choose the parameters before beginning auto-play (e.g., The player may select quit auto-play if you've won _X_straight games option and also you want to auto-play at most _Y_games option (e.g., X=1, 5, 10, 70, 500, 1000, 10000, etc. and Y=2, 3, 4, 9, 15, 50, 100, 500, 5000, etc.). The game may play until whichever of the parameters happens first and then turn-off the auto-play mode, or the game may be set to continue playing until all events have been finished).

Electronic gaming device 100 and/or electronic gaming system 200 may play until one of the parameters is satisfied and then turn-off the auto-play mode, and/or the game may be set to continue playing until all the events have been satisfied, and/or the game may be set to continue playing until a select number of parameters have been satisfied). The player may use drop-down list 622 to select an amount from the options listed (e.g., 1, 5, 10, 30, 55, 60, 100, etc.). Scroll button 624 may allow the player to see where they are on drop-down list 622, and may allow the player to use the up and down arrows to search the entire list of options (e.g., if a player can see 50, 55, 60, and 65, they may use the down arrow to also uncover options 70, 75, 80, 100). Hand icon 528 may allow a player to hover over an option and click on the desired option (e.g., If a player wants to select save criteria button 614, they may move hand icon 528 until it is over save criteria button 614 and then click the button). Once a player has selected from drop-down list 622, the amount may be displayed in chosen criteria 610B. Chosen criteria 610B may display what the player has selected as their auto-play criteria (e.g., auto-play for at most 10 minutes). The player may choose as many parameters as desired, and once a second option has been added, electronic gaming device 100 and/or electronic gaming system 200 may ask if the player wants the second in combination with the first, to set the two opposing each other, or to allow electronic gaming device 100 and/or electronic gaming system 200 to decide (e.g., if the player has selected auto-play for 10 minutes only and quit auto-play after a total of 4 winning games, and has selected the two criteria opposing each other, electronic gaming device 100 and/or electronic gaming system 200 may quit either after 10 minutes or 4 winning games, whichever occurs first. If a player selected auto-play for 10 minutes only and quit auto-play after a total of 4 winning games, and has selected the two criteria combining with each other, electronic gaming device 100 and/or electronic gaming system 200 may quit auto-play when both 10 minutes has elapsed and 4 winning games).

Computer choose auto-play criteria 621 may be pressed if a player would like electronic gaming device 100 and/or electronic gaming system 200 to determine the criteria for the game to play in auto-play mode. Electronic gaming device 100 and/or electronic gaming system 200 may select an auto-play functionality. Electronic gaming device 100 and/or electronic gaming system 200 may select one of the profiles off of the player's card, use the player's history to determine the parameter that would take the player the longest to complete, randomly select criteria, use a predetermined pattern, shuffle, any combination thereof, and/or any other selection method. Electronic gaming device 100 and/or electronic gaming system 200 may determine that all criteria needs to be satisfied, only a select number of criteria needs to be satisfied, only specific criteria needs to be satisfied, and/or only one criteria needs to be satisfied before the auto-play functionality may turn off (e.g. electronic gaming device 100 and/or electronic gaming system 200 may select for auto-play to continue for 5 minutes only or for the game to quit after hitting the jackpot event, which may be on the player's card as Profile One. In another example, electronic gaming device 100 and/or electronic gaming system 200 may determine the criteria to be that auto-play continues for 15 minutes only and for the game to quit after winning a total of 20 games, which may be the player's preferred auto-play mode. In another example, electronic gaming device 100 and/or electronic gaming system 200 may determine the criteria to be that auto-play continues for 15 minutes only and for the game to quit after winning a total of 20 games).

Save criteria button 614 may allow the player to save their chosen criteria into a profile. Profiles may be used at a later time when accessed by the player's identification card. The casino, electronic gaming device 100, and/or electronic gaming system 200 may decide that only the elite players may have the ability to save different profiles. The casino, electronic gaming device 100, and/or electronic gaming system 200 may determine if a certain number of profiles are saved, the player may be awarded different things in order to encourage players to continuously use their profiles and/or to enhance their playing experience (e.g., a casino may award a player 20 comps if the player saves five or more profiles onto their player's card). Cancel button 612 may allow the player to turn off the auto-play criteria window and return to the main screen. Accepted criteria 616 may allow the player to select their chosen criteria and begin the auto-play mode.

Figure 6D:
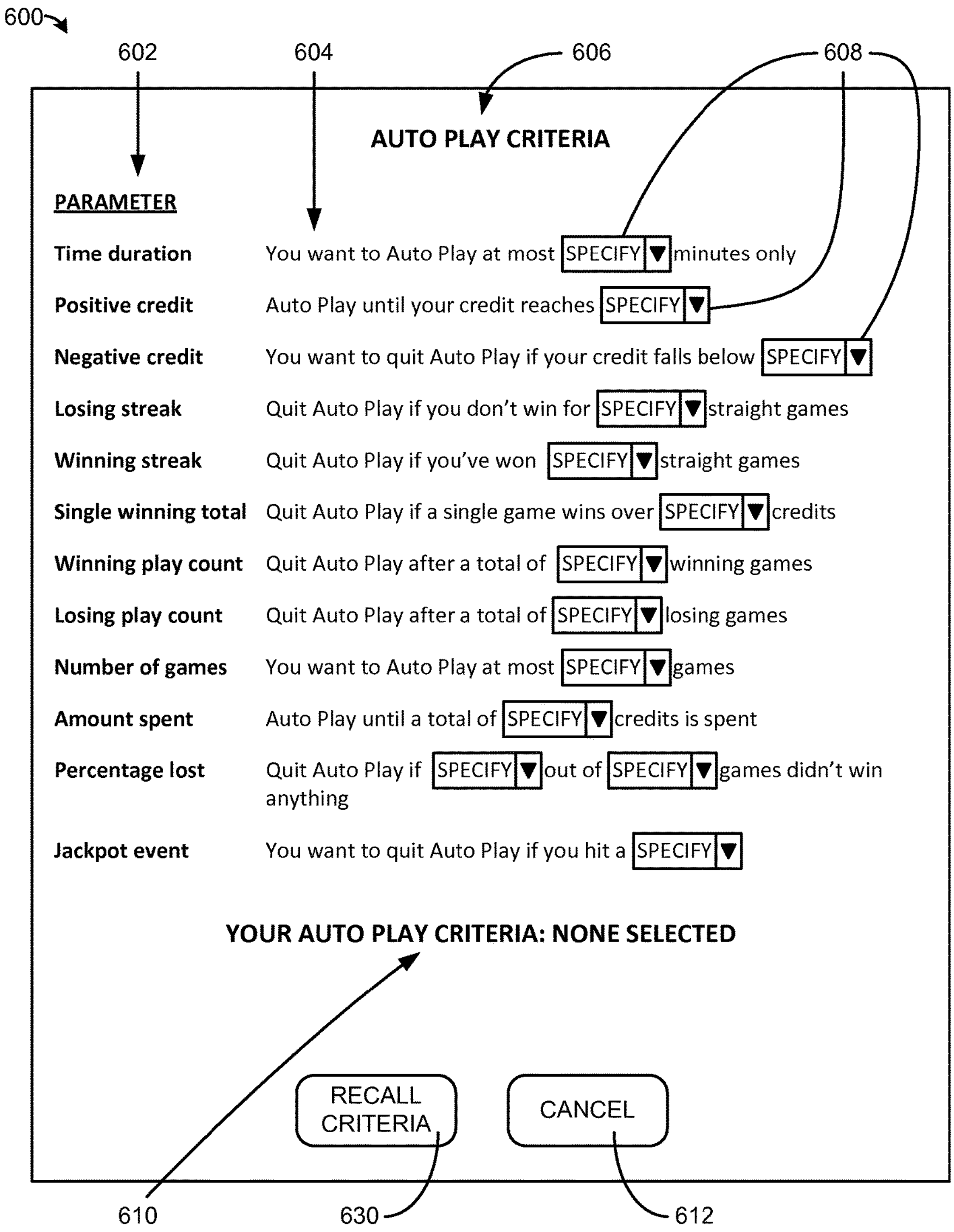
FIG. 6D is another illustration of an auto-play criteria menu, according to one embodiment.

FIG. 6D is an illustration of an auto-play criteria menu, according to one embodiment. Second image 600 may include auto-play criteria 606, parameters 602, examples 604, drop-down list 608, chosen criteria 610, recall criteria button 630, and cancel button 612. Auto-play criteria 606 may be a menu of parameters 602 that a player may choose from in order to manipulate the auto-play functionality. Any combination of parameters 602 may be selected for play. Parameters 602 may include may include one or more of a time duration, a positive credit, a negative credit, a losing streak, a winning streak single winning total, a winning play count, a losing play count, number of games, an amount spent, a percentage lost, and a jackpot event. One or more drop-down menus 608 may represent a pull-down menu, a fill-in area, a voice-recognition box, and/or any other data entry image. An example of each parameter 604 may include the player wants to auto-play at most _X_minutes only (e.g., X=1, 5, 10, 70, 500, 1000, 10000, etc.), auto-play until your credit reaches _X_ (e.g., X=1, 5, 10, 70, 500, 1000, 10000, etc.), you want to quit auto-play if your credit falls below _X_ (e.g., X=1, 5, 10, 70, 500, 1000, 10000, etc.), quit auto-play if you don't win for _X_straight games (e.g., X=1, 5, 10, 70, 500, 1000, 10000, etc.), quit auto-play if you've won _X_straight games (e.g., X=1, 5, 10, 70, 500, 1000, 10000, etc.), quit auto-play if a single game wins over _X_ credits (e.g., X=1, 5, 10, 70, 500, 1000, 10000, etc.), quit auto-play after a total of _X_winning games (e.g., X=1, 5, 10, 70, 500, 1000, 10000, etc.), quit auto-play after a total of _X_losing games (e.g., X=1, 5, 10, 70, 500, 1000, 10000, etc.), you want to auto-play at most _X_games (e.g., X=1, 5, 10, 70, 500, 1000, 10000, etc.), auto-play until a total of _X_credits is spent (e.g., X=1, 5, 10, 70, 500, 1000, 10000, etc.), quit auto-play if _X_out of _Y_games didn't win anything (e.g., X=1, 5, 10, 70, 500, 1000, 10000, etc. and Y=2, 3, 4, 9, 15, 50, 100, 500, 5000, etc.), and you want to quit auto-play if you hit a jackpot. The player may select one parameter, any combination of any of the parameters, and/or ask electronic gaming device 100 and/or electronic gaming system 200 to choose the parameters before beginning auto-play (e.g., The player may select quit auto-play if you've won _X_straight games option and also you want to auto-play at most _Y_games option (e.g., X=1, 5, 10, 70, 500, 1000, 10000, etc. and Y=2, 3, 4, 9, 15, 50, 100, 500, 5000, etc.). The game may play until whichever of the parameters happens first and then turn-off the auto-play mode, and/or the game may be set to continue playing until all events have been finished). The player may select one or a combination of any of parameters examples 604 before beginning the auto-play mode (e.g., the player may select "quit auto-play if you've won _X_straight games" and also "you want to auto-play at most _Y_games". Electronic gaming device 100 and/or electronic gaming system 200 may play until whichever of the parameters happens first and then turn-off the auto-play mode, or electronic gaming device 100 and/or electronic gaming system 200 may be set to continue playing until all the events have finished, or electronic gaming device 100 and/or electronic gaming system 200 may be set to determine the auto-play criteria). The player may use drop-down list 608 to select the amount from the options available (e.g., 1, 5, 10, 30, 55, 60, 100, etc.). Once a player has selected from drop-down list 608, the amount may be displayed in chosen criteria 610. Chosen criteria 610 may display what the player has selected as their auto-play criteria (e.g., auto-play for at most 10 minutes). The player may choose as many parameters as desired. When a second option has been added, electronic gaming device 100 and/or electronic gaming system 200 may ask if the player wants the second in combination with the first or to set the two opposing each other (e.g., if the player has selected "auto-play for 10 minutes only" and "quit auto play after a total of 4 winning games", and has selected the two criteria opposing each other, electronic gaming device 100 and/or electronic gaming system 200 may quit auto-play either after 10 minutes or 4 winning games, whichever happens first. If a player selected "auto-play for 10 minutes only" and "quit auto play after a total of 4 winning games", and has selected the two criteria combining with each other. Electronic gaming device 100 and/or electronic gaming system 200 may quit when it had been both 10 minutes and 4 winning games).

Chosen criteria 610 may read "None Selected" until the player has changed one of example 604 drop-drown list 608. Recall criteria button 630 may reset all of the drop-down lists 608 to "Specify" (e.g., if a player has chosen one drop-down lists 608, but then changes his mind, the player may click on recall criteria button 630 to reset all of the options). Any number of examples 604 may be filled in before hitting recall criteria button 630. Once recall criteria button 630 has been clicked, all drop-down lists 608 may return to stating, "Specify". This feature may allow players to put in various criteria into drop-down list 608 to see how it looks on chosen criteria 610 before playing with the understanding that they can easily erase all of the chosen parameters (e.g., a player has selected "auto-play until a total of 10 credits are spent" and "auto-play until a total of 4 winning games." The information is listed in the player's chosen criteria 610. The player may then click on recall criteria button 630 to reset all of the options. Chosen criteria 610 may state, "Non Selected," until the player makes a new selection). Cancel button 612 may allow the player to turn off the auto-play criteria window and return to the main screen.

Figure 6E:
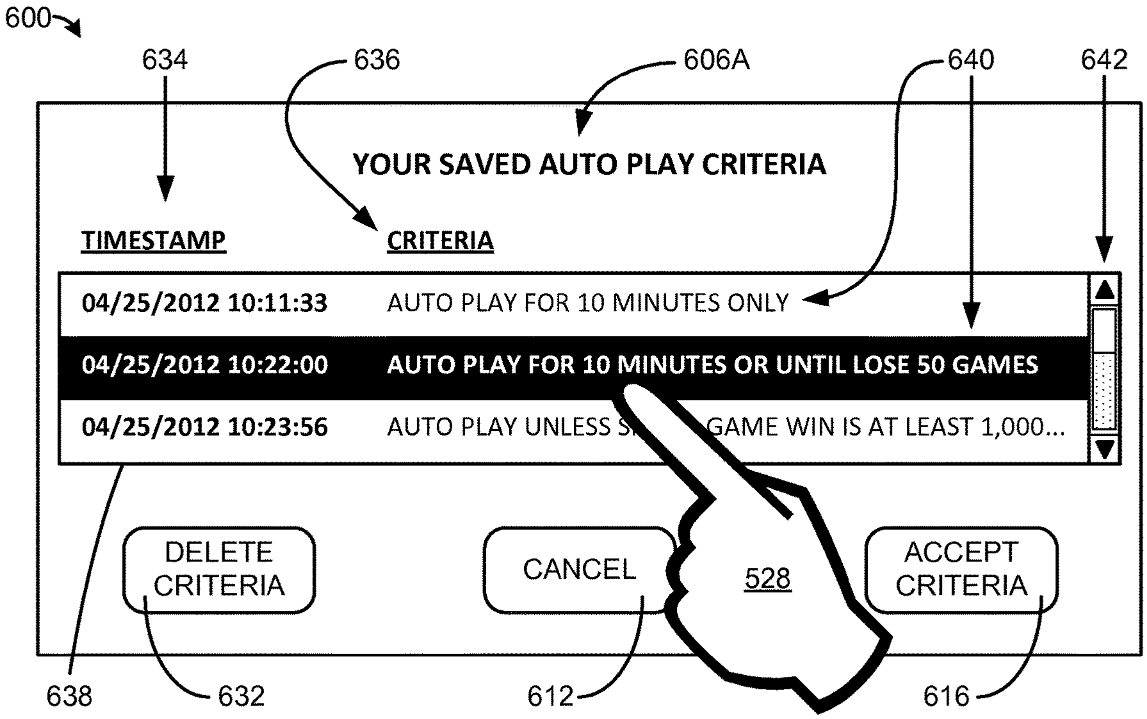
FIG. 6E is an illustration of a saved auto-play criteria menu, according to one embodiment

FIG. 6E is an illustration of a saved auto-play criteria menu, according to one embodiment. Second image 600 may include a saved auto-play criteria 606A, a time stamp 634, a criteria 636, a criteria window 638, a profile name one 637, a profile name two 635, a profile criteria list 640, a scroll bar 642, hand icon 528, a delete criteria button 630, cancel button 612, and an accept criteria button 616. Saved auto-play criteria 606A may be a list of previously saved parameters that the player may choose from in order to manipulate their auto-play functionality experience. The player may create a profile name for each of the saved options. Each saved option may have a time entered into time stamp 634 (e.g., profile one 637 was created on 4/25/2012 at 10:11:33). Each saved profile may include the selected options as criteria 636 (e.g., the player saved profile one 637, which included auto-play for 10 minutes only, as the criteria.) The player may use hand icon 528 to select between the different criteria 640, to click on the up/down arrows or the scroll bar on scroll bar 642, to select delete criteria button 630, to select cancel button 612, to select accept criteria button 616, and/or for any other purpose. The player may select delete criteria 632 to erase a profile (e.g., the player may want to erase profile 637. The player may click on profile 637 using hand icon 528. Once profile 637 is highlighted, the player may use hand icon 528 to click on delete criteria button 632. This may remove profile 637 from profile criteria list 640). Cancel button 612 may allow the player to close the save auto-play criteria 606A window and return to the main screen (e.g., a player may want to return to the main screen if they are no longer interested in selecting from the saved criteria, or if they have finished editing their list of saved criteria). Accept criteria button 616 may be used if a player wants to play a previously saved list of criteria. The player may use hand icon 528 to highlight a specific profile from profile criteria list 640. Once highlighted, the player may use hand icon 528 to click accept criteria button 616. The player may also use the touch-screen option to select a profile criteria list 640.

Figure 7A:
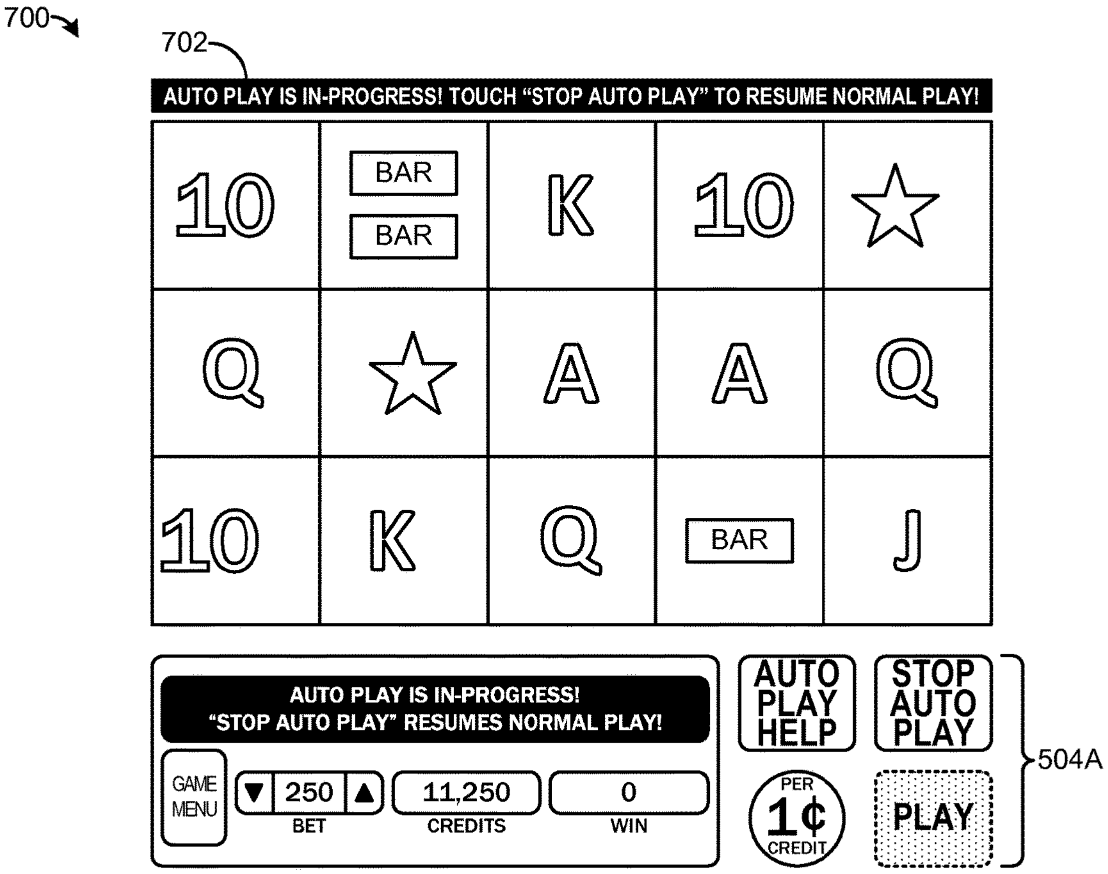
FIG. 7A is an illustration of an auto-play game play with a game menu, according to one embodiment.

FIG. 7A is an illustration of an auto-play game play with a game menu, according to one embodiment. A third image 700 may include an auto-play label 702, stop auto-play button 504, and play button 506. Auto-play label 702 may alert the player that electronic gaming device 100 and/or electronic gaming system 200 is in auto-play mode. The label may read, "Auto-play is in progress! Touch 'Stop Auto-Play' to resume normal play!" Auto-play label may blink, be highlighted, move, change colors, and/or change in any way. On the game menu, stop auto-play button 504 may be pressed at any time to turn off the auto-play mode (e.g., if a player needs to use the restroom and does not want to miss a spin, they may press stop auto-play button 504 to stop electronic gaming device 100 and/or electronic gaming system 200 from continuing while they were gone). Stop auto-play button may blink, be highlighted, move, change colors, and/or change in any way. Play button 506 may be a darker color, shadowed, a different color, or in some way different from the other buttons to indicate that the button cannot be pressed. This may signify to the player that a different mode, like the auto-play functionality, is in progress and they do not need to use play button 506 until the auto-play game is finished. Any of the buttons may be a different color, blink, move, and/or be different in any way.

Figure 7B:
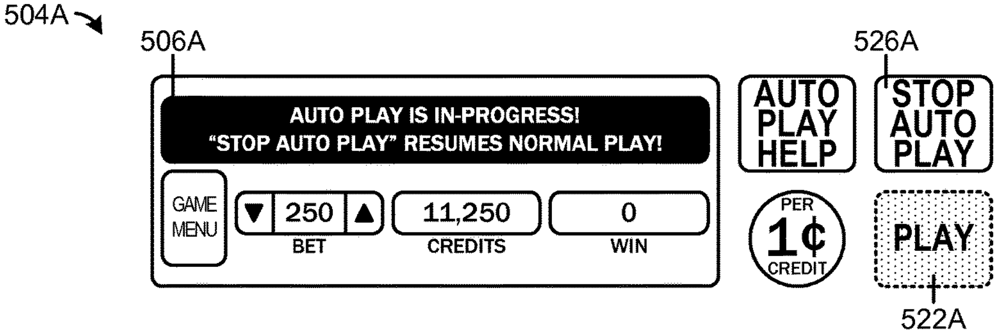
FIG. 7B is another illustration of a game menu, according to one embodiment.

FIG. 7B is another illustration of a game menu, according to one embodiment. A fourth image 504A may include an auto-play label 506A, a stop auto-play button 526A, and a play button 522A. Auto-play label 506A may alert the player that electronic gaming device 100 and/or electronic gaming system 200 is in auto-play mode. The label may read, "Auto-play is in progress! Touch 'Stop Auto-Play' to resume normal play!" Auto-play label 506A may blink, be highlighted, move, change colors, and/or change in any way. Stop auto-play button 526A may be pressed at any time to turn off the auto-play mode (e.g., if a player needs to use the restroom and does not want to miss a spin, they may press stop auto-play button 526A to stop electronic gaming device 100 and/or electronic gaming system 200 from continuing while they were gone). Stop auto-play button 526A may blink, be highlighted, move, change colors, and/or change in any way. Play button 522A may be a darker color, a different color, shadowed, and/or in some way different from the other buttons to indicate that the button cannot be pressed. This may signify to the player that a different mode, the auto-play functionality mode, is in progress and they do not need to use play button 522A until the auto-play functionality is finished.

Figure 7C:
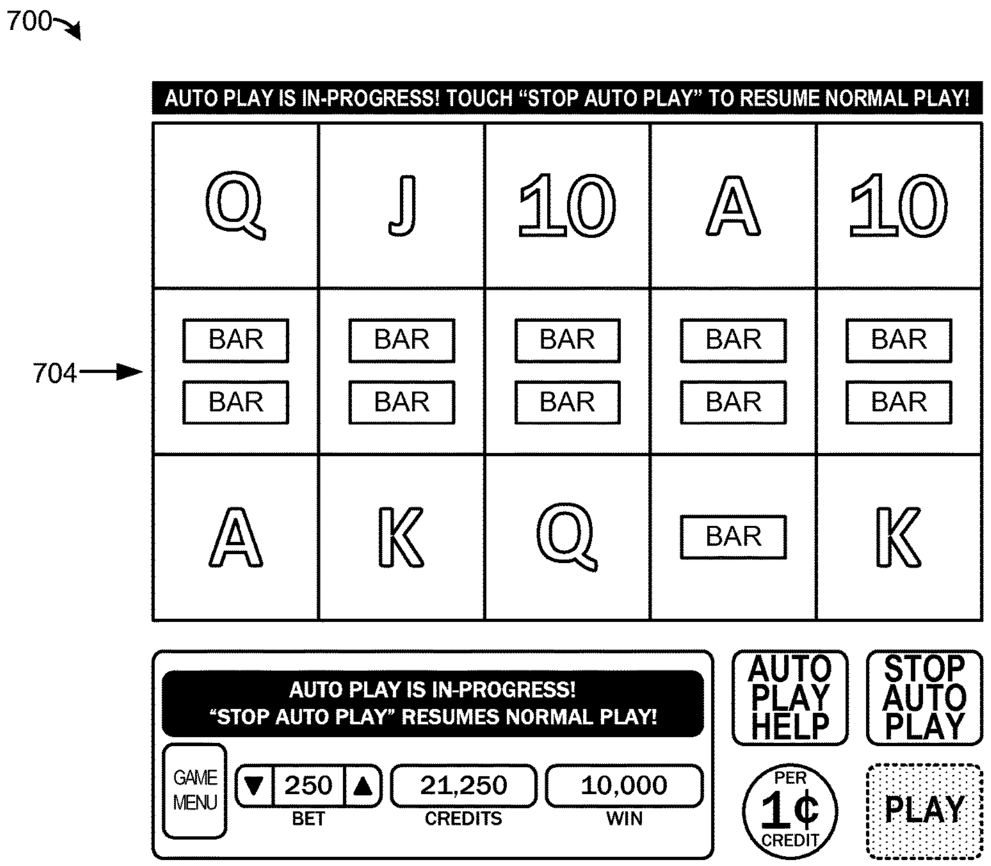
FIG. 7C is an illustration of an auto-play game play with a game menu, according to one embodiment.

FIG. 7C is an illustration of an auto-play game play with a game menu, according to one embodiment. Third image 700 may include a row of bar icons 704 in auto-play functionality mode. Row of bar icons 704 may indicate a winning spin.

For example, a player may have selected the auto-play parameter that if the spin hits a jackpot spin, the auto-play mode should turn off. In this example, when all the bar icons align in row of bar icons 704, the player has won the jackpot. This may immediately turn off the auto-play mode. This payline may light up, jiggle, move, flash, and/or change in any way.

Figure 7D:
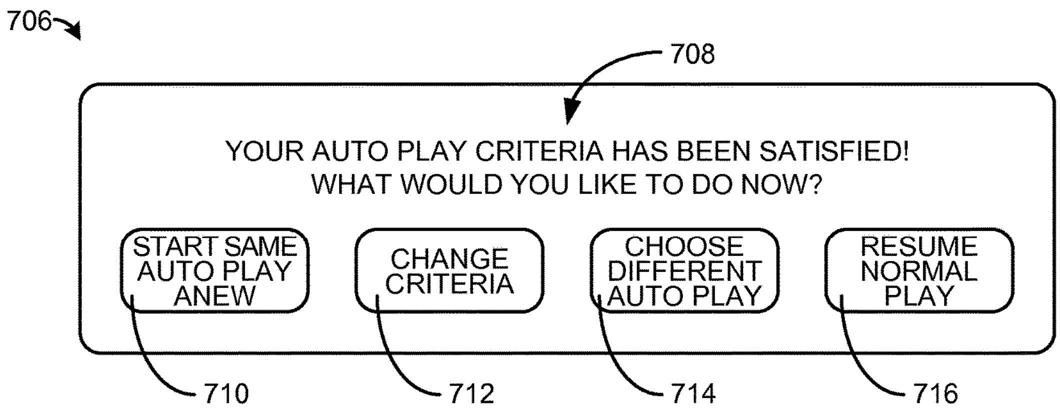
FIG. 7D is an illustration of an auto-play menu, according to one embodiment

FIG. 7D is an illustration of an auto-play menu, according to one embodiment. A fifth image 706 may include a satisfied label 708, a start same auto-play anew button 710, a change criteria button 712, a choose different auto-play button 714, and a resume normal play button 716. Fifth image 706 may pop-up, flash, blink, move across the screen, and/or change in any way. Satisfied label 708 may state, "Your auto-play criteria has been satisfied! What would you like to do now?" This wording may flash, fade in and out, blink, jiggle, and/or move in any way. Start same auto-play anew button 710 may be pressed if a player would like to begin a new game using the same auto-play criteria as the game just completed (e.g., if electronic gaming device 100 and/or electronic gaming system 200 completed auto-play games until five winning games in a row, electronic gaming device 100 and/or electronic gaming system 200 may prompt the player to decide what they would like to do next. The player may click start same auto-play anew button 710 to begin electronic gaming device 100 and/or electronic gaming system 200 in auto-play mode until another five games are won in a row). Change criteria button 712 may be pressed if a player would like to begin selecting new criteria for the auto-play mode or if the player would like to review what auto-play mode was used in the past games (e.g., if electronic gaming device 100 and/or electronic gaming system 200 completed auto-play games until five winning games in a row and then prompted the player to decide what they would like to do next, the player may click change criteria button 712 to begin selecting the new criteria for the upcoming games or to review what criteria was being used for the previous games). Choose different auto-play button 714 may be pressed if a player would like to select different auto-play criteria, if a player wants to see what auto-play criteria was being previously played, or if a player wants to select multiple auto-play criteria to be used simultaneously (e.g., if a player previously had the auto-play criteria of winning five consecutive games before the auto-play mode turned off, and the player wants to change the criteria to something different, the player may click choose different auto-play button 714. Then the player may select any number of criteria for electronic gaming device 100 and/or electronic gaming system 200 to play in auto-play functionality, such as to quit auto-play after 10 games and/or to quit auto-play after 5 losing games in a row). Resume normal play button 716 may allow a player to return electronic gaming device 100 and/or electronic gaming system 200 to normal play from the auto-play mode. The auto-play function may then be turned off until the player selects auto-play again (e.g., a player may want to play a few rounds of auto-play mode, then return to normal play, and then turn the auto-play functionality back on).

Figure 8:
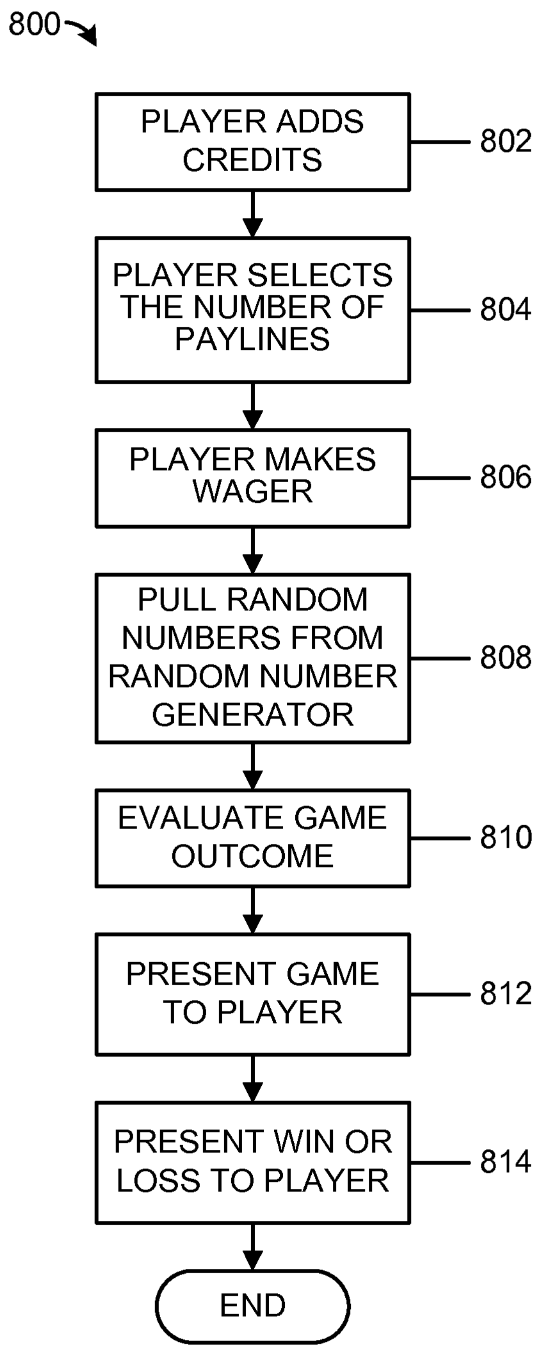
FIG. 8 is a flow diagram for game play, according to one embodiment.

In FIG. 8, a first process flowchart 800 of game play is shown, according to one embodiment. The method may include the game play starting. The method may include electronic gaming device 100 and/or electronic gaming system 200 receiving credits (step 802). The method may include electronic gaming device 100 and/or electronic gaming system 200 receiving payline selections from a player (step 804). The method may include electronic gaming device 100 and/or electronic gaming system 200 receiving a wager (step 806). The method may include electronic gaming device 100 and/or electronic gaming system 200 pulling one or more random numbers from a random number generator (step 808). The method may include electronic gaming device 100 and/or electronic gaming system 200 evaluating the game outcome (step 810). The method may include presenting the game (step 812). The method may include displaying the game outcome (step 814). The method may end.

Figure 9:
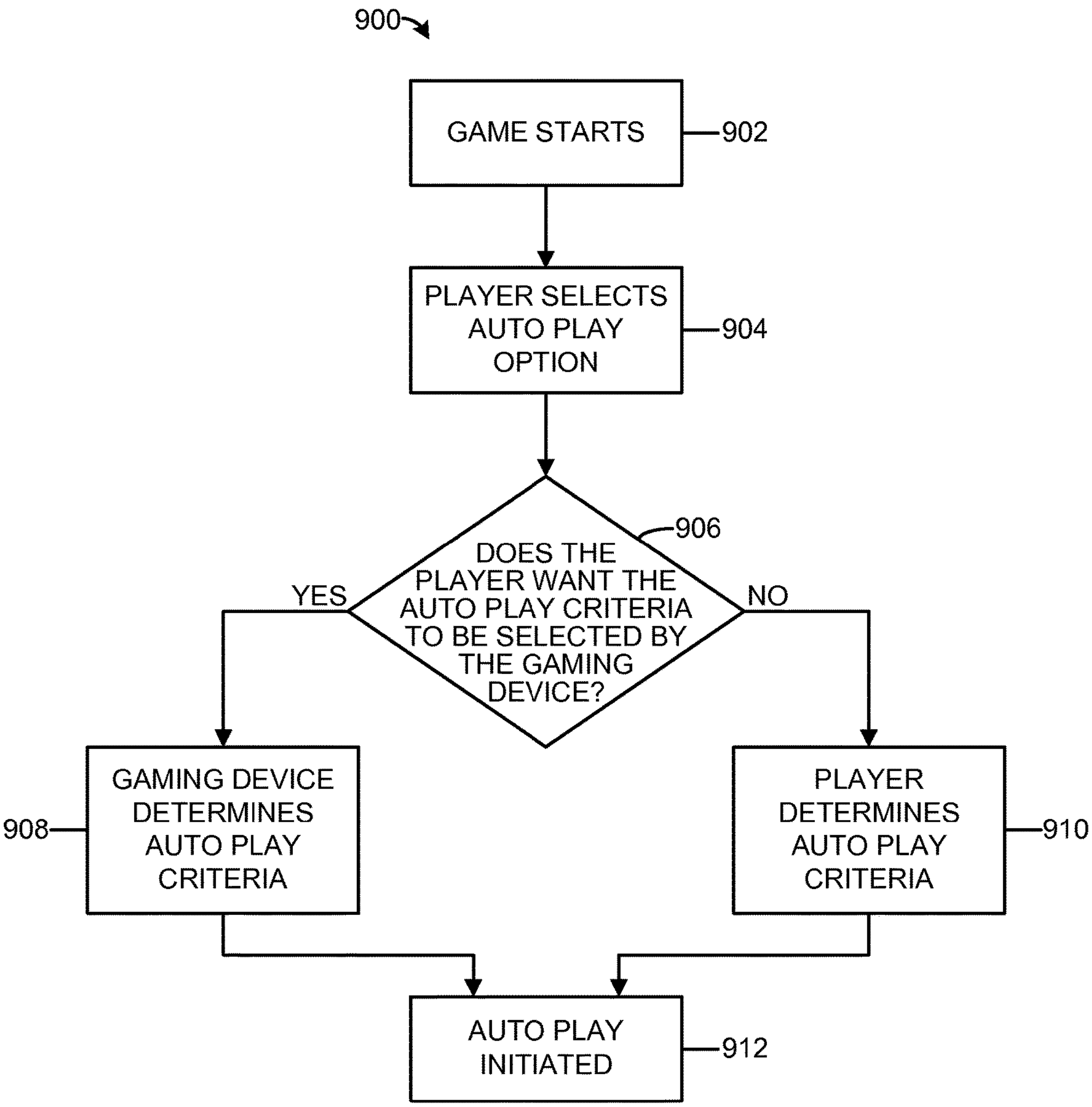
FIG. 9 is another flow diagram for game play, according to one embodiment.

FIG. 9 shows a second process flowchart 900 for game play, according to one embodiment. The method may include starting game play (step 902). Further, the method may include the player selecting the auto-play option (step 904). The player may select if they want electronic gaming device 100 and/or electronic gaming system 200 to determine auto-play (step 906). If the player wants electronic gaming device 100 and/or electronic gaming system 200 to determine auto-play mode, the method may then allow electronic gaming device 100 and/or electronic gaming system 200 to determine the auto-play criteria (step 908). If the player does not want electronic gaming device 100 and/or electronic gaming system 200 to determine auto-play functionality, the method may then allow the player to select the auto-play criteria (step 910). The method may then move to initiate auto-play (step 912).

Any combination of criteria may be selected by electronic gaming device 100 and/or electronic gaming system 200. If more than one criteria is selected by electronic gaming device 100 and/or electronic gaming system 200, the criteria may be combine or opposing each other to turn off the auto-play mode when one of the criteria is completed. For example, if a player answered yes to allowing electronic gaming device 100 and/or electronic gaming system 200 to determine the auto-play criteria (step 906), electronic gaming device 100 and/or electronic gaming system 200 may select the criteria that the auto-play mode may continue for 55 consecutive games.

Electronic gaming device 100 and/or electronic gaming system 200 may select an auto-play functionality. Electronic gaming device 100 and/or electronic gaming system 200 may select one of the profiles off of the player's card, use the player's history to determine the parameter that would take the player the longest, randomly select criteria, and/or use any other method to determine the criteria.

Another example may be if a player answered yes to allowing electronic gaming device 100 and/or electronic gaming system 200 to determine the auto-play criteria (step 906), electronic gaming device 100 and/or electronic gaming system 200 may select the criteria that the auto-play may continue until the game has played for both 15 minutes and 30 consecutive games.

Another example may be if a player answered yes to allowing electronic gaming device 100 and/or electronic gaming system 200 to determine the auto-play criteria (step 906), electronic gaming device 100 and/or electronic gaming system 200 may select the criteria that the auto-play may continue until the game hits the jackpot or 30 minutes lapses.

Another example may be if a player answered yes to allowing electronic gaming device 100 and/or electronic gaming system 200 to determine the auto-play criteria (step 906), electronic gaming device 100 and/or electronic gaming system 200 may select the criteria that the auto-play functionality may continue until the player's credit reaches 200 or the player wins 50 out of 100 games. The player, electronic gaming device 100, and/or electronic gaming system 200 may select any combination of criteria for auto-play functionality.

If more than one criteria is selected by the player, electronic gaming device 100, and/or electronic gaming system 200, the criteria may be combined or terminated when one of the criteria is completed. For example, if a player answered no to allowing electronic gaming device 100 and/or electronic gaming system 200 to determine the auto-play criteria (step 906), the player may manually select the criteria that the auto-play functionality may continue for 25 consecutive games.

Another example may be if a player answered no to allowing electronic gaming device 100 and/or electronic gaming system 200 to determine the auto-play criteria (step 906), the player may select the criteria that the auto-play functionality may continue until the game has played for both 12 minutes and 5 consecutive games.

Another example may be if a player answered no to allowing electronic gaming device 100 and/or electronic gaming system 200 to determine the auto-play criteria (step 906), the player may select the criteria that the auto-play functionality may continue until the game hits the jackpot or 20 minutes lapses.

Another example may be if a player answered no to allowing electronic gaming device 100 and/or electronic gaming system 200 to determine the auto-play criteria (step 906), the player may select the criteria that the auto-play functionality may continue until the player's credit reaches 300 or the player wins 30 out of 100 games.

Figure 10:
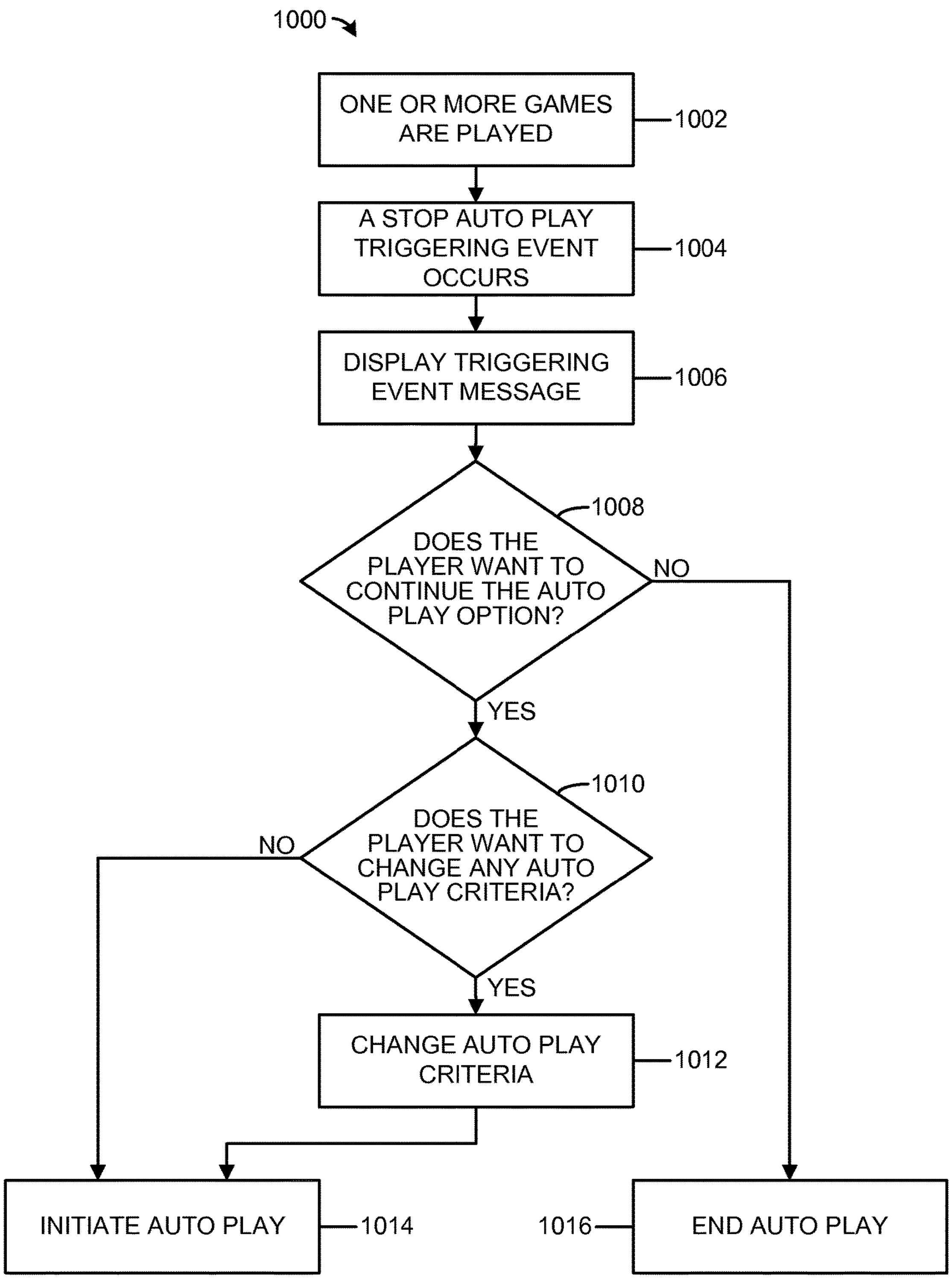
FIG. 10 is another flow diagram for game play, according to one embodiment.

FIG. 10 is a flow diagram 1000 for game play, according to one embodiment. The method may include that one or more games are played (step 1002). The method may include a stop auto-play triggering event occurring (step 1004). The method may include displaying one or more triggering events (step 1006). The method may include electronic gaming device and/or electronic gaming system determining whether the player wants to continue the auto play option (step 1008). The player may answer no and the method may then move to end auto-play (step 1016). The player may answer yes, and then the method may then move to asking the player if they want to change any auto-play criteria (step 1010). The player may answer no, and then the method may then move to initiate auto-play (step 1014). The player may answer yes, and then the method may then allow the player to change the auto-play criteria (step 1012). The method may then move to initiating the auto-play mode (step 1014).

Stop auto-play triggering event 1004 may occur for many reasons. For example, if a player wants to use the restroom, but not miss any games, they may initiate the stop auto-play functionality. Another example may be if a player wants to stop using auto-play functionality to play a few games in standard mode. Another example may be if a player wants to change the criteria of their auto-play, they may first cause a triggering event to make the changes. Each of these and more may result in electronic gaming device 100 and/or electronic gaming system 200 then moving to end auto-play (step 1016). A triggering event may include, but is not limited to, a player using their hand to press the touch screen on electronic gaming device 100 and/or electronic gaming system 200, a player using the hand icon to click the stop auto-play button, a player pressing the stop auto-play button on their keypad, a player using set verbal words to command electronic gaming device 100 and/or electronic gaming system 200 to stop auto-play, and/or a player using predetermined facial and/or body gestures to indicate to electronic gaming device 100 and/or electronic gaming system 200 to stop auto-play functionality.

If the player indicates that they want to continue the auto-play option, the method may then move to asking the player if they want to change any auto-play criteria (step 1010). If the player is satisfied to continue playing with the current criteria, they may indicate no and initiate auto-play mode 1014. This may happen, for example, if a player has accidently hit the stop auto-play trigger, or if a player hit the stop auto-play and then changed their mind, and/or any other reason.

If the player indicates that they want to continue the auto-play option, the method may then move to asking the player if they want to change any auto-play criteria (step 1010). If the player would like to change the criteria, the method may move to the change criteria process (step 1012). In this window, a player may select from a multitude of choices for adapting their auto-play game. A player may select, for example, to have auto-play continue until the player's credit reaches 200 or the player wins 50 out of 100 games, or the player may select that auto-play continue for 25 consecutive games, or the player may select that both 12 minutes lapse and 5 consecutive games must be won before the auto-play functionality stops. The player may select any number of combinations, or single criteria for electronic gaming device 100 and/or electronic gaming system 200 to play. The player may also select that electronic gaming device 100 and/or electronic gaming system 200 chose the criteria. Once the player has indicated the criteria, the method may initiate auto-play functionality.

Figure 11:
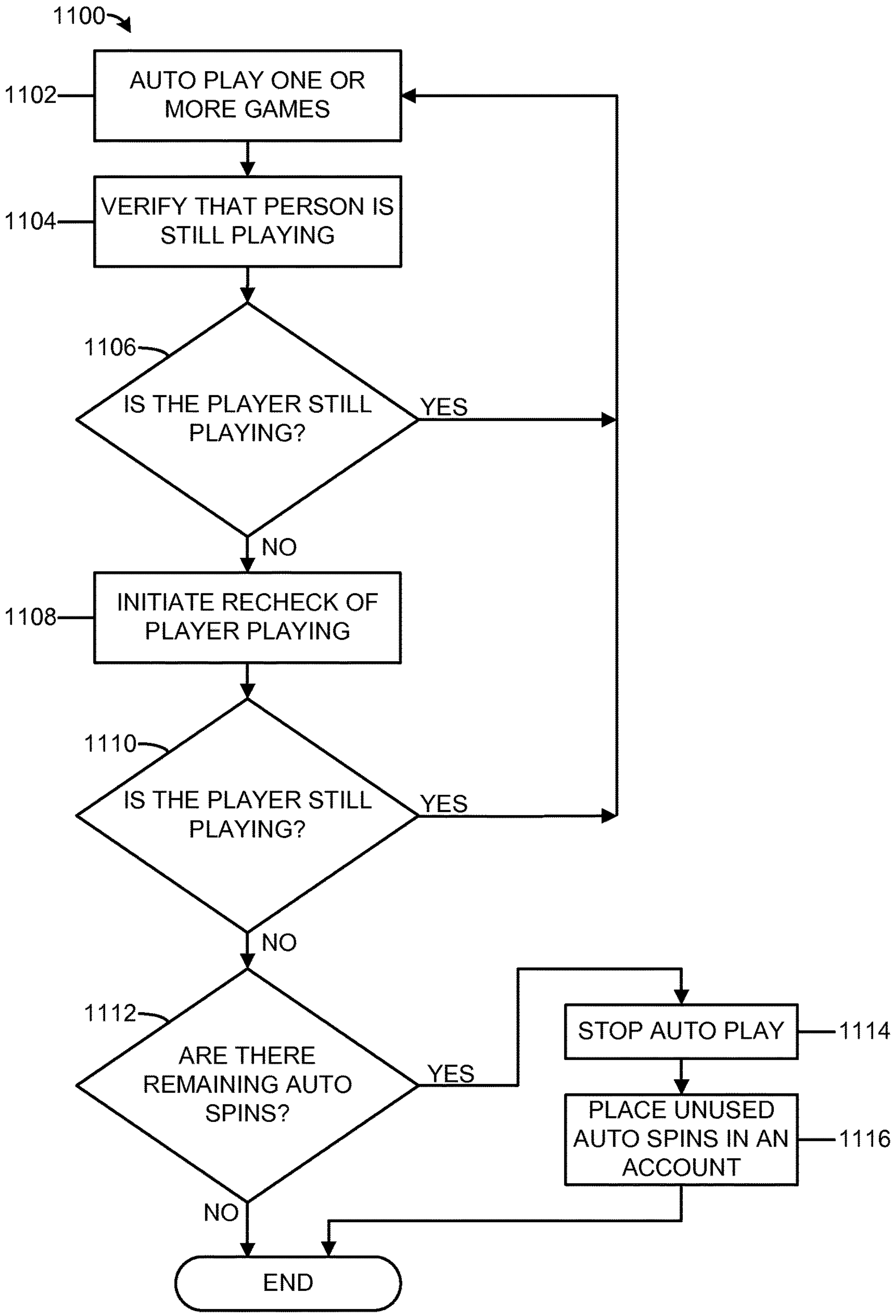
FIG. 11 is another flow diagram for game play, according to one embodiment.

FIG. 11 is a flow diagram 1100 for game play, according to one embodiment. The method may include that one or more auto-play games be played (step 1102). The method may include verifying that a player is still playing (step 1104). The method may then include that electronic gaming device 100 and/or electronic gaming system 200 questions if the player is still playing (step 1106). The method may include if the player is still playing, returning to auto-play for one or more games (step 1102). The method may include if the player is no longer playing, initiating recheck of player playing activity (step 1108). The method may include if the player is still playing, returning to auto-play for one or more games (step 1102). The method may include if the player is no longer playing, electronic gaming device 100 and/or electronic gaming system 200 determining if there are remaining auto-spins (step 1112). The method may include if there are remaining auto-spins left, electronic gaming device 100 and/or electronic gaming system 200 stopping auto-play (step 1114). The method may then include electronic gaming device 100 and/or electronic gaming system 200 placing the unused auto-spins in an account (step 1116). The method may then end (step 1117). If there are no auto-spins remaining, the method may include the end of the auto-play (step 1117).

Electronic gaming device 100 and/or electronic gaming system 200 may verify if a person is still playing electronic gaming device 100 and/or electronic gaming system 200 (step 1104). Electronic gaming device 100 and/or electronic gaming system 200 may want to determine if a person is still playing for a multitude of reasons. For example, a person may have stepped away from electronic gaming device 100 and/or electronic gaming system 200 to use the restroom or to get a drink and not realized they were in auto-play mode.

Electronic gaming device 100 and/or electronic gaming system 200 may verify if a person is still playing electronic gaming device 100 and/or electronic gaming system 200 by a variety of means. This may include, but is not limited to, pressure sensors, Kinect, cameras, motion detectors, various timed check-ins with the player, verbal response questions, and/or other verification methods.

As the auto-play functionality continues through one or more games, the method may continually determine if a player is still playing electronic gaming device 100 and/or electronic gaming system 200. If at any point, electronic gaming device 100 and/or electronic gaming system 200 determines the player is no longer at electronic gaming device 100 and/or electronic gaming system 200, electronic gaming device 100 and/or electronic gaming system 200 may determine if there are remaining auto-spins (step 1112). If there are no spins remaining, the auto-play function may stop. If there are remaining spins, the method may include placing the unused auto spins in an account (step 1116). The unused spins may be placed on the player tracking card, the remaining spins may go into the casino fund, the remaining spins may be donated to a charity fund, or a food bank, the remaining spins may be given away to another player as a bonus prize, and/or the remaining spins may be used in any other way. Once electronic gaming device 100 and/or electronic gaming system 200 has determined a player is no longer using electronic gaming device 100 and/or electronic gaming system 200, the auto-play may stop, any unused spins and/or credits may go to the determined location, and then the game may end.

In an exemplary embodiment, an electronic gaming device may include a plurality of reels. The plurality of reels may include a plurality of symbols. The electronic gaming device may include a first payline, a second payline, and a memory. The memory may include a payline module. The payline module may include a plurality of payline structures. The electronic gaming device may include a processor. The processor may receive primary wagers on one or more paylines. The processor may receive one or more secondary wagers on one or more selected paylines (e.g., repeat paylines, patterns, scenarios, etc.). The selected paylines may be based on data received from a player. The processor may determine a selected payline's payout based on the one or more selected paylines (e.g., repeat paylines, patterns, scenarios, etc.).

In another embodiment, the processor may determine a payout based on the primary wagers. The electronic gaming device may include a network interface, which may receive data from at least one of a server and one or more gaming devices. The electronic gaming device may include a display, which may display one or more selected paylines.

In another example, the display may shade one or more non-selected paylines. The electronic gaming device may include a player preference input device. The player preference input device may modify a game configuration based on data from an identification device. The processor may multiply a prize value based on a selected payline occurrence.

In another embodiment, a method of game play may include receiving one or more primary wagers on one or more paylines. The method may include receiving a secondary wager on one or more paylines (e.g., repeat paylines, patterns, scenarios, etc.). The selected payline may be based on selection data. The selection data may be based on player input. The method may include determining one or more primary wager payouts. Further, the method may include determining one or more secondary wager payouts.

In another example, the method may include obtaining a player preference data and modifying a game configuration based on the player preference data. The method may include receiving data from at least one of a server and one or more gaming devices. The method may include multiplying a prize value based on a selected payline occurrence.

The plurality of reels may form a 5-by-5 matrix, a 3-by-5 matrix, a 4-by-5 matrix, a 4-by-3 matrix, a 5-by-3 matrix, or any number-by-any number matrix. The symbols may be an image of a card, an image, and/or other objects. For example, it may be a pot of gold, an ace of spades, a diamond, or any other symbol. The symbols may be animation. The symbols may be a picture. For example, it may be a picture of the player as taken by camera 312. The symbols may be a number. The symbols may be any image. The symbols may be blank.

The disclosed features may be part of the base game and/or a bonus game. In addition, the disclosed features may be part of a base bet and/or may require an additional side bet (e.g., ante bet).

In one embodiment, the electronic gaming device may include a plurality of reels. One or more paylines may be formed on at least a portion of the plurality of reels. The electronic gaming device may include a memory. The memory may include one or more auto-play game play structures. The electronic gaming device may include a processor. The processor may initiate the one or more auto-play game play structures.

In another example, an initiated auto-play game play structure may be based on one or more criteria selections. In another example, the one or more criteria selections may be based on a player's input. In another example, the one or more criteria selections may be based on one or more selections by the electronic gaming device.

In another example, the processor may stop one or more auto-play game structures based on one or more triggering events. In another example, the processor may stop one or more auto-play game structures based on a stop auto-play signal. In one example, an initiated auto-play game play structure may be based on one or more profiles. In one example, the one or more profiles may be based on data from a loyalty card.

In another embodiment, the method of providing gaming options via an electronic gaming device may include receiving one or more wagers on one or more paylines. The method may include receiving one or more auto-play signals. The method may include initiating one or more auto-play game structures.

In another example, the initiated auto-play game play structure may be based on one or more criteria selections. In one example, the one or more criteria selections may be based on a player's input. In another example, the one or more criteria selections may be based on one or more selections by the electronic gaming device.

In another example, the method may include stopping one or more auto-play game structures based on one or more triggering events. The method may include stopping one or more auto-play game structures based on a stop auto-play signal. The method may include that the initiated auto-play game play structure may be based on one or more profiles. In another example, the one or more profiles may be based on data from a loyalty card.

In another example, the electronic gaming system may include a server. The server may include a server memory and a server processor. The server memory may include one or more auto-play game structures. The server processor may initiate one or more auto-play game structures.

In another example, an initiated auto-play game play structure may be based on one or more criteria selections. In another example, the one or more criteria selections is based on a player's input. In another example, the server processor may stop one or more auto-play game structures based on one or more triggering events.

In another example, the system, device, and/or method may provide an option to lock the electronic gaming device and/or the electronic gaming system during auto-play mode. This locking option may be utilized with a temporary pin (Personal Identification Number—PIN) and/or any other verification method (e.g., players card, thumb print, picture, etc.) while the game is in an autoplay mode. That may prevent anyone else from interrupting the auto play while it is active. Further, this will be helpful for the player to take a quick break while the game is still playing. Further, to make sure that the game is not locked forever, we can also have a technician master pin number which can unlock the game if the player never returns. In addition, the screen lock may be disabled if the credit expires (e.g., zero credit balance and/or not enough credits for a spin) and/or no response from the player for a predetermined amount of time (e.g., 10 minutes, 30 minutes, 1 hour, etc.). Therefore, the game will not be locked unnecessarily for an extended period of time. Further, the auto-play mode may be started, stopped, and/or adjusted during this locked up option mode and utilize any of the examples in this disclosure.

Figure 12A:
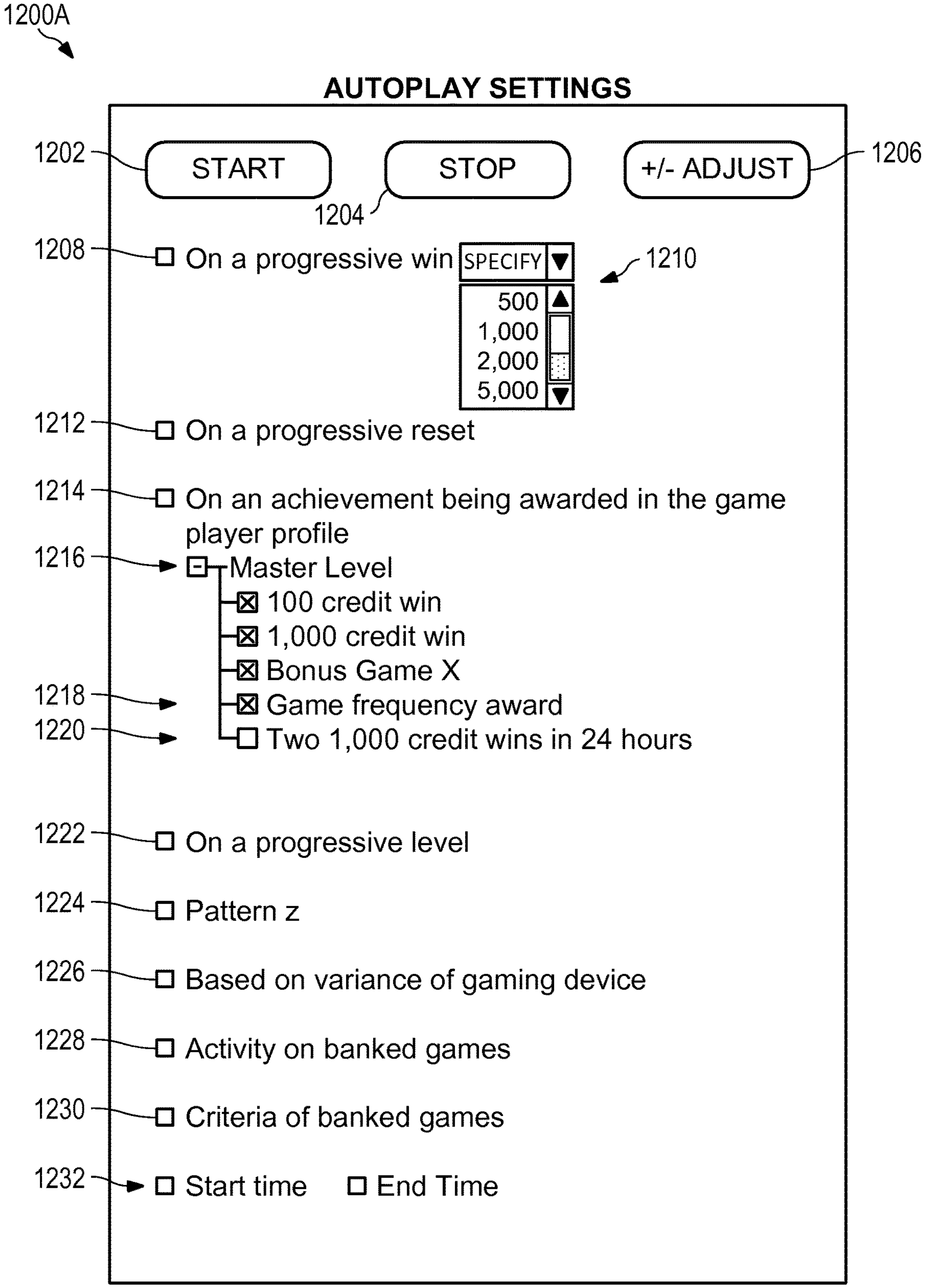
FIG. 12A is another illustration of an auto-play criteria menu, according to one embodiment.

In FIG. 12A, another illustration of an auto-play criteria menu is shown, according to one embodiment. A first auto-play settings image 1200A may include a start auto-play button 1202, a stop auto-play button 1204, and/or an adjust auto-play button 1206. Further, the first auto-play settings image 1200A may include an on a progressive win option 1208, a progressive amount menu 1210, an on a progressive reset option 1212, an on an achievement being awarded in the game player profile option 1214, a master level option 1216, one or more selected master awards 1218, one or more non-selected master awards 1220, an on a progressive level option 1222, a pattern Z option 1224, a based on a variance of gaming device option 1226, an activity on banked game option 1228, a criteria of banked games option 1230, and/or a start time option 1232 (and/or a stop time option).

In one example, an auto-play functionality may be started based on one or more triggering events. In another example, an auto-play functionality may be stopped based on one or more triggering events. In another example, an auto-play functionality may be adjusted based on one or more triggering events. Further, any combination of starting, stopping, and/or adjusting may be utilized. For example, a first auto-play functionality may be started based on a first triggering event (e.g., a progressive hitting a specific level—$200,000), then the first auto-play functionality may be adjusted based on a second triggering event (e.g., winning four games in a row), and then the first auto-play functionality may be stopped based on a third triggering event (e.g., the progressive jackpot being reset). In another example, a first auto-play functionality may be started based on a first triggering event (e.g., a first pattern occurs on a game another player just finished playing) and a second auto-play functionality may be started based on a second triggering event (e.g., a progressive jackpot being reset), then the first auto-play functionality may be adjusted based on a third triggering event (e.g., losing ten spins in a row) while the second auto-play functionality is stopped by a fourth triggering event (e.g., a time period has expired) and/or the third triggering event, and then the first auto-play functionality may be stopped based on a fifth triggering event (e.g., a credit balance being reached) while the second auto-play functionality was restarted based on a sixth triggering event (e.g., a variance number) and/or the fifth triggering event.

In another example, a first auto-play functionality may be utilized for a first device while a second auto-play functionality may be utilized for a second device and while a third auto-play functionality may be utilized for a third device. For example, a mobile phone may have a first auto-play functionality (e.g., play at a progressive eligible level when the progressive reaches a predetermined level—this could be a start and/or a modify step) while a personal computer may have a second auto-play functionality (e.g., lower the wager amount to a predetermined number when the balance equals a predetermined number—this could be a modify step) and a gaming machine inside of a gaming entity may have a third auto-play functionality (e.g., quit game play when the balance is a predetermined number or when the playing session is a hour—this could be a stop step). Further, one or more of these auto-play functionalities may be tied to a player's profile. In this example, when the gaming device identifies the player, the gaming device may initiate one or more of these auto-play functionalities.

In one example, progressive win option 1208 and/or progressive amount menu 1210 may be utilized to set one or more auto-play functionalities. In an example, a first player may want to start playing a first game once a progressive jackpot reaches 500 (e.g., $500, $500,000, etc.). Therefore, the first player selects progressive win option 1208 and the 500 option under progressive menu 1210 and utilizes the start button 1202. In another example, the first player may want to adjust their playing of a first game to be eligible for the progressive jackpot once it reaches 500 and/or any other number. Therefore, the first player selects progressive win option 1208 and the 500 option under progressive menu 1210 and utilizes the adjust button 1206—in this example, if the progressive jackpot requires 5 credits to be wagered to be eligible for the progressive jackpot, then the system, device, and/or method would adjust the wagering amount to 5 credits (e.g., 1 credit to 5 credits wagered per spin) once the progressive jackpot hits 500.

In another example, on a progressive reset option 1212 may be utilized to start, stop, and adjust any game feature. For example, a first player may not want to wager at the amount needed to be eligible for the progressive jackpot once the progressive jackpot is reset. In this example, the first player is wagering at 5 credits per game play to be eligible for the jackpot (which is at $100,000), but once the jackpot is awarded and reset (to $50,000), the first player's wagering amount is automatically reduced to 1 credit per game play. The first player has initiated an auto-play function which will increase the wager from 1 credit to 5 credits once the jackpot goes back up to a predetermined number (e.g., $75,000).

In another example, an achievement being awarded in the game player profile option 1214 may be utilized for a player to obtain one or more awards, achievements, and/or levels. In this example, master level option 1216 includes one or more criteria (e.g., 100 credit win, 1000 credit win, bonus game X played, game frequency award, two 1000 credit wins in a predetermined time period (e.g., 24 hours), etc.), which can be achieved by the player. In one example, a player may have 5 achievement items in their profile. Based on completing one, a few, and/or all of these achievement items, the player may receive an award (e.g., free play, free auto-play, promotional chips, a trophy, an increased player level, an increased game level, a free room, a free meal, a free concert, a free show, and/or any other prize). In one example, the one or more selected master awards 1218 may be a 100 credit win (which means it was completed), a 1000 credit win, a bonus game X, and a game frequency award (e.g., played 2 days in a row, played 5 days in a row, played 2 weeks in a row, etc.). Further, in this example, one or more non-selected master awards 1220 may be two 1000 credit wins in a predetermined time period (e.g., 24 hours, 2 weeks, 2 months, a year, etc.). If the player completes this item, then the player may receive one or more of the awards. In one example, a player may initiate an auto-play function which continues until one or more achievements are achieved and/or completed.

In another example, on a progressive level option 1222 may be utilized to scan all of the progressive jackpots to find one or more progressive jackpots at a predetermined level. The system, device, and/or method may then initiate progressive jackpot eligible play on one or more games where the progressive for that game meets the predetermined level. For example, the player may want to play game where the progressive is over $1,000,000. In this example, there may be 1000 different games (any number from 1 to N can be utilized) that could be played by the player. However, there are only 10 games where the progressive is over $1,000,000 (e.g., game type 1, game type 2, . . . , game type 10). Based on the search, the system, device, and/or method may start game play on one, a few, and/or all of these 10 games with a progressive jackpot of over $1,000,000. This may be initiated automatic and/or with one or more player confirmations. Further, during game play if one of these 10 games has a progressive jackpot of under $1,000,000, auto-play may be discontinued and/or adjusted on this non-compliant game. In addition, during game play if a new game has a progressive jackpot of over $1,000,000, then the system, device, and/or method may initiate game play on this newly compliant game which may be initiated automatically and/or with one or more player confirmations. In another example, the player via one or more auto-play functions may wager 5 credits on game type 1, game type 2, game type 3, game type 4, and game type 5 because 5 credits is the minimum wager required to be eligible for the progressive jackpots on game type 1, game type 2, game type 3, game type 4, and game type 5. Further, the player via one or more auto-play functions may wager 10 credits on game type 6 even though 5 credits is the minimum wager required to be eligible for the progressive jackpot on game type 6. Further, the player via one or more auto-play functions may wager 20 credits on game type 7 and game type 8 because 20 credits is the minimum wager required to be eligible for the progressive jackpots on game type 7 and game type 8. In addition, the player via one or more auto-play functions may wager 50 credits on game type 9 and game type 10 even though 10 credits is the minimum wager required to be eligible for the progressive jackpot on game type 9 and game type 10.

In another example, pattern Z option 1224 may be utilized by a player. Pattern Z option 1224 may be utilized to stop game play. For example, the player may want to stop game play in an auto-play mode when a predetermined pattern happens—the predetermined pattern may be a win followed by two loses and then a win and then four loses. Further, the predetermined pattern may be eight wins followed by one lose. Any pattern may be utilized which will be discussed in more detail with FIG. 16. Further, the player may want to adjust game play in an auto-play mode when a predetermined pattern occurs—the player may want to increase and/or decrease their wager when a pattern Alpha happens—Pattern Alpha=a lose, a win, a lose, a lose, a lose, a lose, and a lose. Further, Pattern Alpha may=a win, a lose, a win, a lose, a win, a lose. In addition, Pattern Alpha may be no prize over a predetermined number (e.g., $20, $100, $1000, etc.) has been won on the game in a predetermined number of spins (e.g., 1 to N) and/or time period (e.g., 1 minute, 2 minutes, . . . , 1 hour, . . . , 1 week, . . . , 1 month, . . . , 1 year, etc.). In one example, the player may want to wager the maximum after a pattern occurs. In another example, the player may want to wager the minimum after a pattern occurs. Further, the player may want to wager the maximum after a pattern occurs for a predetermined number of spins and/or time period. In addition, the player may want to wager the minimum after a pattern occurs for a predetermined number of spins and/or time period. Once the period number of spins and/or time period is completed, then the system, device, and/or method may readjust and the wager goes back to the pre-pattern amount. Further, the player may customize (enter and/or create their own patterns) and/or select for a list of predetermined and/or standard patterns.

In another example, a based on a variance of gaming device option 1226 may be utilized. In this example, a player wants to play high variance (e.g., a few big payouts but a lot of losing spins) after a predetermined number of spins and/or time period has occurred since the last big payout (e.g., a predetermined number —$1000, etc.). In this example, the system, device, and/or method may determine the variance of one or more gaming machines. The system, device, and/or method may categorize these gaming devices into a low variance game (e.g., a lot of little payouts but few big payouts), an average variance (e.g., a plurality of little payouts and a plurality of big payouts), and an above-average variance (e.g., a few big payouts and a lot of losing spins). In this example, the gaming floor, the gaming company, the gaming machine type, and/or any other criteria may have an established payout ratio (e.g., 90%) which can be utilized as the baseline to determine if the gaming type is a low variance game as compared to the established payouts (this number is required to be posted by law), an average variance, and/or an above-average variance.

In another example, an activity on banked game option 1228 may be utilized as a criteria for an auto-play functionality. For example, on a gaming entity floor there may be N number of banked games (and/or any other number). Further, an online banked games may be all games of a specific type (e.g., SuperDog Game). In one example, the system, device, and/or method may determine an activity level on the banked games and based on this activity level, initiate, adjust, and/or stop one or more auto-play functions. For example, when no one is playing the game and/or a below average number of players are playing one or more banked games, this might be a sign of bad payouts. In addition, a criteria of banked games option 1230 may be employed via one or more auto-play functionalities. For example, the payout ratio may be tracked and utilized based on a sample size (e.g., the last 100 spins, the last hour, etc.). Further, a criteria of banked games may be that no win over 1,000 credits (and/or any number) has been achieved in a time period (e.g., the last 1000 spins, the last week, etc.). Further, a start time and end time may be scheduled by the player. In addition, the player may schedule that an adjustment should start at a predetermined time and end at a second predetermined time. In one example, a first set of banked games has 1000 hours of play during a first time period, a second set of banked games has 1200 hours of play during the first time period, a third set of banked games has 1100 hours of play during the first time period, a fourth set of banked games has 1150 hours of play during the first time period, a fifth set of banked games has 2500 hours of play during the first time period, and an Nth set of banked games has 200 hours of play during the first time period. Based on this information, an auto-play function may be initiated on the fifth set of banked games because the fifth set of banked games has the most hours played during the first time period and/or because the fifth set of banked games has a large positive variance from the average banked games hours. Further, based on this information, an auto-play function may not be initiated on the Nth set of banked games because the Nth set of banked games has the least amount of hours played during the first time period and/or because the Nth set of banked games has a large negative variance from the average banked games hours. Based on this information, an auto-play function may not be initiated on the fifth set of banked games because the fifth set of banked games has the most hours played during the first time period and/or because the fifth set of banked games has a large positive variance from the average banked games hours. Further, based on this information, an auto-play function may be initiated on the Nth set of banked games because the Nth set of banked games has the least amount of hours played during the first time period and/or because the Nth set of banked games has a large negative variance from the average banked games hours. In addition, an auto-play function may be (or may not be) initiated on fourth set of banked games because the fourth set of banked games has the closest utilization to the average playing time during the first period.

Figure 12B:
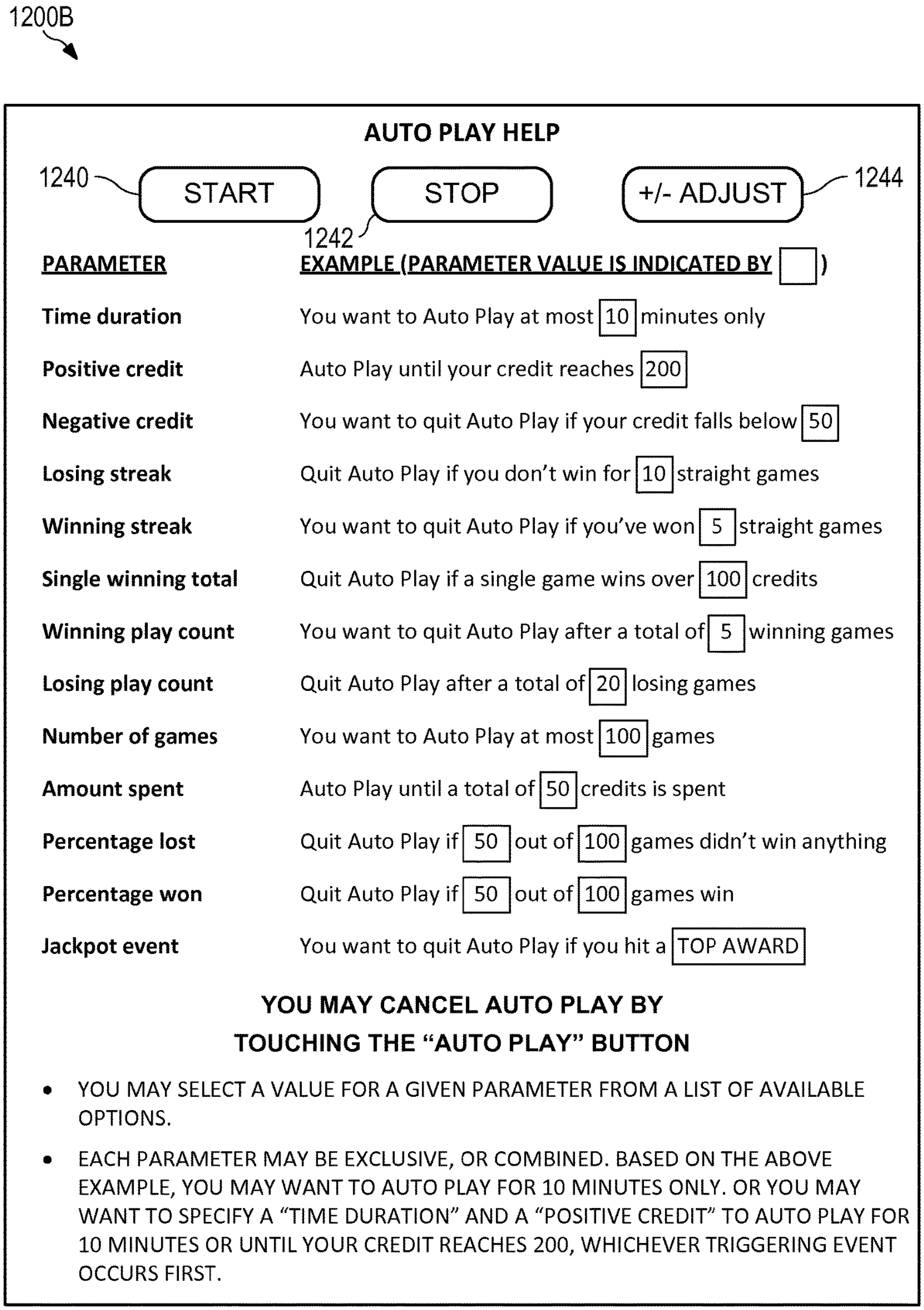
FIG. 12B is another illustration of an auto-play criteria menu, according to one embodiment.

In FIG. 12B, another illustration of an auto-play criteria menu is shown, according to one embodiment. A second auto-play settings image 1200B may include a start auto-play button 1240, a stop auto-play button 1242, and/or an adjust auto-play button 1244. Further, the second auto-play settings image 1200B may include one or more parameters and one or more examples (e.g., parameter value is indicated by). One example may be that if a player wants to set a parameter for a time duration of auto-play to at most 10 minutes. In various examples, the player may choose any amount of time (e.g., 1 minute, 5 minutes, 10 minutes, 30 minutes, 1 hour, 5 hours, etc.). Another example may be that if a player wants to change the parameter relating to positive credits. The auto-play functionality may continue until the player's credits reach a certain chosen amount (e.g., 1, 50, 100, 200, 300, 500, 1000, etc.). Another example may be if a player wants to change the negative credit parameter. The player may select that auto-play mode turns off and/or adjusted after his/her credits fall below a certain amount (e.g., 1, 10, 20, 40, 50, 100, 1000, etc.). Another parameter a player may change may be related to a losing streak. For example, the auto-play functionality may be ended and/or adjusted if the player does not win for a set amount of straight games (e.g., 1, 5, 10, 15, 20, 30, 50, etc.). Another parameter a player may manipulate may be related to a winning streak. For example, a player may decide to have auto-play functionality turn off (and/or start and/or adjust) after winning a set number of games in a row (e.g., 1, 5, 10, 40, 50, etc.). For example, after winning 10 games, the auto-play functionality may be turned off. In another example, after winning 10 games with a wager of 10 credits, the auto-play functionality may adjust the wager to 5 credits or increased to 30 credits.

In another example, a player may want to set a single winning total amount. This option may turn off (and/or start and/or adjust) the auto-play functionality after a certain number of total winning games (e.g., 1, 5, 10, 15, 20, 50, etc.) are achieved. In one example, the system, device, and/or method may track game play for a first player on gaming device even when a second player is playing the gaming device. In this example, after a total number of winning games occurs and the second player stops playing the game, an auto-play functionality starts for the first player based on the number of winning games occurring during the second player's playing session. A player may also want to set the single winning total amount. This option may turn off (and/or start and/or adjust) the auto-play functionality after a single game wins over a certain number of credits (e.g., 1, 10, 50, 100, 200, 500, 1000, etc.). In this example, after a single game wins over a certain number of credits (e.g., 1, 10, 50, 100, 200, 500, 1000, etc.) occurs and the second player stops playing the game, an auto-play functionality starts for the first player based on a single game wins over a certain number of credits (e.g., 1, 10, 50, 100, 200, 500, 1000, etc.) occurring during the second player's playing session. A player may want to set the winning play count amount. This option may turn off (and/or start and/or adjust) the auto-play functionality after a certain total of winning games is achieved (e.g., 1, 5, 10, 15, 20, 50, etc.). For example, after winning 1000 credits on a single spin, the auto-play functionality may be turned off. In another example, after winning 1000 credits on a single spin with a wager of 20 credits, the auto-play functionality may increase the wager to 50 credits.

In another example, a player may want to set the losing play count. This option may turn off (and/or start and/or adjust) the auto-play functionality after a certain total of losing games had occurred (e.g., 1, 5, 10, 15, 20, 50, etc.). In one example, the system, device, and/or method may track game play for a first player on gaming device even when a second player is playing the gaming device. In this example, after a total number of losing games occurs and the second player stops playing the game, an auto-play functionality starts for the first player based on the number of losing games occurring during the second player's playing session. A player may want to have the auto-play functionality turn off (and/or start and/or adjust) after a certain number of games had been played (e.g., 1, 5, 10, 20, 50, 100, etc.). A player may want to have the auto-play functionality turn off (and/or start and/or adjust) after a certain amount of credits have been spent (e.g., 1, 5, 50, 100, 200, 500, 1000, etc.). In one example, the system, device, and/or method may track game play for a first player on gaming device even when a second player is playing the gaming device. In this example, after a total number of credits has been spent and the second player stops playing the game, an auto-play functionality starts for the first player based on the total number of credits spent during the second player's playing session. A player may want to have the auto-play functionality turn off (and/or start and/or adjust) after a certain percentage lost (e.g., 50 out of 100, 40 out of 60, 3 out of 9, etc.). In one example, the system, device, and/or method may track game play for a first player on gaming device even when a second player is playing the gaming device. In this example, after a predetermined percentage of losing spins occurs and the second player stops playing the game, an auto-play functionality starts for the first player based on the predetermined percentage of losing spins occurring during the second player's playing session. A player may want to have the auto-play mode turn off (and/or start and/or adjust) after a certain percentage of games have been won (e.g., 50 out of 100, 40 out of 60, 3 out of 9, etc.). In one example, the system, device, and/or method may track game play for a first player on gaming device even when a second player is playing the gaming device. In this example, after a predetermined percentage of winning spins occurs and the second player stops playing the game, an auto-play functionality starts for the first player based on the predetermined percentage of winning spins occurring during the second player's playing session. A player may want to select the jackpot parameter. This may turn off (and/or start and/or adjust) the auto-play functionality after a certain award has been achieved (e.g., top award, double bonus, triple bonus, progressive, etc.). The auto-play help screen may state that a player may click the auto-play button at any time to turn off (and/or start and/or adjust) the auto-play mode. There may be a verification request to ensure that the player wants to cancel auto-play. For example, do you want to cancel auto-play, if so please press the auto-play button again may be shown on a display. The auto-play help image may explain that a player may select a value for a given parameter from a list of available options. Each parameter may be exclusive, or combined (e.g., A player may combine the auto-play functionality parameters of auto-play continuing for 10 minutes only with the auto-play stopping after the player's credit reaches 200 option. The player may select if they want both criteria to happen before the auto-play turns off (and/or start and/or adjust), if they want only one to happen before the auto-play turns off (and/or start and/or adjust), or if they want electronic gaming device 100 and/or electronic gaming system 200 to decide if the criteria should both be met, one met, or a combination of factors before stopping (and/or start and/or adjust) auto-play mode). Electronic gaming device 100 and/or electronic gaming system 200 may select any number of criteria (e.g., 1, 2, 5, 10, etc.) to play together, exclusively, or in some predetermined way. For example, electronic gaming device 100 and/or electronic gaming system 200 may combine the auto-play functionality parameters of auto-play continuing for 10 minutes only with the auto-play stopping after the player's credit reaches 200 option, and with the auto-play continuing until the player has won five games. Electronic gaming device 100 and/or electronic gaming system 200 may be set by the casino or manufacturer to select criteria in a certain order based on the player's identification card, randomly, using the player's history, by a predetermined pattern, shuffle, any combination thereof, and/or any other selection method.

For example, a player may decide to have auto-play functionality turn off (and/or start and/or adjust) after losing a set number of games in a row (e.g., 1, 5, 10, 40, 50, etc.). For example, after losing 10 games, the auto-play functionality may be turned off. In another example, after losing 10 games with a wager of 10 credits, the auto-play functionality may adjust the wager to 5 credits or to 40 credits. Further, the auto-play functionality may be turned off after a predetermined amount of credits are lost (e.g., 100, 1000, etc.) and/or based predetermined percentage of games and/or spins are losers (e.g., 60%, 70%, etc.). In addition, the auto-play functionality may be adjusted based on losing a certain number of credits and/or the winning rate (%). In one example, a player may have a wager of 30 credits for each spin and has incurred 20 losing spins, the auto-play functionality may adjust the wager to 10 credits based on incurring the 20 losing spins or increased to 50 credits based on incurring the 20 losing spins. Further, a player may have a wager of 50 credits for each spin and has incurred a winning rate of 20%, the auto-play functionality may adjust the wager to 80 credits based on incurring this winning rate of 20% or lowered to 10 credits based on incurring this winning rate of 20%.

Figure 12C:
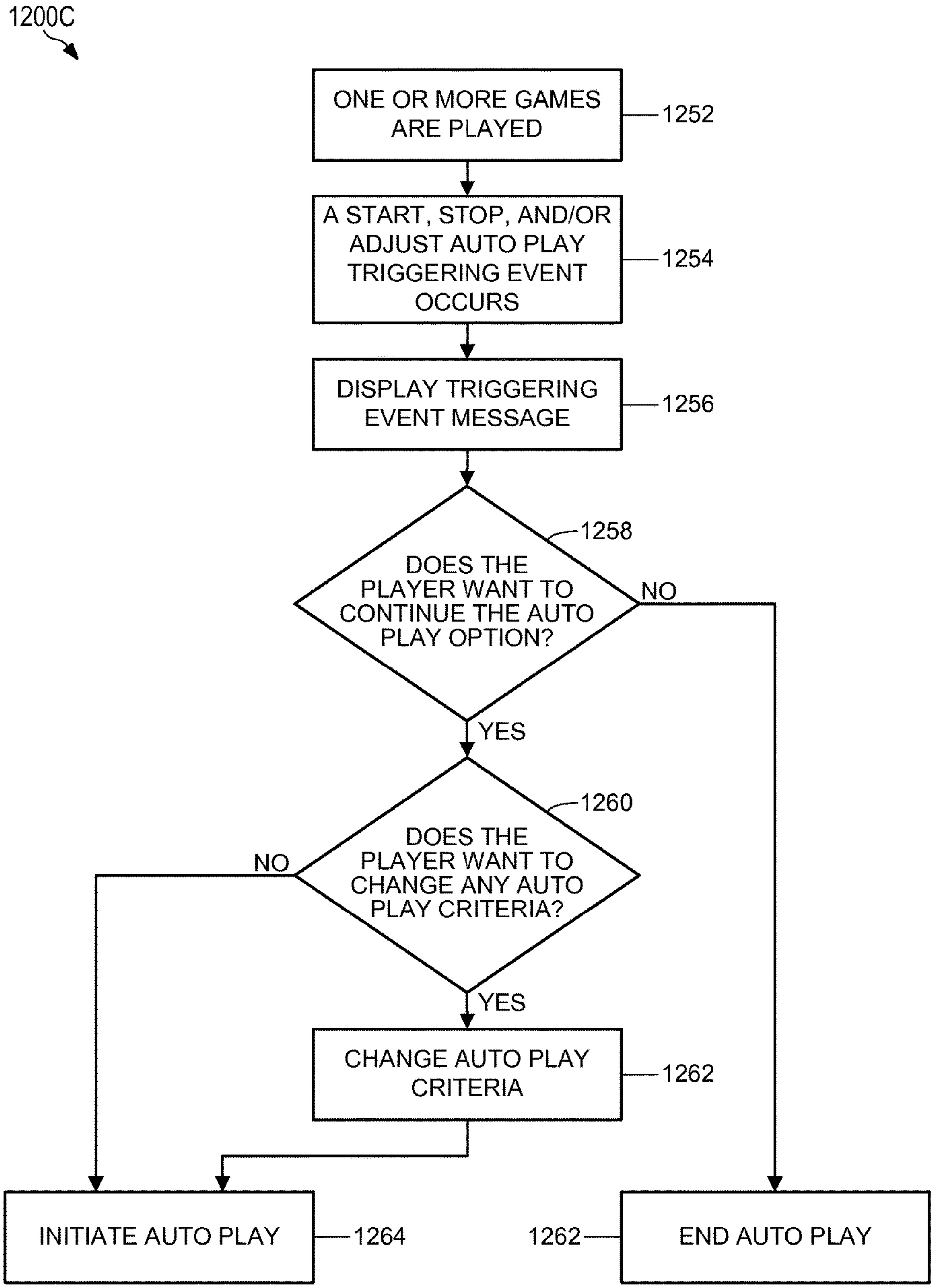
FIG. 12C is another flow diagram for game play, according to one embodiment.

In FIG. 12C, another flow diagram for game play is shown, according to one embodiment. The method may include one or more games are played in a non-auto-play mode (step 1252). The method may include one or more processors determining that a start, stop, and/or an adjust (if auto-play was already active) auto-play triggering events has occurred (step 1254). The method may include displaying the triggering event message (step 1256). The method may include one or more processors determining whether the player wants to continue and/or start the auto-play option (step 1258). If the player does not want to continue and/or start the auto-play option, then the method may end (step 1262). If the player wants to continue and/or start the auto-play option, then the method may include one or more processors determining whether the player wants to change any auto-play criteria (step 1260). If the player does not want to change any of the auto-play criteria, then the method may include initiating the auto-play (step 1264). If the player wants to change one or more auto-play criteria, then the method may change the auto-play criteria (step 1262) (which may be done with and/or without player input) and the method may then initiate the auto-play (step 1264) with any changes.

In one example, the system, method, and/or device starts, stops, and/or adjusts an auto-play functionality based on a triggering event. In one example, the triggering event may be a pattern of winning and losing spins (e.g., win, win, lose, lose, lose). Based on this pattern of winning and losing spins, the auto-play is scheduled to be adjusted from wagering 20 credits to wagering 1 credit per spin. The system, method, and/or device may display a triggering event message such as "the wagering amount will be adjusted from 20 credits to 1 credit per spin based on a winning and losing pattern occurring—the system, method, and/or device may request that the player confirm this modification before implementation. If the player confirms the request, then the auto-play continues with the modified wagering amount. If the player does not confirm the request, then the auto-play may stop and/or continue with previous settings.

Figure 13:
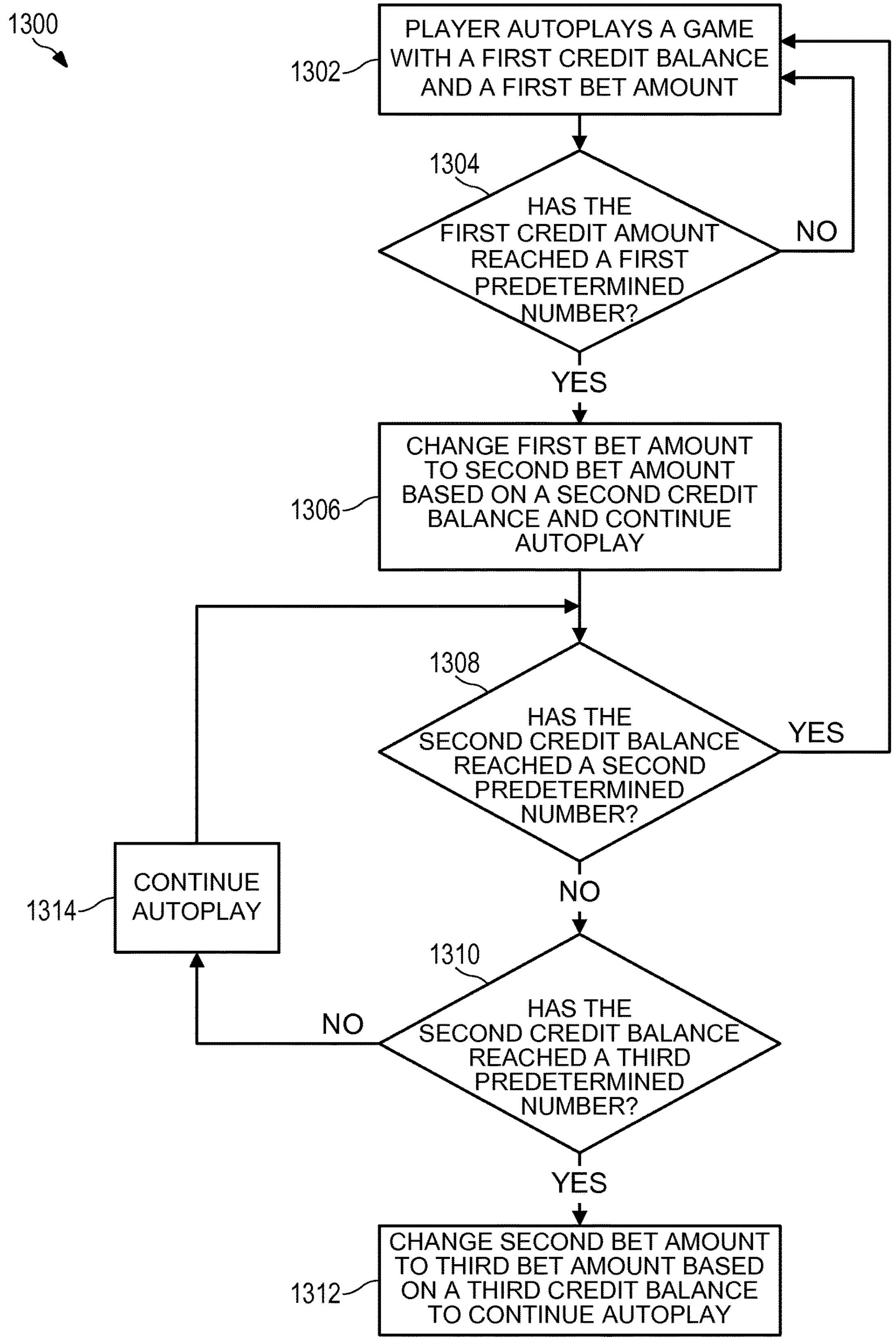
FIG. 13 is another flow diagram for game play, according to one embodiment.

In FIG. 13, another flow diagram for game play is shown, according to one embodiment. The method may include the player utilizing auto-playing functions for game play with a first credit balance and a first bet amount (step 1302). The method may include one or more processors determining whether the first credit balance amount has reached a first predetermined level (step 1304). If the first credit balance amount has not reached a first predetermined level, then the method moves back to step 1302. If the first credit balance amount has reached a first predetermined level, then the method may include changing the first bet amount to a second bet amount based on a second credit balance and continuing the auto-play function (step 1306). The method may include one or more processors determining whether the second credit balance has reached a second predetermined number (step 1308). If the second credit balance has reached a second predetermined number, then the method may move back to step 1302. If the second credit balance has not reached a second predetermined number, then the method may include one or more processors determining whether the second credit balance has reached a third predetermined level (step 1310). If the second credit balance has reached the third predetermined level, then the method may include changing the second bet amount to a third bet amount based on a third credit balance to continue auto-play (step 1312). If the second credit balance has not reached the third predetermined level, then the method may include continuing auto-play (step 1314) and then moves back to step 1308.

In one example, a player has utilized the auto-play function and auto plays a game with an auto-play wager of 20 credits (and/or any money level and/or any credit level) and starts playing with a balance of 2000 credits (and/or any money level and/or any credit level). In this example, the system, method, and/or device may determine whether a first credit amount has reached a first predetermined number and/or level—for this example, the player has selected 1000 credits to be this first predetermined level. The system, method, and/or device determines that the credit level is 1100 credits so the auto-play continues with a wager of 20 credits. However, once the credit level reaches 1000 credits, then the auto-play function is modified to have a wager amount of 10 credits per spin and auto-play is continued. The system, method, and/or device may determine whether a second credit balance has reached a second predetermined number and/or level—for this example, the player has selected 1200 credits to be this second predetermined level. The system, method, and/or device determines that the credit level is 1150 credits so the auto-play continues with a wager of 10 credits. However, once the credit level reaches 1200 credits the auto-play function is modified to have a wager amount of 15 credits per spin and auto-play is continued. Further, the wager amount could be increased back to the original wager amount of 20 credits (see step 1302). The system, method, and/or device may determine whether a second credit balance has reached a second predetermined number and/or level—for this example, the player has selected 1200 credits to be this second predetermined level. Further, the system, method, and/or device may determine whether a second credit balance has reached a third predetermined number and/or level—for this example, the player has selected 700 credits to be the third predetermined level. The system, method, and/or device determines that the credit level is 800 credits, so the auto-play continues with a wager of 10 credits. However, once the credit level reaches 700 credits the auto-play function is modified to have a wager amount of 5 credits per spin and the auto-play is continued. In another example, a player has utilized the auto-play function and auto plays a game with an auto-play wager of 20 credits (and/or any money level and/or any credit level) and starts playing with a balance of 2000 credits (and/or any money level and/or any credit level). In this example, the system, method, and/or device may determine whether a first credit amount has reached a first predetermined number and/or level—for this example, the player has selected 4000 credits to be this first predetermined level. The system, method, and/or device determines that the credit level is 3900 credits so the auto-play continues with a wager of 20 credits. However, once the credit level reaches 4000 credits, then the auto-play function is modified to have a wager amount of 30 credits per spin and auto-play is continued. The system, method, and/or device may determine whether a second credit balance has reached a second predetermined number and/or level—for this example, the player has selected 3000 credits to be this second predetermined level. The system, method, and/or device determines that the credit level is 3125 credits so the auto-play continues with a wager of 30 credits. However, once the credit level reaches 3000 credits the auto-play function is modified to have a wager amount of 10 credits per spin and auto-play is continued. Further, the wager amount could be increased back to the original wager amount of 20 credits (see step 1302). The system, method, and/or device may determine whether a second credit balance has reached a second predetermined number and/or level—for this example, the player has selected 3000 credits to be this second predetermined level. Further, the system, method, and/or device may determine whether a second credit balance has reached a third predetermined number and/or level—for this example, the player has selected 6000 credits to be the third predetermined level. The system, method, and/or device determines that the credit level is 5855 credits, so the auto-play continues with a wager of 30 credits. However, once the credit level reaches 6000 credits the auto-play function is modified to have a wager amount of 550 credits per spin and the auto-play is continued. Further, there may be one or more credit levels where the player has implement a turn-off auto-play functionality. In addition, any increase and/or decrease can be reversed in these examples and/or any level may be utilized for the credit amount and/or wagering amount.

Figure 14:
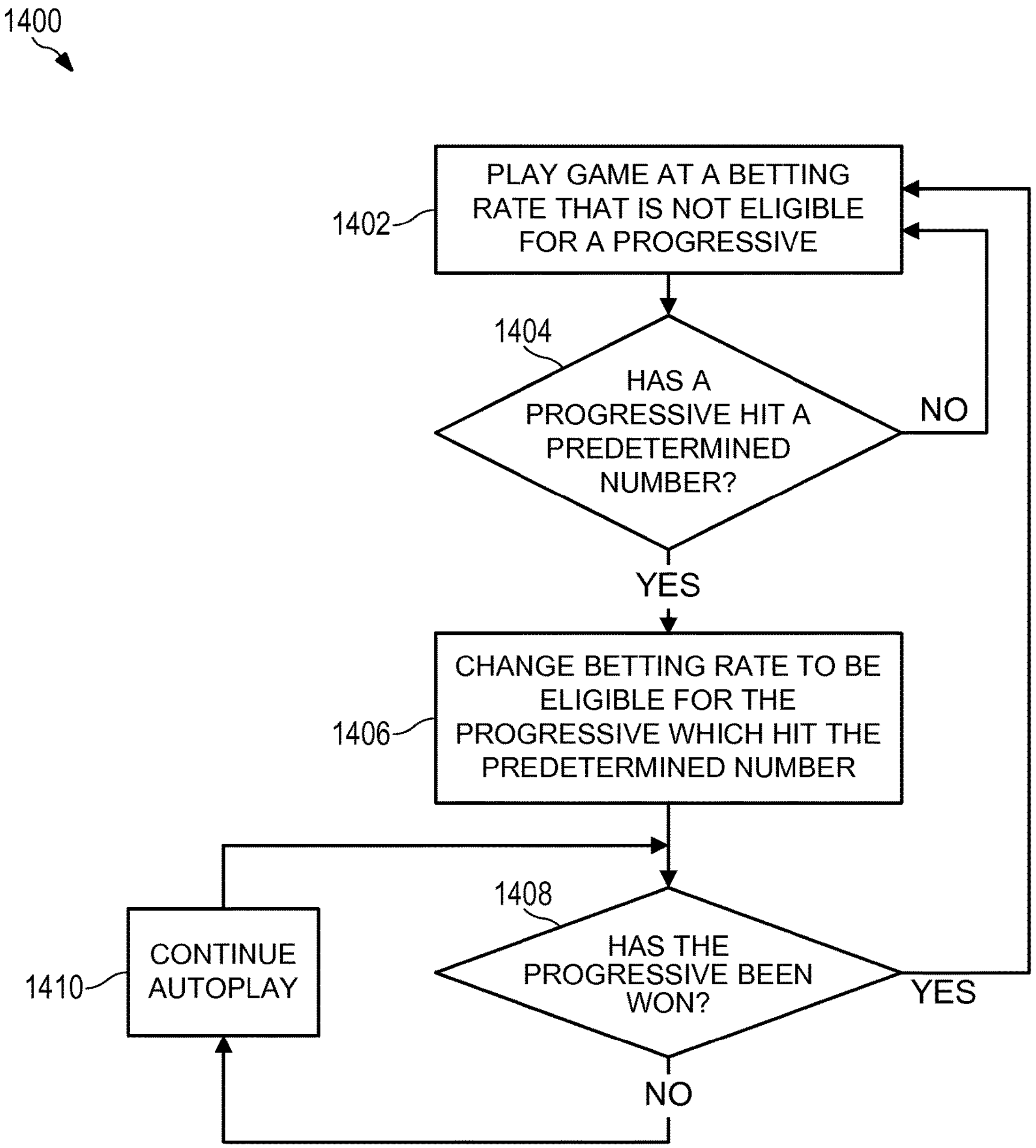
FIG. 14 is another flow diagram for game play, according to one embodiment.

In FIG. 14, another flow diagram for game play is shown, according to one embodiment. The method may include playing a game at a betting rate that is not eligible for a progressive jackpot (step 1402). The method may include one or more processors determining whether a progressive jackpot has reached a predetermined level (step 1404). If the progressive jackpot has not reached a predetermined level, then the method may move back to step 1402. If the progressive jackpot has reached a predetermined level, then the method may include changing a betting rate to be eligible for the progressive jackpot which has reached the predetermined level (step 1406). The method may include one or more processors determining whether the progressive jackpot has been won (step 1408). If the progressive jackpot has been won, then the method moves back to step 1402 where the game play is at a betting rate that is not eligible for the progressive jackpot. If the progressive jackpot has not been won, then the method may include continuing auto-play (step 1410) and then the method moving back to step 1408.

In one example, the system, device, and/or method may implement auto-play at a first wagering rate (e.g., 5 credits) which is not eligible for a progressive jackpot. The system, device, and/or method may determine whether a progressive jackpot has hit a predetermined number and/or level (e.g., $100,000). If the progressive jackpot has not hit the predetermined number, then the system, device, and/or method may continue the auto-play at the first wagering rate (e.g., 5 credits). If the progressive jackpot has hit the predetermined number (e.g., $100,000), then the system, device, and/or method may change the betting rate (e.g., from 5 credits to 20 credits) to be eligible (e.g., 20 credits or more of a wager is required to be eligible for the progressive jackpot for this example) for the progressive jackpot. The system, device, and/or method may determine whether the progressive jackpot has been won and/or reset (e.g., reset to $50,000 or completely won—$100,000 winner). If the progressive has been won and/or reset, then the system, device, and/or method may resume auto-play at the first wagering rate (e.g., 5 credits and/or any other rate). If the progressive has not been won and/or reset, then the system, device, and/or method may continue auto-play at the progressive eligible rate (e.g., at least 20 credits).

Figure 15:
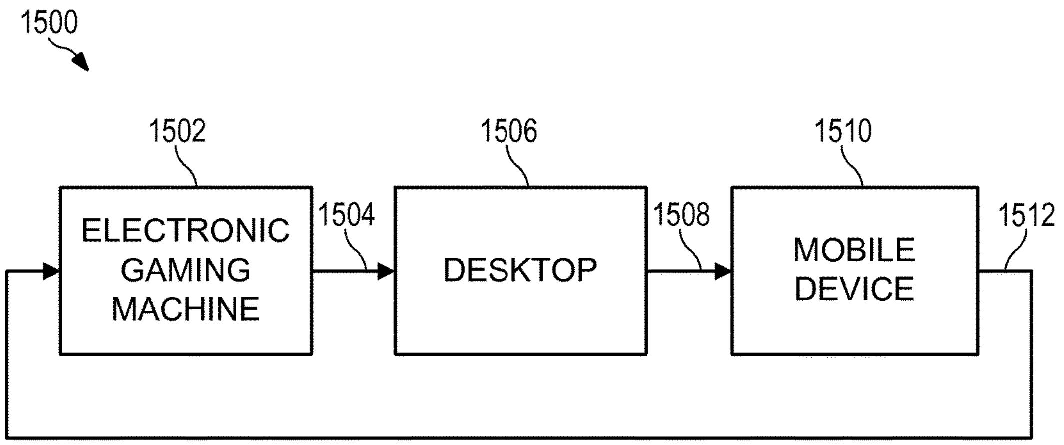
FIG. 15 is an illustration of a gaming function moving from platform to platform, according to one embodiment.

In FIG. 15, an illustration of a gaming function moving from platform to platform is shown, according to one embodiment. A platform moving image 1500 may include an electronic gaming machine 1502, a desktop computer 1506, and a mobile device 1510. In one example, one or more auto-play functions may be utilized on electronic gaming machine 1502, desktop computer 1506, and/or mobile device 1510. Further, a progressive jackpot game may move from electronic gaming machine 1502, desktop computer 1506, and mobile device 1510. In addition, one or more auto-play functions may be scheduled and/or programmed on one or more of electronic gaming machine 1502, desktop computer 1506, and mobile device 1510.

In one example, a gaming function (e.g., a progressive jackpot, a bonus game, a game type, etc.) may be transferred from a first electronic gaming device to a second electronic gaming device, to a third electronic gaming device, and/or to an Nth electronic gaming device. In another example, a first set of auto-play criteria (e.g., start when a first condition occurs, stop when a second condition occurs, adjust to state 1 when a third condition occurs, adjust to state 2 when a fourth condition occurs, adjust to state 3 when a fifth condition occurs, and/or any combination thereof) for a first device (e.g., a desktop computer) may be moved and/or transferred to any other gaming device, a second set of auto-play criteria (e.g., start when a sixth condition occurs, stop when a seventh condition occurs, adjust to state 4 when an eighth condition occurs, adjust to state 5 when a ninth condition occurs, adjust to state 6 when a tenth condition occurs, and/or any combination thereof) for a first device (e.g., a desktop computer) may be moved and/or transferred to a second device (e.g., a slot machine in a gaming entity), . . . , an Nth set of auto-play criteria (e.g., start when an eleventh condition occurs, stop when a twelfth condition occurs, adjust to state 7 when a thirteenth condition occurs, adjust to state 8 when a fourteenth condition occurs, adjust to state 9 when a fifteenth condition occurs, and/or any combination thereof) for an Nth device (e.g., a mobile device) may be moved to a first device. In one example, a player plays a first progressive game on a first device at home (e.g., desktop computer) and then leaves the house and plays the first progressive game on a second device (e.g., mobile phone) and then enters a gaming entity and plays the first progressive game on a third device (e.g., a slot machine).

Figure 16:
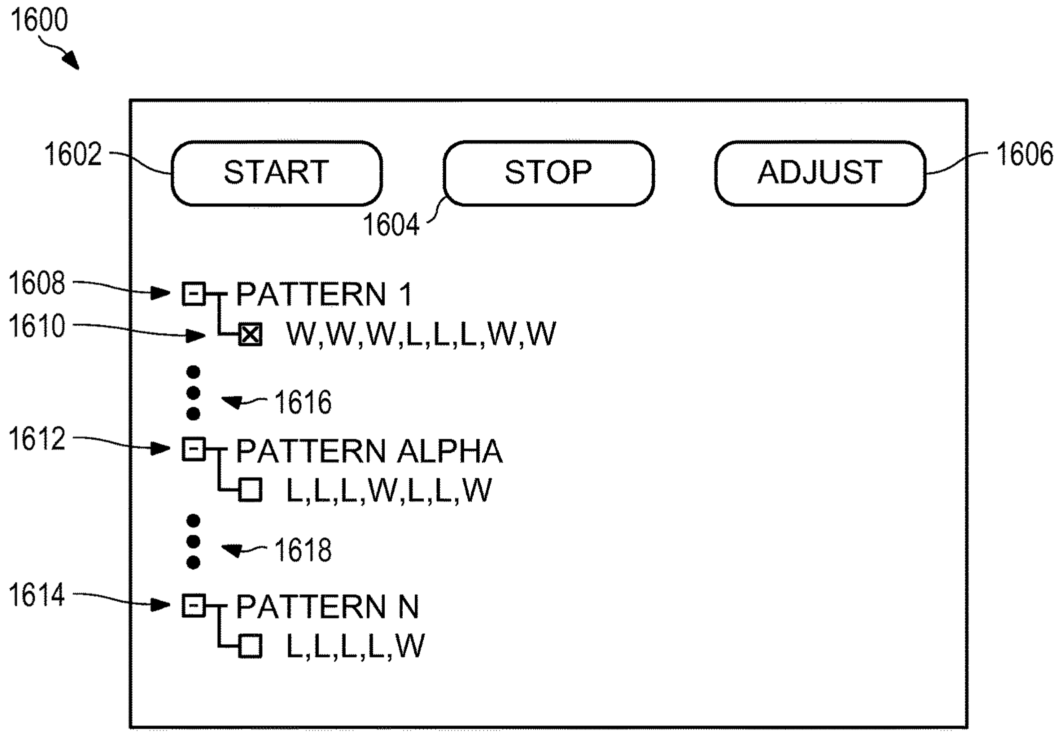
FIG. 16 is another illustration of an auto-play criteria menu, according to one embodiment.

In FIG. 16, another illustration of an auto-play criteria menu is shown, according to one embodiment. A first pattern menu image 1600 may include a start auto-play button 1602, a stop auto-play button 1604, and an adjust auto-play button 1606. The first pattern menu image 1600 may include a first pattern 1608, a first pattern details 1610, a pattern alpha 1612, and a pattern N 1614, and/or one or more other patterns (reference number 1616 and 1618).

In one example, a player may select one or more of a start auto-play button 1602, a stop auto-play button 1604, and/or an adjust auto-play button 1606 to be utilized with a first pattern 1608, a pattern alpha 1612, and/or a pattern N 1614. In one example, the first pattern details 1610 are a win, a win, a win, a lose, a lose, a lose, a win, and then a win—the auto-play function may start, stop, and/or be adjusted based on the first pattern being implemented. In another example, a pattern alpha 1612 may include a lose, a lose, a lose, a win, a lose, a lose, and a win—the auto-play function may start, stop, and/or be adjusted based on the pattern alpha. In various examples, the player may create and/or generate any pattern and/or utilize standard pattern. The player may create and/or generate any pattern by entering the pattern data—a win followed by 3 loses and then a win; a win at a bet of 10 credits followed by a win with a maximum bet within 5 spins, followed by a losing spin; ten wins within 2 hours that are larger than $20, etc.

Figure 17:
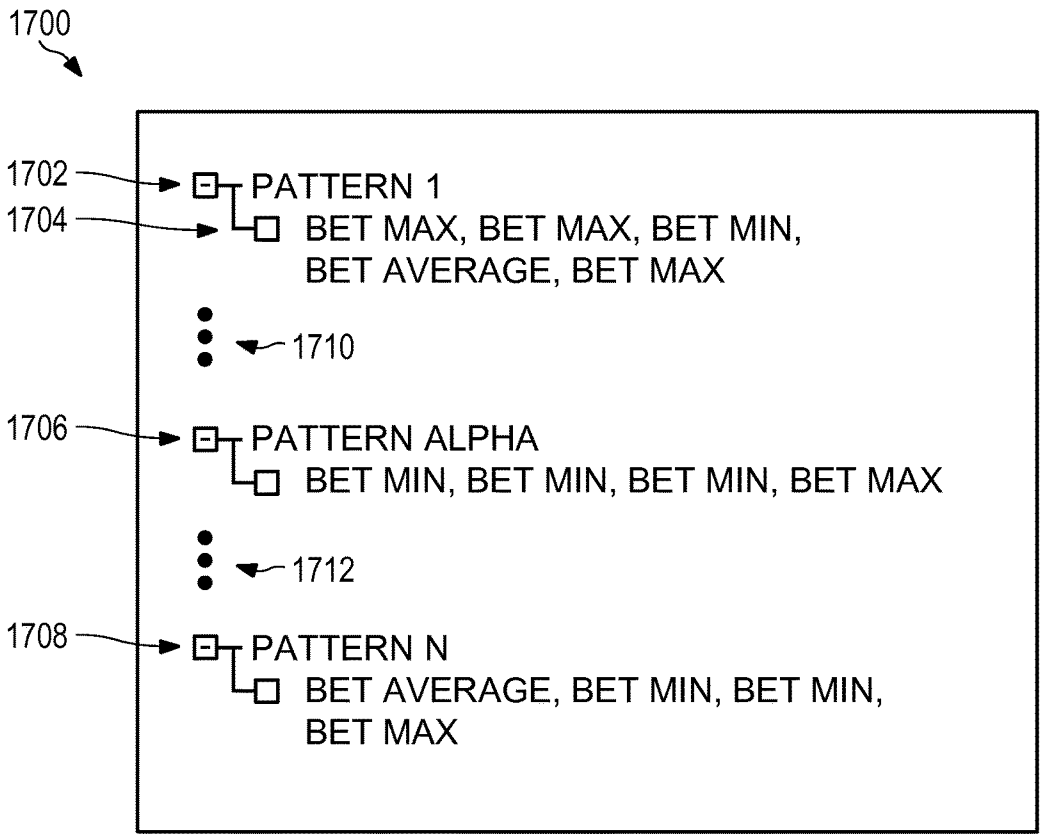
FIG. 17 is another illustration of an auto-play criteria menu, according to one embodiment.

In FIG. 17, another illustration of an auto-play criteria menu is shown, according to one embodiment. A second pattern menu image 1700 may include a first pattern 1702, a first pattern criteria 1704, a pattern alpha 1710, and a pattern N 1708, and/or one or more other patterns (reference number 1710 and 1712).

In one example, a player may select one or more of a start auto-play button 1602, a stop auto-play button 1604, and/or an adjust auto-play button 1606 to be utilized with a first pattern 1702 which is a bet maximum for a first spin, a bet maximum for a second spin, a bet minimum for a third spin, an average bet for a fourth spin, and a bet maximum for a fifth spin—the auto-play function may start, stop, and/or be adjusted based on the first pattern 1702. In one example, a player may select one or more of a start auto-play button 1602, a stop auto-play button 1604, and/or an adjust auto-play button 1606 to be utilized with an alpha pattern 1706 which is a bet minimum for a first spin, a bet minimum for a second spin, a bet minimum for a third spin, and a bet maximum for a fourth spin—the auto-play function may start, stop, and/or be adjusted based on the alpha pattern 1706. In one example, a player may select one or more of a start auto-play button 1602, a stop auto-play button 1604, and/or an adjust auto-play button 1606 to be utilized with a pattern N 1708 which is a bet average for a first spin, a bet minimum for a second spin, a bet minimum for a third spin, and a bet maximum for a fourth spin—the auto-play function may start, stop, and/or be adjusted based on the pattern N 1708. In various examples, the wagering criteria may be specific credit amounts—a first pattern may have 1 credit, 2 credits, 3 credits, 4 credits, 5 credits, and 6 credits; a second pattern may have 5 credits, 10 credits, 5 credits, and 10 credits; a third pattern may have 2 credits, 6 credits, 1 credit, 10 credits, and 40 credits; and an Nth pattern may have 10 credits, 100 credits, 1 credit, 35 credits, and 5 credits.

Figure 18:
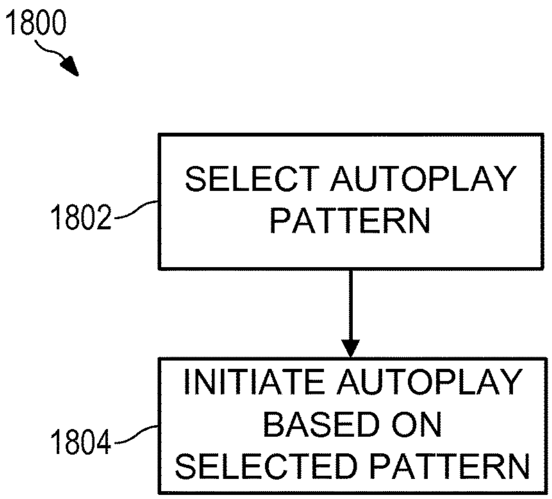
FIG. 18 is another flow diagram for game play, according to one embodiment.

In FIG. 18, another flow diagram for game play is shown, according to one embodiment. The method may include selecting one or more auto-play patterns (step 1802). The method may include initiating one or more auto-plays based on one or more auto-play patterns (step 1804). In one example, the player selects a pattern to adjust the auto-play functionality. Once this pattern (e.g., win maximum bet, lose maximum bet, win minimum bet, and win minimum bet), then the auto-play functionality utilizes a maximum bet for the next 10 spins and then reevaluates the pattern for those 10 spins and determines whether one or more auto-play functionality criteria needs to be modified (which may be based on any criteria not just the pattern—such as, progressive jackpot reaching a predetermined level and/or any other criteria discussed in this disclosure). For example, the auto-play functionality may have been initiated based on a pattern X occurring which implemented 10 spins at a maximum wagering amount but during the 10 spins a pattern Y was formed which indicates that a minimum wager of 1 credit should be utilized for the next 50 spins and during the next 50 spins a pattern A formed and/or one or more progressive jackpots reached a predetermined level, which indicates based on the player auto-play criteria that a progressive jackpot eligible wager should be initiated for the next 98 spins.

Figure 19A:
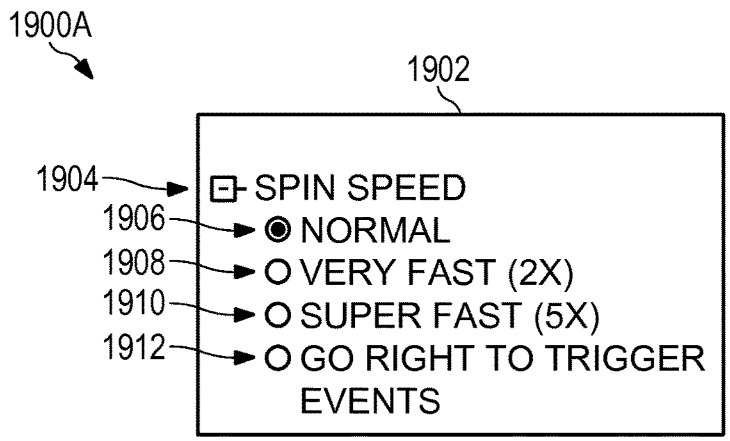
FIG. 19A is an illustration of a spin speed selection page, according to one embodiment.

In FIG. 19A, an illustration of a spin speed selection page is shown, according to one embodiment. A spin speed image 1900A may include a spin speed option screen 1902, a spin speed option 1904, a first spin speed option 1906, a second spin speed option 1908, a third spin option 1910, and a fourth spin option 1912 (up to Nth options). In one example, the system, method, and/or device may initiate auto-play based on a speed selected by the player and/or automatically by the gaming device. For example, if the player selects the first spin speed option 1906, auto-play would be displayed at a normal speed which is the speed the game plays when not in an auto-play mode. In another example, if the player selects the second spin speed option 1908, auto-play would be displayed at a very fast speed (e.g., 2 times the speed of normal game play). In another example, if the player selects the third spin speed option 1910, auto-play would be displayed at a super-fast speed (e.g., 5 times the speed of normal game play). In another example, if the player selects the fourth speed option 1912, auto-play would be displayed at a go right to the triggering event speed. In these examples, any multiplier (e.g., 1.1, 1.2, 1.3, . . . , 5, 5.5, . . . , 100, . . . , 1000, . . . . , etc.) may be utilized instead of the 2 times and 5 times speed. In addition, the go right to the triggering event may be where the auto-play skips over any losing spins and stops at a winning spin and/or stops at a bonus game and/or stops at any other winning game feature and/or any other game feature, and/or any combination thereof.

Figure 19B:
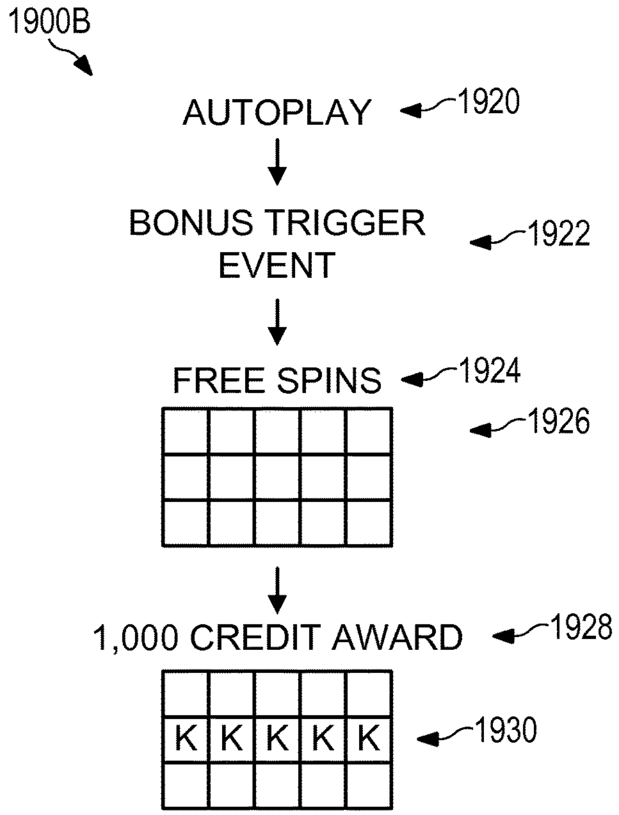
FIG. 19B is an illustration of an auto-play advancement procedure, according to one embodiment.

In FIG. 19B, an illustration of an auto-play advancement procedure is shown, according to one embodiment. A spin speed procedure image 1900B includes an autoplay first step 1920, a bonus trigger event step 1922, a free spins step 1926, and/or a triggering auto-play stop step 1930. In one example, an auto-play first step 1920 is where the player sets up and/or initiates one or more auto-play functionalities. In this example, the player has selected the go right to the triggering event speed (see FIG. 19A, reference number 1912). Therefore, one or more non-triggering event spins occur (e.g., minimal game presentation and/or no game presentation may be utilized) until a bonus trigger event step 1922 occurs and the electronic gaming device displays the spin which in this example is a free spins bonus game 1926. The system, method, and/or device generates and displays any awards associated with the free spins and may stop to show the entire spin presentation as shown in triggering auto-play stop step 1930.

Figure 19C:
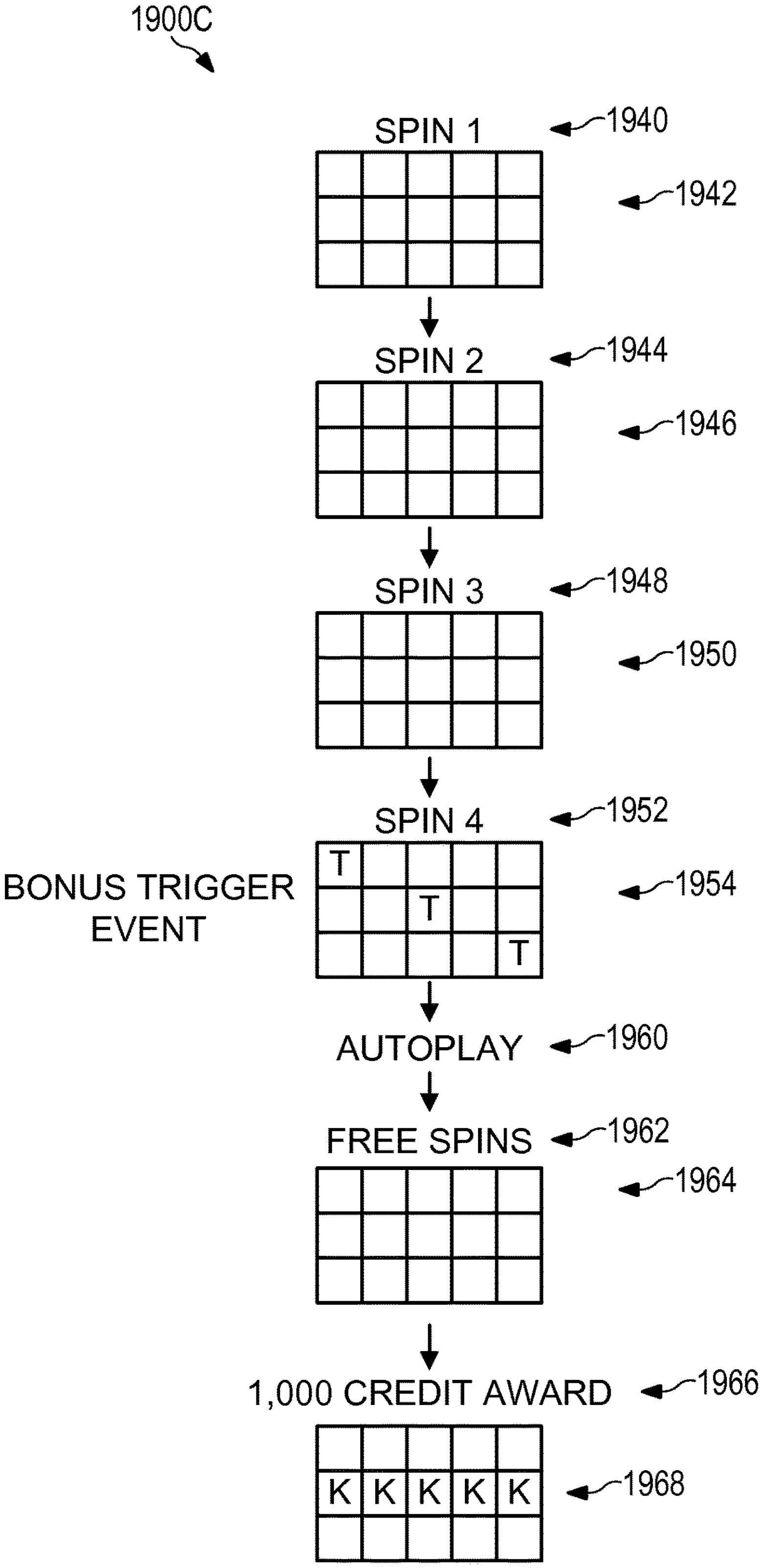
FIG. 19C is another illustration of an auto-play advancement procedure, according to one embodiment.

In FIG. 19C, another illustration of an auto-play advancement procedure is shown, according to one embodiment. A second spin speed procedure image 1900C may include a first auto-play step 1942, a second auto-play step 1946, a third auto-play step 1950, a triggering auto-play stop step 1954, a fourth auto-play step 1960, a fifth auto-play step 1964, and/or a second triggering auto-play stop step 1968. In this example, the player selects an increased speed option and/or the go right to the triggering event option. If the player selected an increase speed option, then a first spin (1942), a second spin (1946), and a third spin (1950) would be displayed at an enhanced speed (e.g., faster). If the player selected the go right to the triggering event option, then these spins (e.g., first spin, second spin, and third spin) would be skipped and/or shorten because these spins are non-winning events. Further, the system, device, and/or method may display the bonus triggering event spin at normal speed, the enhanced speed, and/or just show the winning amount. In this example, the triggering event (e.g., the three Ts) generated a winning award and then the auto-play resumed at the enhanced speed and/or the go right to the triggering event mode. Therefore, a fourth spin 1694 may be displayed at a faster rate and/or shorten and/or skipped because this is a non-winning spin. In this example, a second triggering event 1968 occurred and the system, device, and/or method may display the spin associated with the second triggering event 1968 at normal speed, the enhanced speed, and/or just show the winning amount. In one example, the go right to the triggering event option increases a player excitement because only winning events are shown and/or interactive events are shown. Further, the utilization of the games increased because the display time for non-winning events (e.g., spins) is reduced.

Figure 20:
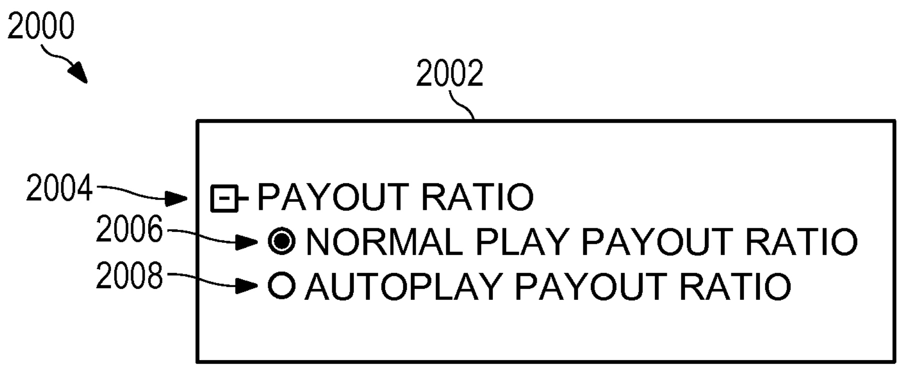
FIG. 20 is an illustration of a payout ratio adjustment, according to one embodiment.

In FIG. 20, an illustration of a payout ratio adjustment is shown, according to one embodiment. A payout ratio image 2000 may include a payout ratio menu screen 2002, a payout ratio menu option 2004, a first payout ratio option 2006, and/or a second payout ratio option 2008. In one example, the payout ratio may be the ratio of monies collected versus the amount paid out by the electronic gaming machine (e.g., 80%, 90%, etc.). In this example, there may be a normal payout ratio, such as, 90% for normal game play but a second auto-play payout ratio which may be higher than the normal game play payout ratio, such as, 91% to encourage auto-play and/or to take into account the efficiencies of auto-play. It should be noted that any ratio amounts may be utilized—(normal mode 85%, 85.01, . . . , 105% versus auto-play mode 85.0001%, 85.0002%, . . . , 106%). Therefore, a game device that normal takes in $100,000 and payouts $90,000 in a normal game play mode may now take in $100,000 and payout $91,000 in an auto-play mode.

Figure 21:
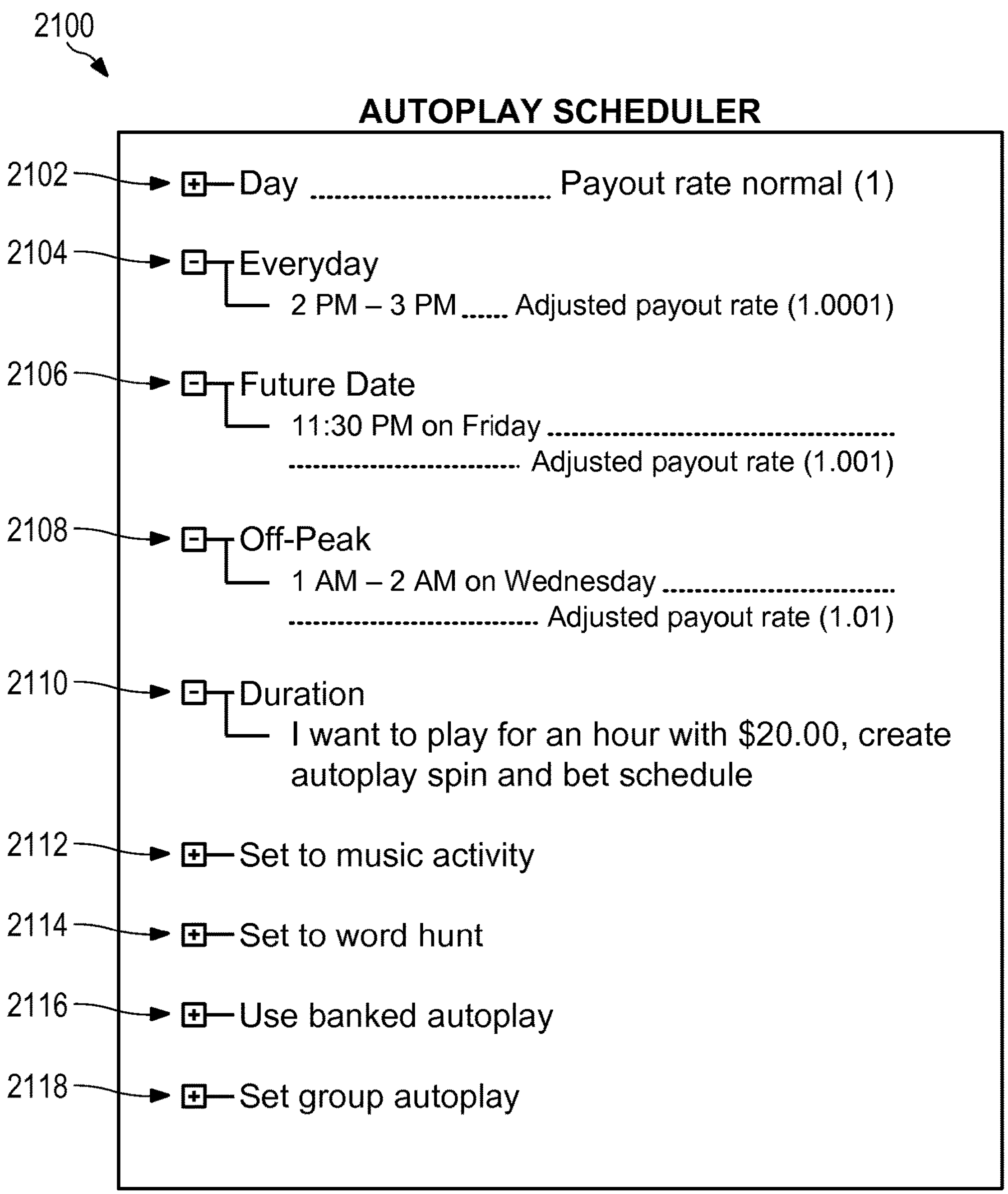
FIG. 21 is an illustration of an auto-play scheduler, according to one embodiment.

In FIG. 21, an illustration of an auto-play scheduler is shown, according to one embodiment. An auto-play scheduler image 2100 may include a day option 2102, an everyday option 2104, a future date option 2106, an off-peak time option 2108, a duration option 2110, a set to music activity option 2112, a set to word hunt option 2114, a use banked auto-play option 2116, and/or a set group auto-play option 2118. In one example, the player may select a specific day (2102) to utilize auto-play and the payout ratio may be the normal payout ratio (e.g., payout ratio 1—base ratio—90%). In another example, the player may select an everyday option at a specific time (2104) and obtain an enhanced payout ratio (e.g., payout ratio 2—90.1%) based on committing to play every day. In another example, the player may select a future date to commit to play auto-play and receive an enhanced payout ratio (e.g., payout ratio 3—90.2%). In another example, the player may select an off-peak time (when game play is not utilized as much—the game is utilized at a rate of 1 from 9 am to 9 pm but is utilized at a rate of 0.7 from 9 pm to 9 am) to utilized auto-play and obtain an enhanced payout ratio (e.g., payout ratio 4). Further, a player may select an auto-play duration based on the amount of money the player is willing to commit. For example, a player wants to play for an hour and has $20. Based on this the auto-play structure may be at normal speed with a minimum wager amount (e.g., 1 credit). However, if the player had $200 to play in an hour, the auto-play structure may be at 2× speed with a maximum wager amount (e.g., 50 credits). In another example, the auto-play may be set to music activity and/or synchronized with the music activity. Further, the auto-play may be set to a word hunt where the player may utilized auto-play and a secret word is generated and as the player does other stuff (e.g., search the internet, play online poker, etc.) if the word is utilized on the internet screen the player wins an award. In addition, the player may utilize the banked auto-play option which may have been a bonus award and/or left over from previous auto-play purchases. Further a group of individuals may set their auto-play to occur in a coordinated fashion—when Bob is playing his auto-play type 1 Chris plays his auto-play type 2 and Mary plays her auto-play type 3.

In one embodiment, the electronic gaming device includes a plurality of display areas where one or more paylines are formed on at least a portion of the plurality of display areas, a memory including one or more auto-play game play structures, and a processor configured to initiate the one or more auto-play game play structures where an initiated auto-play game play structure is based on a first progressive jackpot being over a first predetermined level. In addition, the embodiment may include the processor adjusting the initiated auto-play game play structure based on the first progressive jackpot being over a second predetermined level. In addition, the adjustment may be that a wager amount is decreased and/or the wager amount is increased. Further, the processor may stop the initiated auto-play game play structure based on a credit balance being at a first predetermined balance level. In addition, the processor may stop the initiated auto-play game play structure based on the first progressive jackpot being reset. In addition, the processor may initiate a second auto-play game play structure based a second progressive jackpot being over a third predetermined level.

In another embodiment, a method of providing gaming options via an electronic gaming device may include: receiving one or more wagers on one or more paylines; receiving one or more auto-play signals; and/or initiating one or more auto-play game structures where an initiated auto-play game play structure is based on a first progressive jackpot being over a first predetermined level. In addition, the method may include adjusting the initiated auto-play game play structure based on the first progressive jackpot being over a second predetermined level, stopping the initiated auto-play game play structure based on a credit balance being at a first predetermined balance level, stopping the initiated auto-play game play structure based on the first progressive jackpot being reset, and/or initiating a second auto-play game play structure based a second progressive jackpot being over a third predetermined level. Further, the adjustment is that a wager amount is decreased and/or the wager amount is increased.

In another embodiment, the electronic gaming system may include a server which includes a server memory and a server processor. The server memory may include one or more auto-play game structures. The server processor may initiate the one or more auto-play game structures where an initiated auto-play game play structure is based on a first progressive jackpot being over a first predetermined level. In another example, the server processor may adjust the initiated auto-play game play structure based on the first progressive jackpot being over a second predetermined level. Further, the adjustment is that a wager amount is decreased and/or the wager amount is increased. In addition, the server processor may stop the initiated auto-play game play structure based on a credit balance being at a first predetermined balance level and/or stop the initiated auto-play game play structure based on the first progressive jackpot being reset.

In another example, the auto-play stop may be initiated on a progressive win, a progressive reset (not a personal win)

on a shared progressive, and/or on a particular achievement being awarded in the game player profile. Further, the auto-play may be started on a shared progressive hitting a certain threshold. In addition, the auto-play may adjust the bet level, the denomination, paylines which are wagered on, switching to a lower and/or higher denomination based on available credits, and/or switching to a maximum wager to be eligible for a progressive when a progressive hits a certain level.

Gaming system may be a "state-based" system. A state-based system stores and maintains the system's current state in a non-volatile memory. Therefore, if a power failure or other malfunction occurs, the gaming system may return to the gaming system's state before the power failure or other malfunction occurred when the gaming system is powered up.

State-based gaming systems may have various functions (e.g., wagering, payline selections, reel selections, game play, bonus game play, evaluation of game play, game play result, steps of graphical representations, etc.) of the game. Each function may define a state. Further, the gaming system may store game histories, which may be utilized to reconstruct previous game plays.

A state-based system is different than a Personal Computer ("PC") because a PC is not a state-based machine. A state-based system has different software and hardware design requirements as compared to a PC system.

The gaming system may include random number generators, authentication procedures, authentication keys, and operating system kernels. These devices, modules, software, and/or procedures may allow a gaming authority to track, verify, supervise, and manage the gaming system's codes and data.

A gaming system may include state-based software architecture, state-based supporting hardware, watchdog timers, voltage monitoring systems, trust memory, gaming system designed communication interfaces, and security monitoring.

For regulatory purposes, the gaming system may be designed to prevent the gaming system's owner from misusing (e.g., cheating) via the gaming system. The gaming system may be designed to be static and monolithic.

In one example, the instructions coded in the gaming system are non-changeable (e.g., static) and are approved by a gaming authority and installation of the codes are supervised by the gaming authority. Any change in the system may require approval from the gaming authority. Further, a gaming system may have a procedure/device to validate the code and prevent the code from being utilized if the code is invalid. The hardware and software configurations are designed to comply with the gaming authorities' requirements.

As used herein, the term "mobile device" refers to a device that may from time to time have a position that changes. Such changes in position may comprise of changes to direction, distance, and/or orientation. In particular examples, a mobile device may comprise of a cellular telephone, wireless communication device, user equipment, laptop computer, other personal communication system ("PCS") device, personal digital assistant ("PDA"), personal audio device ("PAD"), portable navigational device, or other portable communication device. A mobile device may also comprise of a processor or computing platform adapted to perform functions controlled by machine-readable instructions.

The methods and/or methodologies described herein may be implemented by various means depending upon applications according to particular examples. For example, such methodologies may be implemented in hardware, firmware, software, or combinations thereof. In a hardware implementation, for example, a processing unit may be implemented within one or more application specific integrated circuits ("ASICs"), digital signal processors ("DSPs"), digital signal processing devices ("DSPDs"), programmable logic devices ("PLDs"), field programmable gate arrays ("FPGAs"), processors, controllers, micro-controllers, microprocessors, electronic devices, other devices units designed to perform the functions described herein, or combinations thereof.

Some portions of the detailed description included herein are presented in terms of algorithms or symbolic representations of operations on binary digital signals stored within a memory of a specific apparatus or a special purpose computing device or platform. In the context of this particular specification, the term specific apparatus or the like includes a general purpose computer once it is programmed to perform particular operations pursuant to instructions from program software. Algorithmic descriptions or symbolic representations are examples of techniques used by those of ordinary skill in the arts to convey the substance of their work to others skilled in the art. An algorithm is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals, or the like. It should be understood, however, that all of these or similar terms are to be associated with appropriate physical quantities and are merely convenient labels. Unless specifically stated otherwise, as apparent from the discussion herein, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Reference throughout this specification to "one example," "an example," "embodiment," and/or "another example" should be considered to mean that the particular features, structures, or characteristics may be combined in one or more examples.

While there has been illustrated and described what are presently considered to be example features, it may be understood by those skilled in the art that various other modifications may be made, and equivalents may be substituted, without departing from the disclosed subject matter. Additionally, many modifications may be made to adapt a particular situation to the teachings of the disclosed subject matter without departing from the central concept described herein. Therefore, it is intended that the disclosed subject matter not be limited to the particular examples disclosed.

The invention claimed is:

1. An electronic gaming device comprising:

a credit input device for accepting input of one or more elements having associated monetary value;

at least one electronic display device;

at least one player input device configured to accept input from a player;

a memory, the memory including game data for use by a processor in implementing at least one wager-based game at said electronic gaming device and one or more auto-play game play structures; and a processor configured to utilize said game data to present said at least one wager-based game comprising causing said at least one electronic display device to display game information regarding said at least one wager-based game and to initiate the one or more auto-play game play structures that play said at least one wager-based game without input from the at least one player input device when a first progressive jackpot which is associated with said at least one game exceeds a first predetermined level, said one or more auto-play structures having one or more auto-play criteria.

2. The electronic gaming device of claim 1, wherein the processor is configured to adjust the criteria of the initiated auto-play game play structure based on the first progressive jackpot being over a second predetermined level.

3. The electronic gaming device of claim 2, wherein the adjustment is that a wager amount criteria is decreased.

4. The electronic gaming device of claim 2, wherein the adjustment is that a wager amount criteria is increased.

5. The electronic gaming device of claim 1, wherein the processor is further configured to stop the initiated auto-play game play structure based on a credit balance being at a first predetermined balance level.

6. The electronic gaming device of claim 1, wherein the processor is further configured to stop the initiated auto-play game play structure based on the first progressive jackpot being reset.

7. The electronic gaming device of claim 1, wherein the processor is further configured to initiate a second auto-play game play structure based a second progressive jackpot being over a third predetermined level.

8. A method of implementing game play via an electronic gaming device comprising:

receiving at least one wager to play at least one wager-based game;

presenting wager-based game play information via at least one electronic display device of said electronic gaming device;

determining if a jackpot associated with said wager-based game play is over a first predetermined level;

if said jackpot is determined to be over said first predetermined level, initiating one or more auto-play game structures that play said at least one wager-based game without input from a player at the electronic gaming device, said auto-play game structure having one or more auto-play criteria.

9. The method of claim 8, further comprising adjusting the one or more criteria of the initiated auto-play game play structure based on the first progressive jackpot being over a second predetermined level.

10. The method of claim 9, wherein the adjustment is that a wager amount criteria is decreased.

11. The method of claim 9, wherein the adjustment is that a wager amount criteria is increased.

12. The method of claim 8, further comprising stopping the initiated auto-play game play structure based on a credit balance being at a first predetermined balance level.

13. The method of claim 8, further comprising stopping the initiated auto-play game play structure based on the first progressive jackpot being reset.

14. The method of claim 8, further comprising initiating a second auto-play game play structure based a second progressive jackpot being over a third predetermined level.

15. An electronic gaming system configured to implement one or more auto-play game structures at one or more electronic gaming machines comprising:

a server including a server memory and a server processor, the server memory including one or more auto-play game structures;

the server in communication with the one or more electronic gaming machines, said electronic gaming machines comprising a credit input device for accepting input of one or more elements having associated monetary value, at least one electronic display device, at least one player input device configured to accept input from a player, and at least one gaming machine processor configured to cause said at least one electronic display device to display game information regarding at least one wager-based game; and the server processor configured to initiate the one or more auto-play game structures at one or more of said electronic gaming machines to play said at least one wager-based game presented at said electronic gaming machine without input from the at least one player input device, said one or more auto-play game structures implemented when a first progressive jackpot which is associated with said at least one wager-based game exceeds a first predetermined level, said one or more auto-play structures having one or more auto-play criteria.

16. The electronic gaming system of claim 15, wherein the server processor is configured to adjust the one or more auto-play criteria of the initiated auto-play game play structure based on the first progressive jackpot being over a second predetermined level.

17. The electronic gaming system of claim 16, wherein the adjustment is that a wager amount criteria is decreased.

18. The electronic gaming system of claim 16, wherein the adjustment is that a wager amount criteria is increased.

19. The electronic gaming system of claim 15, wherein the server processor is further configured to stop the initiated auto-play game play structure based on a credit balance being at a first predetermined balance level.

20. The electronic gaming system of claim 15, wherein the server processor is further configured to stop the initiated auto-play game play structure based on the first progressive jackpot being reset.

* * * * *